(12) United States Patent
Roberts et al.

(10) Patent No.: US 11,201,835 B1
(45) Date of Patent: Dec. 14, 2021

(54) SYSTEMS AND METHODS FOR MULTI-TIER RESOURCE AND SUBSYSTEM ORCHESTRATION AND ADAPTATION

(71) Applicant: C/HCA, Inc., Nashville, TN (US)

(72) Inventors: William Dan Roberts, Nashville, TN (US); Jane Englebright, Franklin, TN (US); Jonathan Perlin, Nashville, TN (US); Mitchel Davis, Nashville, TN (US); Jody Miller, Nashville, TN (US); Leslie Werhane, Spring Hill, TN (US); Whitney Staub-Juergens, Nashville, TN (US); Tabatha Cooper, Hendersonville, TN (US); Stephanie Fulbright, Nashville, TN (US); Willie Ford, Nashville, TN (US); Amit Chaudhri, Nashville, TN (US); Eric Matt, Aurora, CO (US); Jeffrey Cuthbert, Littleton, CO (US)

(73) Assignee: C/HCA, Inc., Nashville, TN (US)

( * ) Notice: Subject to any disclaimer, the term of this patent is extended or adjusted under 35 U.S.C. 154(b) by 0 days.

(21) Appl. No.: 16/883,765

(22) Filed: May 26, 2020

Related U.S. Application Data

(60) Provisional application No. 62/851,887, filed on May 23, 2019.

(51) Int. Cl.
*H04L 12/891* (2013.01)
*H04L 12/927* (2013.01)
(Continued)

(52) U.S. Cl.
CPC ........ *H04L 47/808* (2013.01); *H04L 41/0816* (2013.01); *H04L 41/0886* (2013.01);
(Continued)

(58) Field of Classification Search
CPC . H04L 47/808; H04L 47/781; H04L 41/0886; H04L 47/41; H04L 41/0816; H04L 47/726
See application file for complete search history.

(56) References Cited

U.S. PATENT DOCUMENTS

| | | |
|---|---|---|
| 6,117,073 A | 9/2000 | Jones et al. |
| 7,174,381 B2 | 2/2007 | Gulko |
| (Continued) | | |

OTHER PUBLICATIONS

Notice of Allowance dated Sep. 14, 2017, for U.S. Appl. No. 15/594,383, 27 pages.
(Continued)

*Primary Examiner* — Aftab N. Khan
(74) *Attorney, Agent, or Firm* — Kilpatrick Townsend & Stockton, LLP

(57) ABSTRACT

Systems, methods, and machine-readable media to orchestrate process-performing resources and process protocols particularized to individual resources and loads are provided. Data changes in the data streams may be detected and identified. Data items from the data streams may be aggregated. Protocols that include parameter constraints according to specifications of process performance and/or operation performance may be identified. Operation-performing resources may be modeled with metrics being a function of protocols and consolidated data portions. A composite may be created that specifies a configuration a subsystem. The composite may be transmitted, and allocation of operation-performing resources to perform the defined process in accordance with the selected protocols may be controlled.

20 Claims, 17 Drawing Sheets

(51) Int. Cl.
*H04L 12/911* (2013.01)
*H04L 12/24* (2006.01)

(52) U.S. Cl.
CPC ............ *H04L 47/41* (2013.01); *H04L 47/726* (2013.01); *H04L 47/781* (2013.01)

(56) References Cited

U.S. PATENT DOCUMENTS

| | | |
|---|---|---|
| 7,707,289 B1 | 4/2010 | Skene |
| 7,734,479 B2 | 6/2010 | Rosow et al. |
| 7,743,303 B2 | 6/2010 | Nobunaga et al. |
| 9,754,335 B2 | 9/2017 | Jourdan et al. |
| 9,880,881 B1 * | 1/2018 | Perez .................... H04L 47/826 |
| 10,231,085 B1 * | 3/2019 | Kumar .................. G06F 16/248 |
| 10,303,519 B1 | 5/2019 | Perez et al. |
| 10,319,056 B1 | 6/2019 | Perez et al. |
| 10,817,342 B1 | 10/2020 | Perez et al. |
| 2002/0178246 A1 * | 11/2002 | Mayer .................... H04L 41/12 709/223 |
| 2003/0229645 A1 | 12/2003 | Mogi et al. |
| 2006/0112247 A1 | 5/2006 | Ramany |
| 2008/0154691 A1 | 6/2008 | Wellman et al. |
| 2008/0154712 A1 | 7/2008 | Wellman et al. |
| 2008/0164998 A1 | 7/2008 | Scherpbier et al. |
| 2010/0036903 A1 | 2/2010 | Ahmad |
| 2016/0013990 A1 * | 1/2016 | Kulkarni ............... H04L 41/065 709/224 |
| 2016/0277255 A1 | 9/2016 | Dasgupta |
| 2017/0054758 A1 * | 2/2017 | Maino ................... H04L 47/781 |
| 2018/0075108 A1 * | 3/2018 | Park .................... G06F 16/2272 |
| 2018/0225311 A1 * | 8/2018 | Bandopadhyay ... G06F 16/9024 |

OTHER PUBLICATIONS

Notice of Allowance dated Jan. 24, 2019 in U.S. Appl. No. 14/957,911, 9 pgs.
Notice of Allowance dated Jan. 9, 2019 in U.S. Appl. No. 15/844,098, 11 pgs.
Supplemental Notice of Allowance dated Apr. 24, 2019 in U.S. Appl. No. 15/844,098, 6 pgs.
Notice of Allowance dated Oct. 8, 2020 in U.S. Appl. No. 16/397,369, all pgs.

* cited by examiner

SYSTEMS AND METHODS FOR MULTI-TIER RESOURCE AND SUBSYSTEM ORCHESTRATION AND ADAPTATION

CROSS REFERENCE TO RELATED APPLICATION

This application claims the benefit of and priority to U.S. Provisional Application No. 62/851,887, filed May 23, 2019, which is hereby incorporated by reference in its entirety for all purposes.

FIELD

Disclosed embodiments of the present disclosure relate generally to load handling and in particular to systems and methods for multi-tier resource orchestration and subsystem operational adaptation.

BACKGROUND

Performance of various processes frequently requires use of specialized resources. Quantities, capacities, and capabilities of resources such as reliability, speed, efficiency, and accuracy may be limited and varied, however, which may limit an extent to which resources may be available for handling of a process with respect to various loads. Such limitations may result in sub-optimal process performance and results. Therefore, there is a need in the art for improvements that address such limitations and technical challenges. This and others needs are addressed by the present disclosure.

BRIEF SUMMARY

Certain embodiments of the present disclosure relate generally to load handling and in particular to systems and methods for multi-tier resource orchestration and subsystem operational adaptation.

In one aspect, a method to orchestrate process-performing resources and process protocols particularized to individual resources and loads is disclosed. The method may include one or a combination of the following. Data changes in one or more data streams may be listened for by a control system. Each data stream of the one or more data streams may correspond to electronic communications via a network from a plurality of electronic devices. The electronic devices may correspond to one or more client devices, one or more control devices, and/or one or more sensors. Consequent to the listening, the control system may detect data changes in the one or more data streams and identify the data changes as corresponding to one or more of indicia of device interactions or data changes that correspond to process and/or operation performances by operation-performing resources, indicia of conditions of loads, and/or indicia of processes and/or operations associated with the operation-performing resources and the loads. The control system may aggregate a plurality of data items from the one or more data streams at least in part by one or more of the following. For each electronic communication, the electronic communication may be processed to identify one or more digital identifiers uniquely mapped to one or more of the operation-performing resources and/or loads, and a data portion from the electronic communication may be extracted and cached. The data portions may be consolidated, and the consolidated data portions may be mapped to one or more resource profile records and/or one or more load profile records that are stored in one or more resource data storages and/or one or more load data storages. The one or more resource profile records and/or one or more load profile records may be updated with the consolidated data portions. For each operation-performing resource, the control system may perform one or more of the following. One or more protocols that include one or more parameter constraints according to specifications of process performance and/or operation performance may be identified. At least one of the one or more resource profile records and/or the one or more load profile records may be used to model the operation-performing resource. The modeling may include determining one or more individual performance metrics mapped to the operation-performing resource, each individual performance metric being a function of the one or more identified protocols and at least some of the consolidated data portions. The operation-performing resource may be mapped to one or more subsystems, each subsystem configured with set of operation-performing resources. For each subsystem, the control system may use at least one of the one or more individual performance metrics of at least one of the operation-performing resources mapped to the subsystem to model the subsystem, the modeling including determining one or more subsystem performance metrics mapped to the subsystem. The control system may create a composite based at least in part on the modeling, the composite specifying a configuration of one of the subsystems with a selected set of the operation-performing resources to perform a defined process in accordance with one or more selected protocols. The control system may cause transmission of the composite to one or more endpoint devices mapped to one or more one resource identifiers, and control allocation of the selected set of the operation-performing resources to perform the defined process in accordance with the one or more selected protocols In another aspect, a system to orchestrate process-performing resources and process protocols particularized to individual resources and loads is disclosed. The system may include one or more interfaces that receive a set of electronic communications via a network from a plurality of electronic devices, where the electronic devices correspond to one or more client devices, one or more control devices, and/or one or more sensors. The system may include one or more processors and one or more non-transitory, computer-readable storage media containing instructions which, when executed on the one or more processors, cause the one or more processors to perform one or more of the following operations. Data changes in one or more data streams may be listened for. Each data stream of the one or more data streams may correspond to electronic communications via the network from one or more electronic devices of the plurality of electronic devices. Consequent to the listening, data changes in the one or more data streams may be detected and the data changes may be identified as corresponding to one or more of indicia of device interactions or data changes that correspond to process and/or operation performances by operation-performing resources, indicia of conditions of loads, and/or indicia of processes and/or operations associated with the operation-performing resources and the loads. A plurality of data items from the one or more data streams may be aggregated at least in part by one or more of the following. For each electronic communication, the electronic communication may be processed to identify one or more digital identifiers uniquely mapped to one or more of the operation-performing resources and/or loads, and a data portion from the electronic communication may be extracted and cached. The data portions may be consolidated, and the consolidated data portions may be mapped to one or more resource profile records and/or one or more load profile records that are stored in one or more resource data storages and/or one or more load data storages. The one or more resource profile records and/or one or more load profile records may be updated with the consolidated data portions. For each operation-performing resource, one or more protocols that include one or more parameter constraints according to specifications of process performance and/or operation performance may be identified. At least one of the one or more resource profile records and/or the one or more load profile records may be used to model the operation-performing resource. The modeling may include determining one or more individual performance metrics mapped to the operation-performing resource, each individual performance metric being a function of the one or more identified protocols and at least some of the consolidated data portions. The operation-performing resource may be mapped to one or more subsystems, each subsystem configured with set of operation-performing resources. For each subsystem, at least one of the one or more individual performance metrics of at least one of the operation-performing resources mapped to the subsystem may be used to model the subsystem, the modeling including determining one or more subsystem performance metrics mapped to the subsystem. A composite may be created based at least in part on the modeling, the composite specifying a configuration of one of the subsystems with a selected set of the operation-performing resources to perform a defined process in accordance with one or more selected protocols. Transmission of the composite to one or more endpoint devices mapped to one or more one resource identifiers may be caused, and allocation of the selected set of the operation-performing resources to perform the defined process in accordance with the one or more selected protocols may be controlled.

In yet another aspect, one or more non-transitory, machine-readable storage devices storing machine-executable instructions are disclosed. The machine-executable instructions, when executed by one or more processing devices, configure the one or more processing devices to perform one or more of the following operations. Data changes in one or more data streams may be listened for. Each data stream of the one or more data streams may correspond to electronic communications via a network from one or more electronic devices of a plurality of electronic devices, where the electronic devices correspond to one or more client devices, one or more control devices, and/or one or more sensors. Consequent to the listening, data changes in the one or more data streams may be detected and the data changes may be identified as corresponding to one or more of indicia of device interactions or data changes that correspond to process and/or operation performances by operation-performing resources, indicia of conditions of loads, and/or indicia of processes and/or operations associated with the operation-performing resources and the loads. A plurality of data items from the one or more data streams may be aggregated at least in part by one or more of the following. For each electronic communication, the electronic communication may be processed to identify one or more digital identifiers uniquely mapped to one or more of the operation-performing resources and/or loads, and a data portion from the electronic communication may be extracted and cached. The data portions may be consolidated, and the consolidated data portions may be mapped to one or more resource profile records and/or one or more load profile records that are stored in one or more resource data storages and/or one or more load data storages. The one or more resource profile records and/or one or more load profile records may be updated with the consolidated data portions. For each operation-performing resource, one or more protocols that include one or more parameter constraints according to specifications of process performance and/or operation performance may be identified. At least one of the one or more resource profile records and/or the one or more load profile records may be used to model the operation-performing resource. The modeling may include determining one or more individual performance metrics mapped to the operation-performing resource, each individual performance metric being a function of the one or more identified protocols and at least some of the consolidated data portions. The operation-performing resource may be mapped to one or more subsystems, each subsystem configured with set of operation-performing resources. For each subsystem, at least one of the one or more individual performance metrics of at least one of the operation-performing resources mapped to the subsystem may be used to model the subsystem, the modeling including determining one or more subsystem performance metrics mapped to the subsystem. A composite may be created based at least in part on the modeling, the composite specifying a configuration of one of the subsystems with a selected set of the operation-performing resources to perform a defined process in accordance with one or more selected protocols. Transmission of the composite to one or more endpoint devices mapped to one or more one resource identifiers may be caused, and allocation of the selected set of the operation-performing resources to perform the defined process in accordance with the one or more selected protocols may be controlled.

In various embodiments, consequent to the listening, one or more subsequent data changes in the one or more data streams may be detected, and the one or more subsequent data changes may be identified as corresponding to one or more of indicia of device interactions or data changes that correspond to process and/or operation performances by at least one the selected set of the operation-performing resources, indicia of conditions of loads mapped to the at least one the selected set of the operation-performing resources, and/or indicia of processes and/or operations associated with the at least one the selected set of the operation-performing resources and the loads mapped to the at least one the selected set of the operation-performing resources. Based at least in part on the one or more subsequent data changes, a pattern of performance metrics mapped to the selected set of the operation-performing resources may be learned.

In various embodiments, a second composite created based at least in part on the learning, the second composite specifying a different configuration of the one of the subsystems with a second selected set of the operation-performing resources. Transmission of the second composite may be caused, and allocation of the second selected set of the operation-performing resources may be controlled to perform the defined process or a second defined process. In various embodiments, based at least in part on the pattern of performance metrics, one or more variances attributed to selected set of the operation-performing resources with respect to a baseline determined may be determined based at least in part on pattern recognition of performance metrics attributed to each subsystem of a set of subsystems. A second subsystem may be configured based at least in part on the one or more variances. In various embodiments, a data structure may be created to implement the composite with the selected set of parameters corresponding to the specifications. In various embodiments, a program may be configured corresponding to operations of the defined process in accordance with the one or more selected protocols, the composite corresponding to the program. In various embodiments, for each operation-performing resource and for each subsystem, a graphical representation formatted to represent the modeling of the operation-performing resource and the modeling of the subsystem may be created. Transmission of visualization data corresponding to the graphical representation may be caused to allow access to the graphical representation of the modeling of the operation-performing resource and the modeling of the subsystem.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure may be described in conjunction with the following appended figures.

In the appended figures, similar components and/or features may have the same reference label. Further, various components of the same type may be distinguished by following the reference label by a dash and a second label that distinguishes among the similar components. If only the first reference label may be used in the specification, the description may be applicable to any one of the similar components having the same first reference label irrespective of the second reference label.

DETAILED DESCRIPTION

The ensuing description provides preferred exemplary embodiment(s) only, and may be not intended to limit the scope, applicability, or configuration of the disclosure. Rather, the ensuing description of the preferred exemplary embodiment(s) will provide those skilled in the art with an enabling description for implementing a preferred exemplary embodiment of the disclosure. It should be understood that various changes may be made in the function and arrangement of elements without departing from the spirit and scope of the disclosure as set forth in the appended claims.

Various embodiments will now be discussed in greater detail with reference to the accompanying figures, beginning with FIG. 1.

Figure 1:
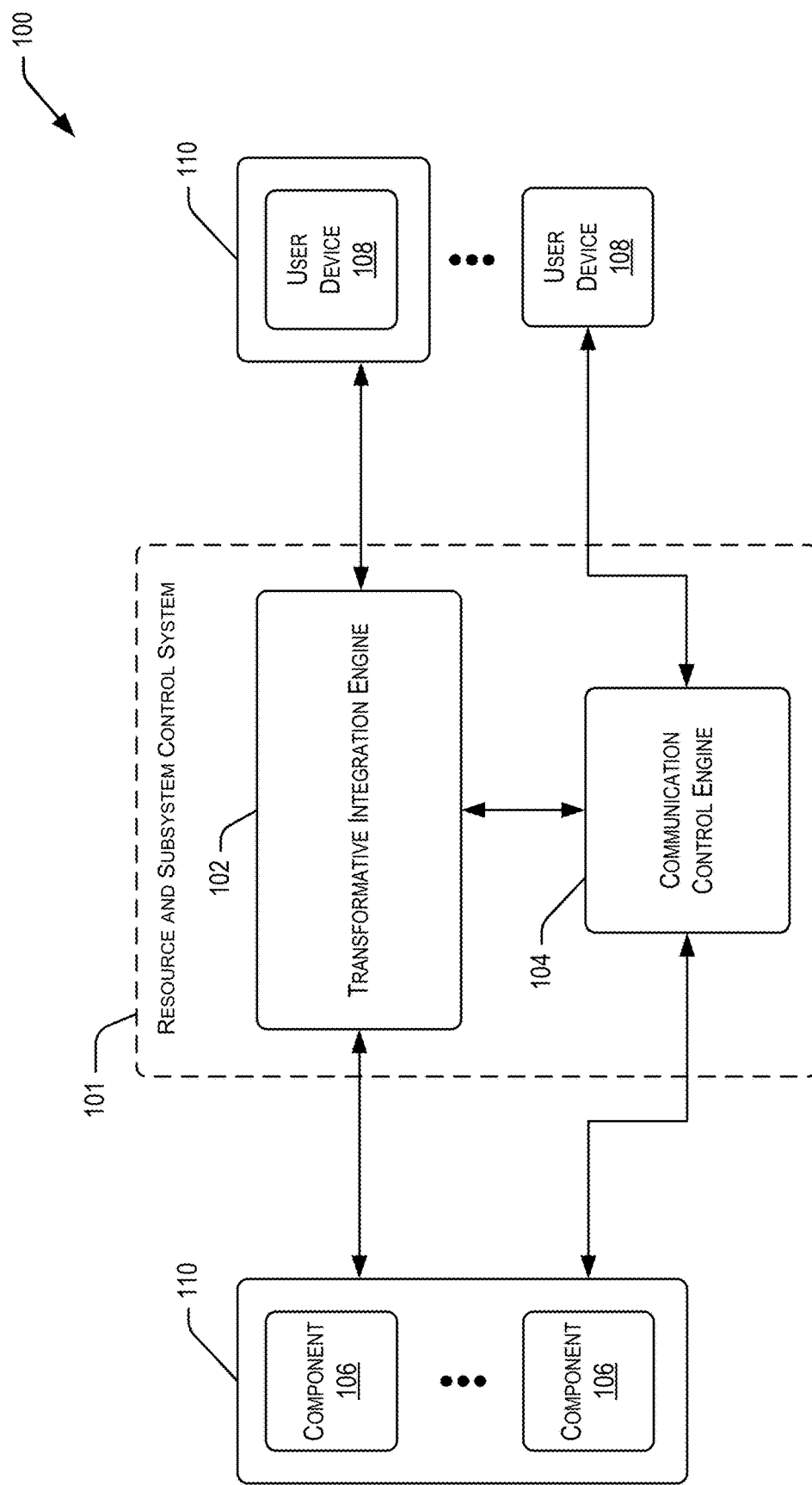
FIG. 1 illustrates a block diagram of aspects of an interaction system with a control system, in accordance with embodiments of the present disclosure.

FIG. 1 depicts a block diagram of an embodiment of an interaction system 100 with an resource and subsystem control system 101 (also referenced herein as the adaptive system 101) is illustrated. In various embodiments, the adaptive system 101 may at least partially include one or both of a transformative processing engine 102 and a communication control engine 104. Generally, in interaction system 100, data may be generated at one or more system components 106 and/or devices 108. Communication control engine 104 may control the flow of communications within interaction system. Transformative processing engine 102 may receive, intercept, track, integrate, process and/or store such data.

Data flowing in interaction system 100 may include a set of communications. Each of one, some of all communications may include (for example) an encoding type, authentication credential, indication of a content size, identifier of a source device, identifier of a destination device, identifier pertaining to content in the communication (e.g., an identifier of an entity), a processing or reporting instruction, a procedure specification, transmission time stamp, and/or sensor measurement. Data may, or may not, selectively pertain to a particular entity and/or client. Data can, depending on the implementation, include individually identifiable information and/or de-identified information as it pertains to an entity and/or client. Data may, but need not, include secured information.

For example, a system component 106 may include, for example, a sensor to detect a sensor measurement and may thereafter generate and transmit a communication that reflects the sensor measurement. The communication may be transmitted at routine times and/or upon detecting a threshold (e.g., one or more) number of measurements or a measurement satisfying a transmission condition (e.g., exceeding a threshold value). In some instances, the sensor measurement corresponds to one reflecting a property of an object or entity (e.g., person) near the sensor. The communication may then include an identifier of the object or entity. The identifier may be determined, for example, based on detection of a nearby electronic tag (e.g., RFID tag), a detected input received at a user interface of component 106 and/or data in a corresponding communication received from a user device.

As another example, a device 108 may be configured to detect input received at a user interface of the device. The input may include, for example, an identifier of an object or entity, an instruction, a characterization of an object or entity, an identification of an analysis to be performed, a specification of an aggregation or data processing to be performed, and/or an identification of a destination for a data-analysis report. User device 108 may further be configured to detect input requesting particular data, to generate a request communication (e.g., to be sent to transformative processing engine), to receive the requested data and/or to present the received data.

The depicted engines, devices and/or components may communicate over one or more networks. A network of one or more networks may include a wired network (e.g., fiber, ethernet, powerline ethernet, ethernet over coaxial cable, digital signal line (DSL), or the like), wireless network (e.g., Zigbee™, Bluetooth™, WiFi™, IR, UWB, WiFi-Direct, BLE, cellular, Long-Term Evolution (LTE), WiMax™, or the like), local area network, the Internet and/or a combination thereof. It will be appreciated that, while one or more components 106 and one or more devices 108 are illustrated as communicating via transformative processing engine 102 and/or control engine 104, this specification is not so limited. For example, each of one or more components 106 may communicate with each of one or more devices 108 directly via other or the same communication networks.

A component 106 may be configured to detect, process and/or receive data, such as environmental data, geophysical data, biometric data, chemical data (e.g., chemical composition or concentration analysis data), and/or network data. The data may be based on data detected, for example, via a sensor, received signal or input. A user device 108 may include a device configured to receive data from a user and/or present data to a user. It will be appreciated that, in some instances, a component 106 is also a user device 108 and vice-versa. For example, a single device may be configured to detect sensor measurements, receive input and present output.

A component 106 may be configured to generate a communication that is in one or more formats, some of which may be proprietary. For example, an imaging machine (e.g., one of one or more components 106) manufactured by company A, located within a first premises (e.g., premises 110), and belonging to a first client, may save and transfer data in a first format. An imaging machine (e.g., one of one or more components 106) manufactured by company B, located within the first premises (e.g., premises 110), and belonging to the first client, may save and transfer data in a second format. In some examples, data from certain components is transformed, translated, or otherwise adjusted to be recognizable by transformative processing engine 102. Thus, continuing with the example from above, when the imaging machines manufactured by companies A and B are located within the first premises belonging to the first client, they may nevertheless save and transfer data in different formats. In some examples, one or more components 106 communicate using a defined format.

In some examples, each of one or more components 106 are each associated with one or more clients within a same or different interaction systems. For example, certain ones of one or more components 106 may be associated with a first client, while other ones of one or more components 106 may be associated with a second client. Additionally, each of one or more components 106 may be associated with a premises 110 (e.g., client premises). Each premises 110 may correspond to a single location and/or processing focus. Exemplary types of premises include server farm premises, web-server premises, data-storage premises, technical-support premises, telecommunication premises, and/or operation premises. For example, a first premises may include a structure at a first location at which one or more resources (e.g., computational resources, equipment resources, laboratory resources and/or human resources) are provided. Each of the one or more resources may be of a first type in a first set of types. A resource type may be identified based on, for example, a characteristic of the resource (e.g., sensor inclusion) and/or a capability of providing each of one or more services. Thus, for example, resources at a first premises may be better configured for handling a particular type of service requests compared to those in another premises. As another examples, different premises may include resources of similar or same types but may vary in terms of, for example, user accessibility, location, managing client, etc.

Transmission of data from one or more components 106 to transformative processing engine 102 may be triggered by a variety of different events. For example, the data may be transmitted periodically, upon detection of an event (e.g., completion of an analysis or end of a procedure), upon detection of an event defined by a rule (e.g., a user-defined rule), upon receiving input triggering the transmission, or upon receiving a data request from transformative processing engine 102. Each transmission may include, e.g., a single record pertaining to a single entity, object, procedure, or analysis or multiple records pertaining to multiple entities, objects, procedures, or analyses.

In some examples, at least some of one or more devices 108 are associated with premises 110. In some examples, at least some of one or more devices 108 need not be associated with premises 110 or any other premises. Similar to one or more components 106, one or more devices 108 may be capable of receiving, generating, processing and/or transmitting data. Examples of one or more devices 108 include, for example, a computer, a mobile device, a smart phone, a laptop, an electronic badge, a set-top box, a thin client device, a tablet, a pager, and other similar user devices). One or more devices 108 may be configured to run one or more applications developed for interacting with data collected by transformative processing engine 102. For example, those user devices of one or more devices 108 that are not associated with premises 110 may be configured to run one or more third-party applications that may rely in part on the data gathered by transformative processing engine 102.

Each of one or more components 106 and one or more devices 108 may be utilized by one or more users (not shown). Each of the one or more users may be associated with one or more clients. For example, one of the one or more users may be associated with a client as a result of being employed by the client, physically located at a location of the client, being an agent of the client or receiving a service from the client.

In some examples, one or more components 106 and one or more devices 108 may communicate with transformative processing engine 102 and control engine 104 via different information formats, different proprietary protocols, different encryption techniques, different languages, different machine languages, and the like. As will be discussed with reference to FIG. 2, transformative processing engine 102 is configured to receive these many different communications from one or more components 106, and in some examples from one or more devices 108, in their native formats and transform them into any of one or more formats. The received and/or transformed communications may be transmitted to one or more other devices (e.g., control engine 104, an entity device and/or a user device) and/or locally or remotely stored. In some examples, transformative processing engine 102 receives data in a particular format (e.g., the HL7 format) or conforming to any other suitable format and/or is configured to transform received data to conform with the particular format.

One or more components 106 of premises 110 may include and/or has access to a local or remote memory for storing generated data. In some examples, the data is stored by one or more servers local to premises 110. Such storage may enable premises 110 to retain locally data pertaining to its premises prior to (or in conjunction with) the data being shared with transformative processing engine 102 and/or control engine 104. In some examples, the one or more servers of premises 110 share data directly with a record service (not shown), and the record service makes the data available to transformative processing engine 102 and/or control engine 104. Once an electronic record is updated at premises 110, an indication of the update may be provide to the record service. The record service may then update a corresponding record associated with the electronic record.

The record service may be granted access to the data generated and/or transmitted by one or more components 106. In some examples, the record service may include a server or a plurality of servers arranged in a cluster or the like. These server(s) of the record service may process and/or store data generated by one or more components 106. For example, one or more records may be generated for each entity (e.g., each record corresponding to a different entity or being shared across entities). Upon receiving a communication with data from an component (or premises), the record service may identify a corresponding record and update the record to include the data (or processed version thereof). In some examples, the record service provides data to transformative processing engine 102. Premises 110 may include one at which a resource is located and/or service is provided. Irrespective of the type of premises, premises 110 may update data, maintain data, and communicate data to transformative processing engine 102. At least some of the data may be stored local to premises 110.

A user interacting with a user device 108 may include, for example, a client customer, client agent and/or a third party. A user may interact with user device 108 and/or component 106 so as to, for example, facilitate or initiate data collection (e.g., by a component 106), provide data, initiate transmission of a data request, access data and/or initiate transmission of a data-processing or data-storage instruction. In some instances, one or more devices 108 may operate according to a private and/or proprietary network or protocols. In other examples, one or more devices 108 may operate on public networks. In any case, however, transformative processing engine 102 may have access to the one or more components and may communicate with them via a public, private and/or proprietary network or protocols. The use of one or more private and/or proprietary protocols may promote secure transfer of data.

Figure 2:
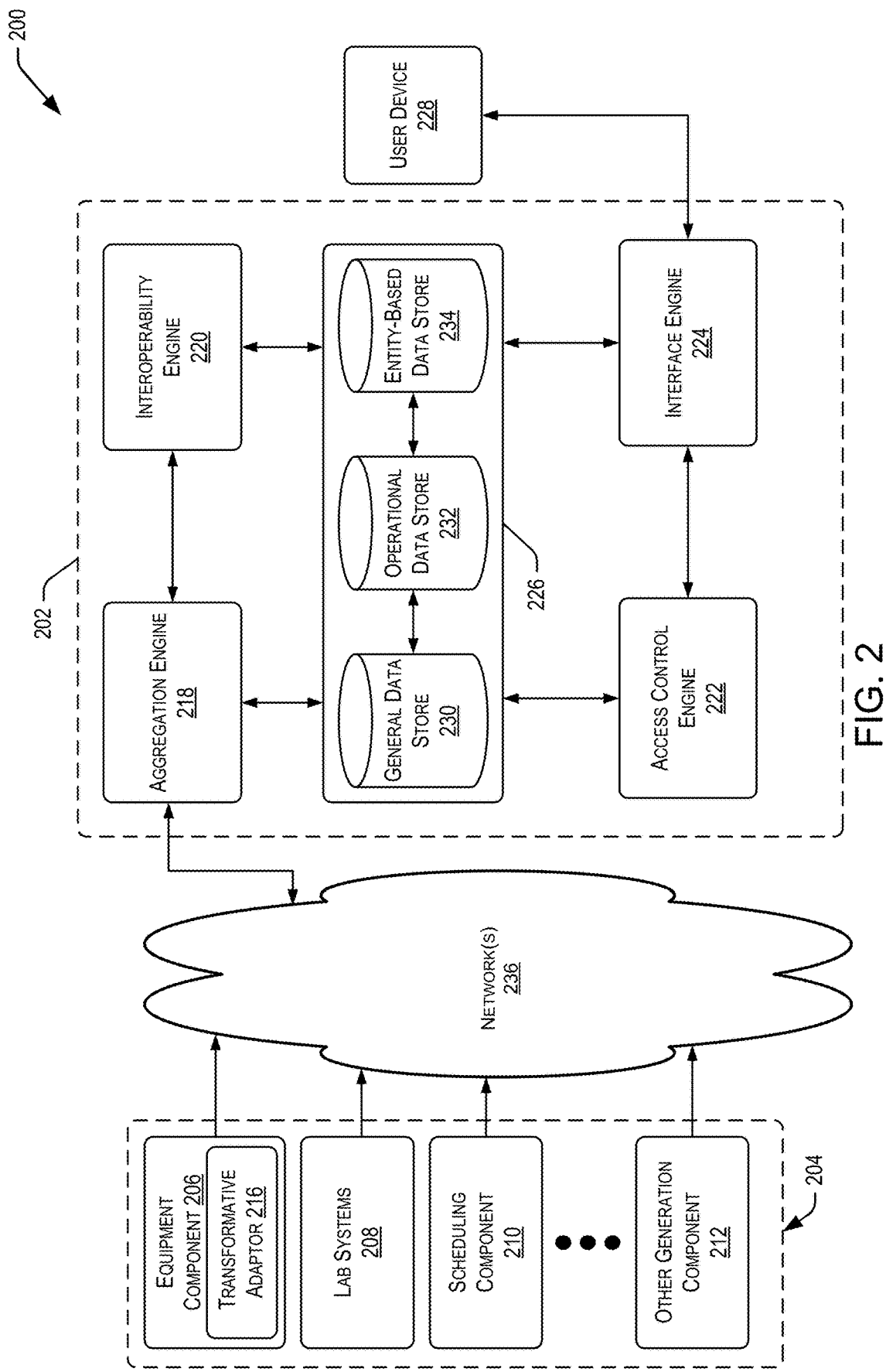
FIG. 2 illustrates a block diagram of aspects of the interaction system, in accordance with embodiments of the present disclosure.

Referring next to FIG. 2, a block diagram of an example of an interaction system 200 is shown. Interaction system 200 may correspond to interaction system 100 illustrated in FIG. 1 and may include a transformative engine 202. Transformative engine 202 is an example of transformative processing engine 102 discussed with reference to FIG. 1. Interaction system 200 also may include one or more generation components 204. In particular, one or more generation components 204 may include an equipment component 206, a lab systems component 208, a specification component 210 and other generation components 212. One or more generation components 204 are examples of one or more components 106 discussed with reference to other figures herein.

Generally, one or more generation components 204 may include any suitable device or system capable of generating data in the context of an interaction system. For example, the other generation components 212 may include a sensor on a door, and equipment component 206 may include a sophisticated computer-controlled laser device. In either case, each generation component generates some type of data. For example, the data provided by the sensor may be used to address security concerns or assessing heating, ventilating, and air conditioning (HVAC) for an institution. The data provided by the laser device may have been provided while engaged in a procedure and may then be used by other entities in the future to decide how to use the device.

The one or more generation components 204 may correspond to one or more internet of things (IOT) devices. Such devices may be running software, e.g., developed in Linux, in some instances, and may be configured to send http calls via the API to send messages any time a trigger event is detected. By way of example, every time a particular door is opened, a sensor (e.g., a proximity sensor, a reed switch, a motion detector, etc.) may sense the open condition, and the corresponding IOT device may send an http call with a JSON payload with values indicative of the sensed condition, location, and time to the API to send a message to security.

As discussed in further detail herein, data generated by one or more generation components 204 may be of a variety of formats, some of which may be proprietary. For example, a single component may generate data in multiple formats, different components may generate data in different formats, and/or different component types may result in generation of data in different formats. In some instances, formatting of a data may depend on a service having been provided, a user initiating data generation, a destination to receive the data, a location at which a service was provided, etc. In some examples, a typical interaction system may include thousands of generation components producing data in hundreds of formats. In order to harness the power that comes from such a large amount of data to make informed decisions, it is desirable that all, or at least a large portion of the data, is shared. Use of transformative engine 202 in accordance with techniques described herein may achieve this design— making large amounts of data, in many different originating formats available to various types of users, via one or more interfaces.

While one or more generation components 204 are illustrated adjacent to each other, it is understood that each may be located within one premises or that the components may be spread out among many premises. In addition, in some examples, one or more generation components 204 belong to different clients. In some embodiments, the one or more generation components 204 may communicate with the transformative processing engine 202 via a specified protocol and the payload data of the communications may be in a variety of formats. In some embodiments, the one or more generation components 204 may communicate with the transformative processing engine 202 via a specified protocol the payload data of the communications may be in a specified format, after the payload data was transformed to the specified format, e.g., with one or more transformative adaptors disclosed herein.

Turning now to equipment component 206, this component may include any machine, contrivance, implant, or other similar related article, that is intended to aid in reaching a particular objective. In some instances, equipment component 206 may include one or more sensors to detect environmental or other stimuli. Equipment component 206 may include, for example, equipment to monitor a stimulus, detect stimulus changes, detect stimulus-indicative values, and so on. Exemplary equipment components 206 include an imaging device, a device that detects and characterizes electrical signals, a device that detects pressure, and/or a device that detects concentration of one or more particular elements, compounds and/or gases.

As illustrated, equipment component 206 may include transformative adaptor 216. In some examples, transformative adaptor 216 is a device that transforms, translates, converts, or otherwise adjusts output data from equipment component 206. For example, an equipment component 206 may be a scanner that outputs its results in format A, but the majority of other scanners in the interaction system output their results in format B. Transformative adaptor 216 may be implemented to convert or otherwise adjust the results in format A to conform closer to format B. For example, the conversion from format A to format B may be performed using a conversion rule, which may be user-defined or learned. Transformative engine 202 may perform similar processes as it relates to all data generated within interaction system 200. In this manner, transformative adaptor 216 may perform an initial step in the process of transformation, translation, conversion, or adjustment of the output of equipment component 206. In some examples, transformative adaptor 216 is implemented in hardware, software, or any suitable combination of both. In some examples, other transformative adaptors (not shown) may be implemented within others of one or more generation components 204. The one or more generation components 204 may communicate with the transformative processing engine 202 via a specified protocol, where the payload data of the communications may be in a specified format, after the payload data was transformed to the specified format, e.g., with one or more transformative adaptors 216.

Lab systems component 208 may include any suitable laboratory equipment or system that is intended to analyze material, such as biological material. This may include, for example, laboratory equipment that analyzes biological samples; electric microscopes; ultracentrifuges; data collection devices, including Kymographs, sensors connected to a computer to collect data; monitoring devices; computers used to report results of lab tests, and other similar laboratory equipment. Each of the above-listed components generates data that is provided (directly or indirectly) to transformative engine 202.

Specification component 210 may include any suitable computing devices used for operations-related purposes with respect to interaction system 200. For example, specification component 210 may be configured to temporally specify a resource for allocation for a particular entity during a particular time slot. Specification component 210 may monitor a temporal specification for the resource and may identify one or more available time slots that may be secured by a particular entity. Upon receiving a specification indication, specification component 210 may update a temporal specification of a resource to reflect that a particular time slot is to be allocated for service of a particular entity. In some embodiments, the transformative processing engine 202 may be configured to monitor data (e.g., messages) that is passed over the one or more networks 236 and, from the monitored data, select certain portions to provide to one or more authorized entities.

Each of the one or more generation components 204, as well as the one or more user devices 228 corresponding to the one or more devices 108, may include individual and/or shared storage systems, one or more processors, a user interface, a network connectivity device, and one or more ports. The storage system include memory that may be implemented, e.g., using magnetic storage media, flash memory, other semiconductor memory (e.g., DRAM, SRAM), or any other non-transitory storage medium, or a combination of media, and may include volatile and/or non-volatile media. The storage systems may also be configured to store computer-executable code or instructions for interacting with the user interface and/or for one or more applications programs, such as an application program for collecting data generated by the particular generation component.

The one or more processors may be configured to access the operating system and application programs stored within the storage systems, and may also be configured to execute such program code. The one or more processors may be implemented as one or more integrated circuits, e.g., one or more single-core or multi-core microprocessors or microcontrollers, examples of which are known in the art. In operation, the one or more processors may control the operation of the particular component. The one or more processors may access and execute the program code and at any given time.

The user interface may include any combination of input and output devices. In some instances, a user may operate input devices of the user interface to invoke the functionality of the particular component or user device. For example, the user interface may enable the user to view, hear, and/or otherwise experience output from component or user device via the output devices of the user interface. Examples of output devices include a display, speakers, and the like.

The network connectivity device may enable the component or user device to communicate with transformative engine 202 and other components or other user devices via one or more networks. The one or more networks may include any suitable combination of cable, cellular, radio, digital subscriber line, or any other suitable network, which may be wired and/or wireless. In some examples, the network connectivity device may enable the component or the user device to communicate wirelessly with various other components and/or transformative engine 202. For example, the components may include circuitry to enable data communication over a wireless medium, e.g., using near-field communication (NFC), Bluetooth Low Energy, Bluetooth® (a family of standards promulgated by Bluetooth SIG, Inc.), Zigbee, Wi-Fi (IEEE 802.11 family standards), or other protocols for wireless data communication.

The one or more ports may enable the component or the user device to receive data from one or more sensors. The sensors may be any suitable type of sensor to capture data. Such captured data may be shared with transformative engine 202 in accordance with techniques described herein. In some examples, the sensors may also be configured to detect the component's or the user device's location and other details about the component or the user device. In some examples, the component and user device may include global positioning chips for determining a geolocation. Such geolocation information may be relevant to analyzing the data provided by the component or the user device located at the geographic location.

In some embodiments, the transformative engine 202 may be configured to monitor data (e.g., messages) that is passed over the one or more networks 236 and, from the monitored data, select certain portions to provide to one or more authorized users via chat rooms/channels. For example, as disclosed herein, one or more agents may monitor data passed over the one or more networks 236. The one or more agents may, in various embodiments, correspond to a bot, a listener, and/or the like, and may conform ITI-41, HL7 v.2, HL7 v.3, C-CDA, NEMSIS, FHIR, XDs.b, XDR, or other suitable protocols. Thus, in some embodiments, one or more bots may be configured as listeners, and agent engine 118C may, in some embodiments, correspond to the bot engine 118D, which are disclosed herein.

The transformative processing engine 202 may include an aggregation engine 218, an interoperability engine 220, an access management engine 222, an interface engine 224, and a data store 226. The interface engine 224 may be configured to retrieve the data from the data store 226 and provide one or more interfaces for interacting with elements of the transformative processing engine 202. For example, the interface engine 224 may include an interface by which an application running on user device 228 may access portions of data within the data store 226. Generally aggregation engine 218 is configured to collect data from multiple communications. The data may be from one or multiple generation components 204 and/or may be of a same or different formats. Aggregation engine 218 may be configured to perform one or more operations on the collected data. For example, aggregation engine 218 may tag data, log data, perform protocol conversion, and may support one-to-many communications. The collection may be asynchronous. In some examples, the data has been saved locally in connection with one or more generation components 204 in many different formats having many different data structures.

Aggregation engine 218 may identify data to be aggregated based on, for example, intra-communication data, a current time, a source generation component, and/or one or more aggregation rules. For example, an aggregation rule may specify that data is to be aggregated across all communications that include content with a same entity identifier. An aggregation may be dynamic. For example, aggregated data may reflect that from within a most recent 12-hour period. Thus, an aggregation may be updated in time to exclude older data from the aggregation and to include newer data.

Aggregation engine 218 may be configured to provide data from one or more communications to interoperability engine 220. Interoperability engine 220 may be configured to perform one or more operations on the received data and store it in data store 226. For example, interoperability engine 220 may perform semantic tagging and indexing of data. This may include extracting field values from data, categorizing data (e.g., by type of data, characteristic of an entity, location of premises, characteristic of premises, and the like), anonymizing or partially-anonymizing data, and the like. Interoperability engine 220 may also include a high availability cache, an alerts engine and a rules engine. In some examples, interoperability engine 220 operates synchronously.

From interoperability engine 220, data flows to data store 226. Data store 226 (and any other data store discussed herein) may include one or more data stores, which may be distributed throughout two or more different locations (e.g., present on different devices, which may include devices of different entities and/or a cloud server). In some examples, data store 226 may include a general data store 230, an operational data store 232, and an entity-based data store 234. Within each of the data stores 230, 232, and 234 is stored data. Depending on the structure of the particular data store, certain data stores may include rules for reading and writing. The data stores 230, 232, and 234 may include records, tables, arrays, and the like, which may be relational or non-relational. Depending on the data store, records for individual entities, operational and analytics information, output data from one or more generation components 204, and the like may be retained. The data within the data stores 230, 232, and 234 include elements or tags such that a particular data (e.g., for a single entity, protocol, etc.) may be retrieved.

Access control engine 222 is configured to control access to features of transformative engine 202, including access to the data retained in data store 226. For example, access control engine 222 may verify that a user device such as user device 228 is authorized to access data store 226. To verify the user device 228, access control engine 222 may require that a user of the user device 228 input a username and password, have a profile associated with the interaction system, have paid a subscription fee associated with access to data store 226, and the like. Access control engine 222 may also verify that the user device 228 has an IP address or geographical location that corresponds to an authorized list, that the user device 228 may include a plug-in for properly accessing data store 226, that the user device 228 is running certain applications required to access data store 226, and the like.

Figure 3:
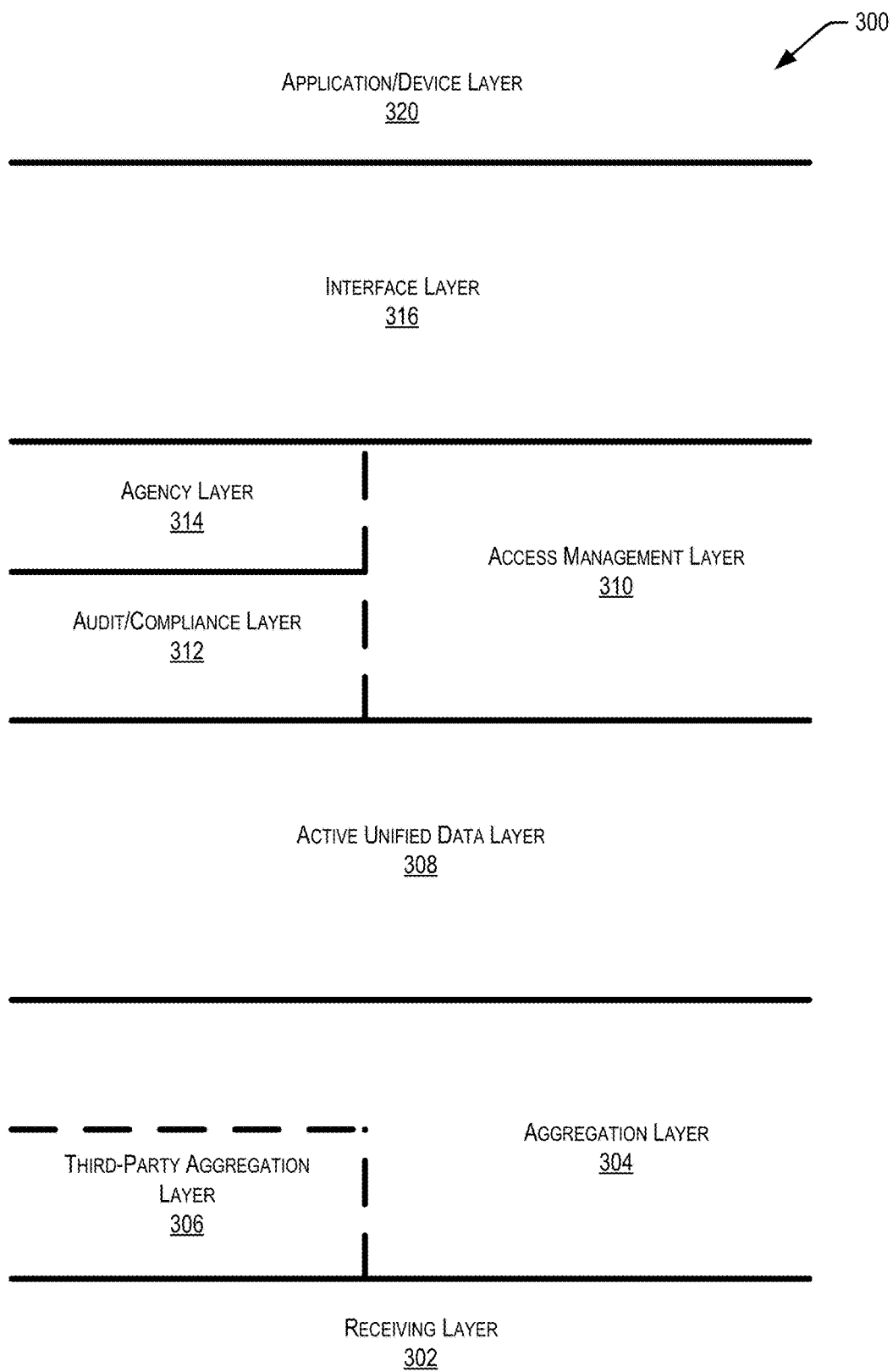
FIG. 3 illustrates a block diagram of an architecture stack of the control system, in accordance with embodiments of the present disclosure.

Turning next to FIG. 3, an architecture stack 300 of the control system 101 is shown. In some examples, techniques relating to control of data are implemented in accordance with architecture stack 300. And while architecture stack 300 is illustrated as having a particular structure, it is understood that other structures, including those with more or less layers than illustrated, is within the scope of this specification. In some examples, architecture stack 300 is implemented across an interaction system having a plurality of systems belonging to the same client or spread across different clients. Thus, architecture stack 300 may be used to integrate different systems of different entities and the like and to provide a fluid sharing of information among elements within the interaction system and without the interaction system. In some instances, a multi-layer part of architecture stack 300 is implemented at a single system or device within an interaction system.

The different layers of architecture stack 300 will be described generally with reference to FIG. 3 and in detail with reference to subsequent figures. Architecture stack 300 may include a receiving layer 302 as the bottom-most layer. Receiving layer 302 may include receiving data from elements that share data with other elements within an aggregation layer 304. For example, as detailed herein, receiving layer 302 may include receiving data from generation components that generate data. As such, receiving layer 302 is where data that has been created is received. In some examples, the data within receiving layer 302 may be in its raw formats. The output may then be transmitted to aggregation layer 304. In some examples, components of receiving layer 302 may have complimentary layers to facilitate data transfer. For example, the components may include a data generation and/or a data transmission layer for providing data to receiving layer 302.

Elements of aggregation layer 304 aggregate the data generated by the elements of receiving layer 302. For example, the elements of aggregation layer 304 may include aggregation engines that collect data from generation components located within receiving layer 302. Such aggregation may be performed periodically, in response to a user request, according to a temporal specification, or in any other suitable manner. In some examples, data of aggregation layer 304 may be aggregated according to input and/or rules and may aggregate across records pertaining to, e.g., a premises, entity, time period, characteristic (e.g., demographic characteristic or condition), outcome, and any other suitable input and/or rules. The aggregation may include compiling the data, generating a distribution, generating a statistic pertaining to the data (e.g., average, median, extremum or variance), converting the data, transforming the data to different formats, and the like.

Next, architecture stack 300 may include an active unified data layer 308. Elements of active unified data layer 308 receive data from the elements of the other layers and store such data in a unified manner. In some examples, this may include storing the data in a manner that allows for searching and retrieval using a defined set of method calls, techniques, and or procedures. For example, the data may be stored such that a different application may access the data in a standard or unified manner. Thus, elements of active unified data layer 308 may receive information collected or generated within aggregation layer 304 and make certain adjustments to the data (e.g., translations, tagging, indexing, creation of rules for accessing the data, conversion of formatting of the data, generation of compressed versions, and the like) prior to retaining the data within one or more data stores accessible within active unified data layer 308.

Architecture stack 300 also may include an access control layer 310, which may include an audit/compliance layer 312 and/or an agency layer 314. Access control layer 310 may include elements to control access to the data. For example, access control layer 310 may include elements to verify user login credentials, IP addresses associated with a user device, and the like prior to granting the user access to data stored within active unified data layer 308. Audit/compliance layer 312 may include elements to audit other elements of architecture stack 300 and ensure compliance with operating procedures. For example, this may include tracking and monitoring the other elements of access control layer 310.

Agency layer 314 may include an access location (e.g., a virtual private network, a data feed, or the like) for elements of agencies that are interested in the operations of the interaction system in which architecture stack 300 is implemented. For example, agency layer 314 may allow an entity access to some elements within architecture stack 300. This may be achieved by providing the entity a direct conduit (perhaps by a virtual private network) to the elements of access control layer 310 and the data within active unified data layer 308. Audit/compliance layer 312 and agency layer 314 are sub-layers of access control layer 310.

Architecture stack 300 also may include interface layer 316. Interface layer 316 provides interfaces for users to interact with the other elements of architecture stack 300. For example, clients, entities, administrators, and others belonging to the interaction system may utilize one or more user devices (interacting within application/device layer 320) to for sending and receiving communications via the active unified data layer 308. In some examples, the users may be unrelated to the interaction system and may use applications (not shown) to send and receive communications via one or more interfaces (e.g., to access data stored within active unified data layer 308).

Further, the architecture stack 300 may include application/device layer 320. The application/device layer 320 may include user devices and applications for sending and receiving communications via the elements of the interface layer 316. For example, the applications may be web-based applications, portals, mobile applications, widgets, and the like for sending and receiving communications (e.g., messages). These applications may run on one or more user devices. The user devices may be any suitable user device as detailed herein.

Figure 4:
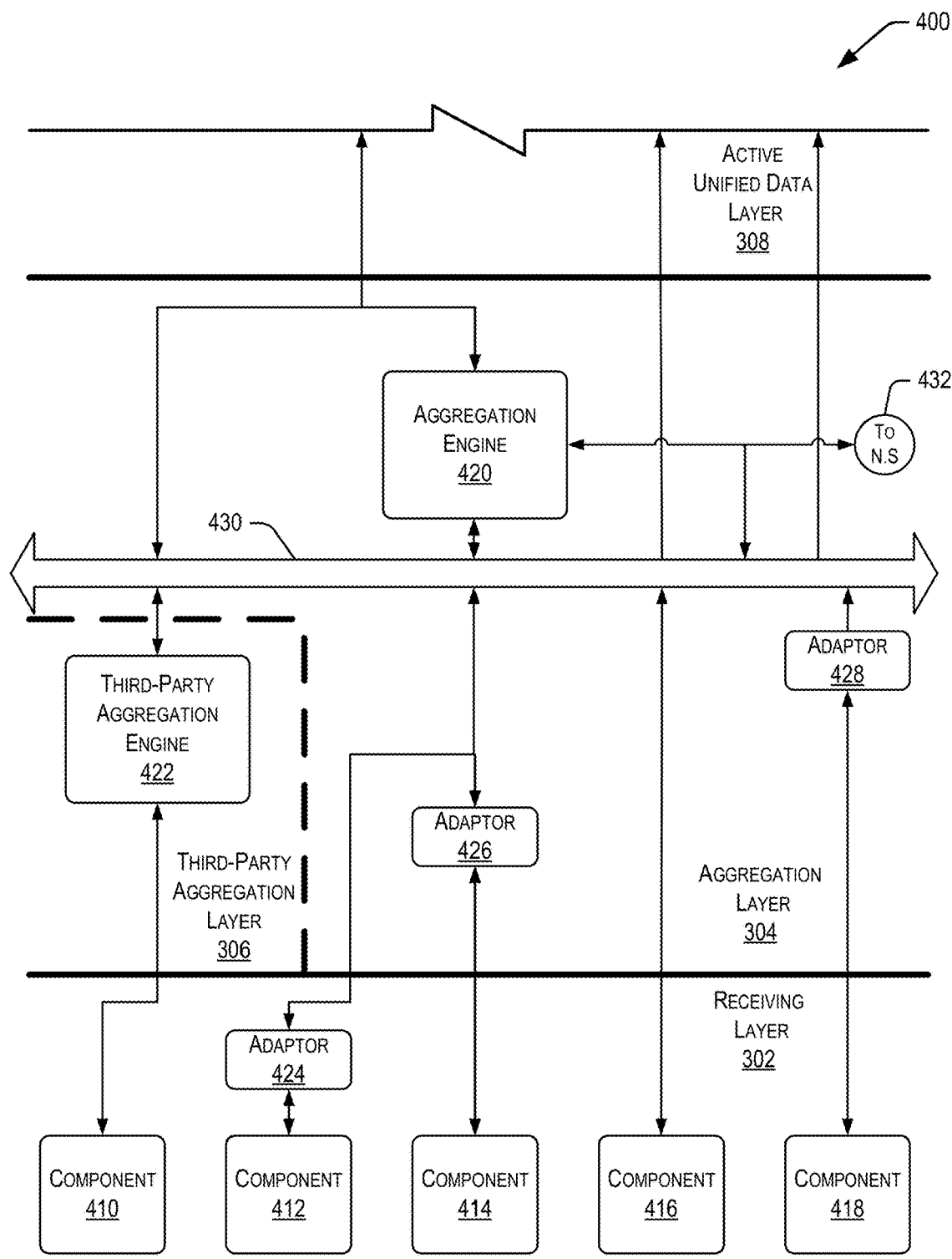
FIG. 4 illustrates a block diagram of a portion of the architecture stack, in accordance with embodiments of the present disclosure.

Turning next to FIG. 4, a diagram 400 is shown that depicts a portion of architecture stack 300 according to an embodiment of the present disclosure. In particular, the diagram 400 may include receiving layer 302, aggregation layer 304, aggregation layer 306, and a portion of active unified data layer 308. Receiving layer 302 receives data from one or more components 410-418. Components 410-418 are examples of one or more generation components 204. Components 410-418 may be spread across multiple premises. In some examples, components 410-418 may include complimentary layers to facilitate data transmission. For example, components 410-418 may include a transmission layer, generation layer, and/or a receiving layer to communicate data at receiving layer 302 and, in some examples, receive data from receiving layer 302.

In some instances, two or more of components 410-418 generate data according to different formats. The data may then be transformed, translated, or otherwise adjusted before an aggregation engine 420 (e.g., aggregation engine 218) or an aggregation engine 422 (e.g., aggregation engine 218) collects the data. In some examples, the adjustment takes place within receiving layer 302. Thus, an adaptor 424 is associated with component 412 located in receiving layer 302. Adaptor 424 is an example of transformative adaptor 216. Adaptor 424 is implemented, as appropriate, in hardware, software, or any suitable combination of both. For example, transformative adaptor 216 may be a bolt-on adaptor that adjusts data as such data leaves component 412.

Other adaptors, such as adaptor 426 and adaptor 428, are implemented within aggregation layer 304. These adaptors may function in a similar manner as adaptor 424. In some examples, the data provided by component 414 is transmitted through adaptor 426 prior to being directed to aggregation engine 420. The data provided by component 416 is transmitted through aggregation layer 304 and/or enters aggregation engine 420 without having first traveled through an adaptor. The data provided by component 418 is transmitted through aggregation layer 304 and through adaptor 428. In some examples, component 418 provides for streaming of data. The data provided by component 410 is transmitted directly to aggregation engine 422.

In some examples, data provided by the components 410-418 may be communicated via a messaging bus 430 (e.g., the one or more networks 236). The data, in the form of messages may be put on the one or more networks 236 by the one or more components, by the aggregation engine 420, by the engine 422, and by any other suitable device capable of generating messages. In some examples, messages are taken off of the messaging bus 430 by the aggregation engine and/or by one or more listeners described in more detail herein. Thus, circle 432 indicates that data (e.g., messages) may flow from the messaging bus 430 to a notification service and processed in accordance with techniques described herein.

Aggregation engine 420 and aggregation engine 422 function in a similar manner. In some examples, aggregation engine 422 is operated by a different entity than the entity that operates aggregation engine 420. This may be because the data collected by aggregation engine 422 differs in some way from the data collected by aggregation engine 420. In any event, aggregation engine 420 is configured to perform integration of data, including generic integration. For example, aggregation engine 420 performs one or more operations on data including tagging, logging, and protocol conversion. Aggregation engine 420 also supports one-to-many communications of data. In some examples, data flows between aggregation engine 420, the aggregation engine 422, and some of components 410-418 and elements of active unified data layer 308.

Figure 5:
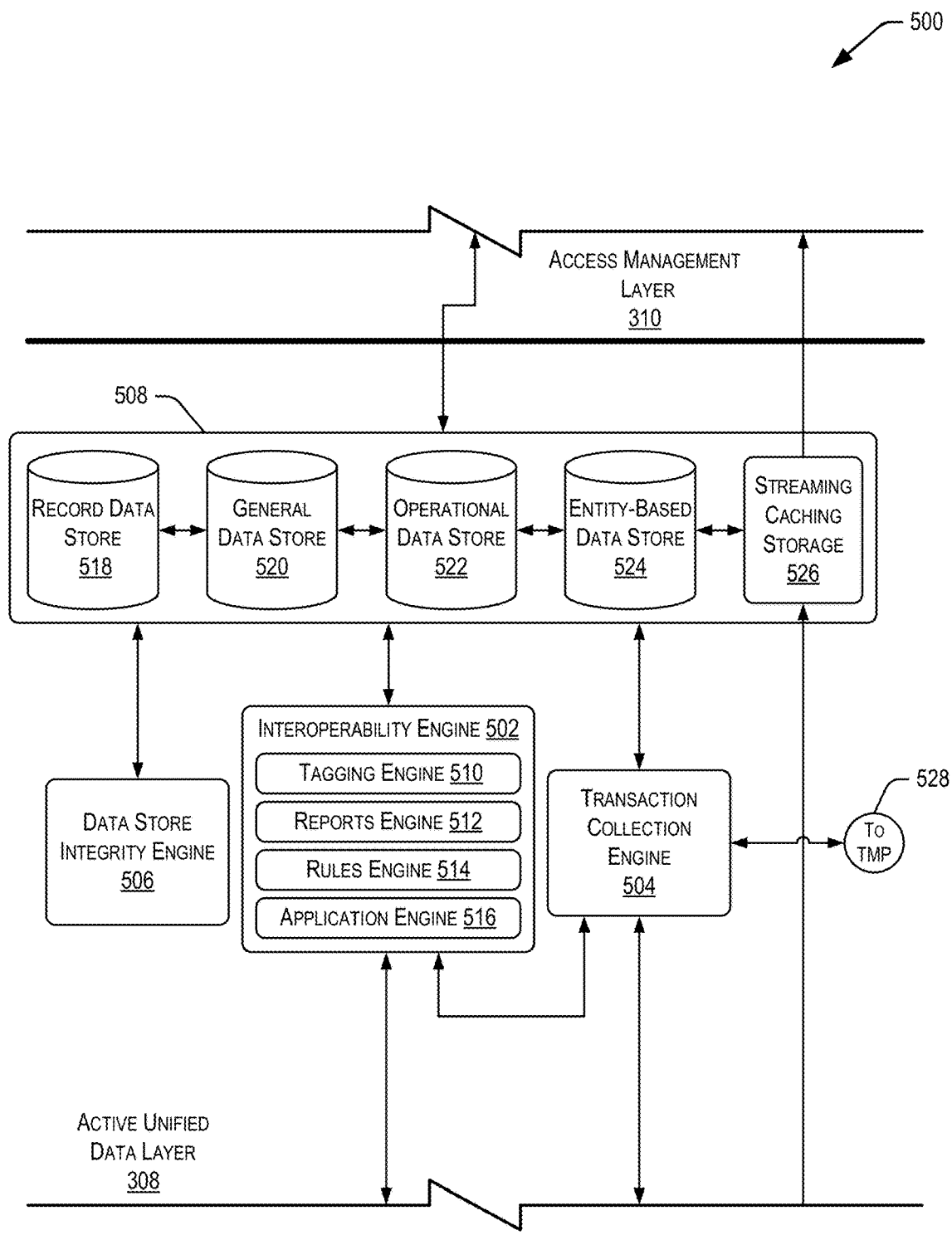
FIG. 5 illustrates a block diagram of a portion of the architecture stack, in accordance with embodiments of the present disclosure.

Referring next to FIG. 5, a diagram 500 is shown that depicts a portion of architecture stack 300 according to an embodiment of the present disclosure. In particular, diagram 500 may include active unified data layer 308 and a portion of access control layer 310. Active unified data layer 308, as illustrated in diagram 500, may include an interoperability engine 502 (e.g., interoperability engine 220), a interaction control collection engine 504, a data store integrity engine 506, and a data store 508 (e.g., data store 226). Generally, interoperability engine 502 receives data from elements within aggregation layer 304 (e.g., from aggregation engine 420) and performs one or more operations with respect to the data. Interoperability engine 502 also facilitates storage of at least a portion of the processed information in data store 508.

Interaction control collection engine 504 is implemented as part of control engine 104. Interaction control collection engine 504 is configured to generate message indicators identifying flows of data by and between elements of an interaction system implemented using the techniques described herein. The flows of information include messages which include data, and the message indicators include unique message identifiers that may be used to identify the messages. The unique message identifiers include information that may be used for unique identification of the messages. For example, a unique message identifier for a particular message may include a concatenation of the following information stored in a table: a source application, a premises, a message type, and a message control identification (ID). The unique message identifier may also be the message control ID. The unique message identifier may be created as messages including data are transmitted from aggregation layer 304. The table may be stored in association with the interaction control platform 528.

In some examples, the table also may include information for tracking the progress of the message from an origination node to a destination node. For example, typically when a message (e.g., any communication of data) is first received by transformative processing engine 102 (e.g., interoperability engine 502), control engine 104 (e.g., interaction control collection engine 504 of control engine 104) may generate a unique identifier for the message in order to track that message as it moves throughout the interaction system. The unique identifier may be included in the header of the message such that when the next node (e.g., component, device, server, etc.) after transformative processing engine 102 receives the message, that node may report back to control engine 104 that it saw the message. In this manner, control engine 104 may enable end-to-end tracking of messages for the life of the message.

In one example, the messages are requests. The requests may be generated based om input at one of the components. The requests may be received by transformative processing engine 102 and integrated into the system. In some examples, control engine 104 may be notified that the requests have been received and may therefore be configured to generate message IDs for each request. These message IDs may then be associated with each of the requests. As the requests continue to move throughout the interaction system (e.g., away from transformative processing engine 102), control engine 104 may be track their movement using the message IDs. If one of the requests does not make it to its destination, control engine 104 (or part of the interaction control platform 528) may determine why the request was stopped. In some examples, this cause may be hardware related (e.g., an unplugged Ethernet cable, a broken router, etc.), software related (e.g., a router routing to the wrong location), or any other reason for orders not arriving at their correct destination.

In some examples, control engine 104 (e.g., interaction control collection engine 504 of control engine 104) may receive the message and/or message identifier directly from one of components 410-418. For example, one of components 410-416 may be configured to generate the unique message identifier and/or communicate directly with control engine 104. The message also may travel via one or more intermediate nodes on its way to the destination node. In some examples, a node is a component such as components 410-418, which may be running an application. In some examples, the unique identifier and the routing of the message to its destination may be stored in a table that also may include: a geolocation of each node, a network from which the message originated, a type of node, the unique node identifier, and a time associated with the message leaving the origination node. In some examples, interaction control collection engine 504 provides unique message identifiers to other elements of the interaction system to monitor the messages as they move throughout the interaction system. Interaction control collection engine 504 also provides a portion of the unique message identifiers to an interaction control platform (indicated by a circle 528) for further analysis of the message identifiers. Such analysis may include reconciliation of lost messages, latency reporting, audit control and compliance, and other such analyses. As mentioned previously, the interoperability engine 502 may be configured to store data in the data store 508. A plurality of sub-engines 510-516 of the interoperability engine 502 may be configured to perform operations relating to storing data in the data store 508.

Interoperability engine 502 may include a tagging engine 510 configured to perform semantic tagging and indexing of data. Tagging engine 510 therefore is configured to receive data, read metadata associated with the data, semantically scan the content of the data, and associate one or more tags with the data. Tagging engine 510 may therefore have access to hundreds, thousands, or even more possible tags. These tags may have been input by users, learned, pre-defined, generated by eternal mapping sources, and/or gathered from other components and/or data stores of the interaction system. For example, if the data is a chart for an entity, the tagging engine may be configured to read any metadata associated with the chart to determine which tags may be appropriate to associate with the chart. From the metadata, tagging engine 510 may determine that the chart is for a type of entity by reading metadata indicating that an author field is populated with the name of another particular type of entity. Tagging engine 510 may have access to other data to compare the analyzed metadata against. Other examples, of metadata that may be included in one or more fields include author, document type, creation time, last update time, upload time and data, geographic location, unique ID associated with the client or premises where the data originated, and other similar fields. The tags may be stored in association with the data (e.g., the chart) and/or may be stored independent from the data but include an identifier such that when searching tags the data may be capable of population.

Continuing with the example from above, if the data is a chart for a first type of entity, tagging engine 510 may be configured to read the content of the chart to determine which tags may be appropriate to associate with the chart. For example, this may comprise analyzing the content of the chart (i.e., individual pages) semantically to look for artifacts (e.g., keywords, phrases, and the like) in the content. These artifacts may be identified by tagging engine 510 and used to decide which tags to associate with the document. In some examples, semantic scanning may include filtering out words (e.g., articles, such as "a" and "the"), phrases, and the like. Similar to the reading of metadata, the tags may be pre-defined, user-defined, learned, and the like. In some examples, reading metadata associated with messages may provide meaning and/or give context to the particular record of data. This meaning and/or context may assist tagging engine 510 to determine one or more tags to associate with the data. The tags may be chosen, for example, based on values of particular fields in the data, detecting a frequency of one or more words in a document or metadata and/or of a set of related words. In this manner, tagging engine 510 may also index portions of the data within one or more data stores of data store 508. In some examples, such indexing may be based in part on the selected tags.

Interoperability engine 502 also may include a reports engine 512 configured to generate one or more reports or alerts based on data. For example, reports engine 512 may generate reports when certain types of data are received or when data with certain characteristics is received. Reports engine 512 may also generate alerts. The reports and/or alerts generated by reports engine 512 may be outputted in the form of one or more communications to an administrator, an authorized user, or other similar user via a user device. Such communications may include, for example, signals, sirens, electronic notifications, popups, emails, text messages, and the like. Content of such communications may include information characterizing a performance metric, efficiency and/or outcomes; identifying concerning patterns; identifying losses of data; and the like. In some examples, the content is presented in the form of one or more documents, tables, figures, charts, graphs, and the like.

Interoperability engine 502 also may include a rules engine 514 configured to create and control operational rules, condition-response rules, alert/reports rules, data-formatting rules, data-sharing rules, transmission rules, aggregation rules, user authorization rules, and other similar rules. Such rules may be user-defined, fixed, learned by elements of the interaction system, and any combination of the foregoing. Finally, interoperability engine 502 may include an application engine 516 configured to provide service-oriented architecture web services.

Data store 508 may include an electronic/digital record information data store 518 ("record data store 518"), a general data store 520, an operational data store 522, an entity-based data store 524, and a streaming caching storage 526. While data store 508 is illustrated as including a fixed number of data stores and storage elements, it is understood that data store 508 may include any suitable number of data stores and storage elements, including more than illustrated or less than illustrated.

In some examples, a data query script is provided to query a first data store and/or to obtain data for populating a data store. Such script could query a data store described herein (e.g., data store 508) and/or could be used to obtain data to populate a data store described herein (e.g., data store 508). In one instance, the script is configured to be repeatedly executed, so as to repeatedly draw data from a source data store. The retrieved data may then be formatted, filtered, sorted and/or processed and then stored, presented and/or otherwise used. In this manner, the script may be used to produce streaming analytics.

In some instances, the data query script, when executed, identifies each of the data stores of interest. Identifying the data stores of interest may include identifying at least a portion of data from the data stores simultaneously and/or sequentially. For example, the script may identify corresponding data stores (e.g., or components of a single data store or multiple data stores) that pertain to one or more similar variables but that differ in one or more other variables. Once the portion of the data from the data stores is identified, a representation of the identified data may be output to one or more files (e.g., Extensible Markup Language (XML) files) and/or in one or more formats. Such outputs may then be used to access the data within one or more relational database accessible using Structured Query Language (SQL). Queries made using SQL may be made sequentially or in parallel. Results from an SQL query may be stored in a separate database or in an XML file that may be updated either in part or as a whole. The data query script may be executed periodically, in accordance with a user-defined rule, in accordance with a machine-defined or machine-learned rule, and in other suitable manner.

Within record data store 518 is retained data including electronic record information. In some examples, the information within record data store 518 is organized according to entity identifying information. Thus, record data store 518, in some examples, may include individually identifiable information. But it may also include de-identified information.

Within general data store 520 is retained data. The data may be stored in a relational database format or in any other suitable format. Thus, the data within general data store 520 may be retained in a data structure that may include one or more tables capable of accessing each other. In some examples, general data store 520 may include a subset of the information that is included in operational data store 522.

Within operational data store 522 is retained data in a relational database format. Thus, the data within operational data store 522 may be retained in a data structure that may include one or more data structures (e.g., tables) capable of accessing each other. Operational data store 522 is an example of an operational data warehouse. In operational data store 522 is joined many different types of data. In some examples, the operational data ware house 522 may include data pertaining to decision making as discussed herein and other data typically used by conventional operational concerns.

Within entity-based data store 524 is retained data in a non-relational database format. Thus, the data within entity-based data store 524 may be retained in a structure other than tables. Such structure may be appropriate for large and complex data sets. In some examples, entity-based data store 524 (or any other data store) may be a unified system, which may include: a document-centric, schema-agnostic, structure-aware, clustered, interactional, secure, database server with built-in search and a full suite of application services. An example of such a unified system may be Marklogic. Entity-based data store 524 may support data aggregation, data structuring, data indexing, data tagging and mapping to semantic standards, concept matching, concept extraction, machine learning algorithms, concept discovery, concept mining, and transformation of record information. In some examples, entity-based data store 524 may include data pertaining to decision making (similar to general data store 520) as discussed that is organized and accessed in a different manner. For example, the data within entity-based data store 524 may be optimized for providing and receiving information over one or more information exchanges. In some examples, entity-based data store 524 may include a subset of the information that is included in operational data store 522.

Finally, in some examples, streaming caching storage 526 is a streaming data cache data store. As discussed previously, certain components of components 410-418 may support streaming data to other components or user devices. Streaming caching storage 526 is a location where streaming data may be cached. For example, assume that component 418 is a piece of equipment operating at Location A and that a user using a computer in Location B desires to view a live of substantially live stream of outputs of the piece of equipment. Component 418 may send a portion of data to streaming caching storage 526 which may retain the portion of the data for a certain period of time (e.g., 1 day). Thus, streaming caching storage 526 is configured to cache data that may be streamed.

Diagram 500 also may include data store integrity engine 506. In some examples, data store integrity engine 506 is configured to ensure integrity of the information within data store 508. For example, data store integrity engine 506 applies one or more rules to decide whether information within all or part of data store 508 should be scrubbed, removed, or adjusted. In this manner, confidence is increased that the information within data store 508 is accurate and current.

Figure 6:
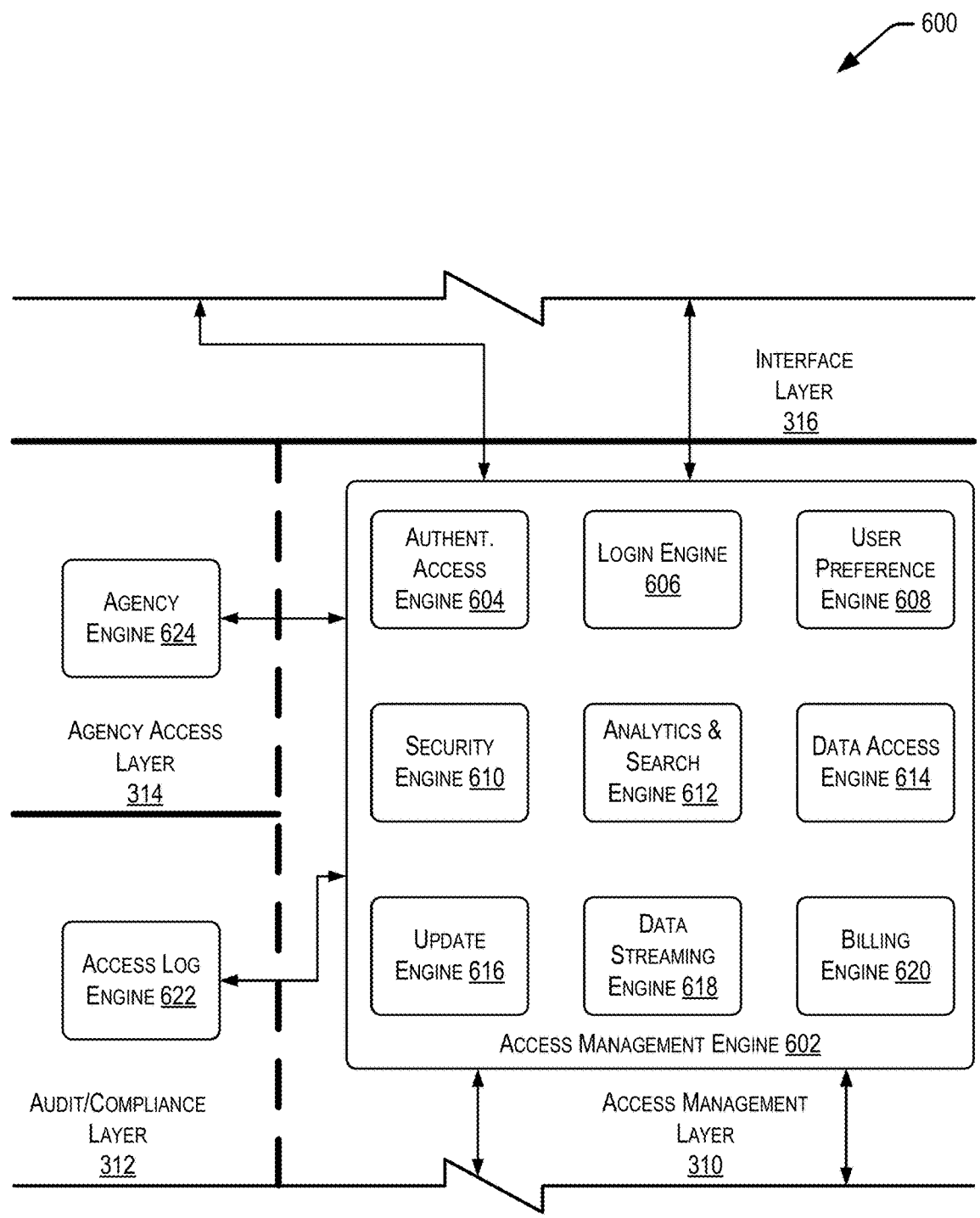
FIG. 6 illustrates a block diagram of a portion of the architecture stack, in accordance with embodiments of the present disclosure.

FIG. 6 shows a diagram 600 which depicts a portion of architecture stack 300 according to an embodiment of the present disclosure. In particular, the diagram 600 may include access control layer 310, audit/compliance layer 312, agency layer 314, and a portion of interface layer 316. Access control layer 310, as illustrated in the diagram 600, may include an access control engine 602. Access control engine 602 is an example of access control engine 222. Generally, access control engine 602 may be configured to control access to elements of transformative engine 202 by different components, applications, and user devices.

Access control engine 602 within access control layer 310 may also provide functionality similar to an operating system. For example, access control engine 602 may include a plurality of engines configured to control different aspects of interacting with elements of the interaction system. For example, a user who desires to access portions of data retained in data store 508, may do so by interacting with access control engine 602 using one or more applications (not shown). Thus, access control engine 602 may include a variety of engines to enable such interaction. The engines include, for example, an authentication access engine 604, a login engine 606, a user preference engine 608, a security engine 610, an analytics and search engine 612, a data access engine 614, an update engine 616, and a streaming data engine 618. The different engines of access control engine 602 may define routines, protocols, standards, and the like for interacting with elements of the interaction system.

Beginning first with authentication access engine 604, authentication access engine 604 evaluates the rules and conditions under which users may access elements of the interaction system; in particular, the conditions under which users may access data within data store 508. These rules and conditions may be user-defined (e.g., by an administrator or reviewer), learned over time, and/or may be dynamically updated and/or evaluated based on characteristics of the user or the user's device attempting to access the interaction system. The rules and conditions may indicate the types of users who have particular types of access within the interaction system. The type of access may also relate to the degree to which data is identified/de-identified. In some examples, a user desiring access to data provides certain identifying information and authentication access engine 604 authenticates an identity of the user.

Login engine 606 evaluates the rules and conditions under which users are able to log in to the interaction system or access applications associated with the interaction system. These rules and conditions may be user-defined (e.g., by an administrator), learned over time, and also may be dynamically updated and/or evaluated based on characteristics of the user or the user's device attempting to access the interaction system. Thus, while authentication access engine 604 evaluates the rules to determine which users may access the interaction system, login engine 606 evaluates the particular credentials, profiles, etc. of the users. For example, login engine 606 may confirm that an entered username (e.g., and password), provided biometric data or code or identifier in a scanned tag or badge matches that in an authorized user data structure.

Login engine 606 evaluates one or more user profiles associated with each authenticated user. In some examples, a user profile may include a username, password, and other information associated with the user. For example, a user profile may indicate characteristics about the user.

User preference engine 608 evaluates the rules and conditions under which user are able to store and update one or more user preferences corresponding to access of the interaction system or access to applications associated with the interaction system. These rules and conditions may be user-defined (e.g., by the user or administrator), and may include rules for default preferences. For example, using user preference engine 608, a user may indicate a format in which the user prefers to receive outputted information, display characteristics of a graphical user interface associated with the user, and other similar user preference settings. For example, the user may indicate that certain types of reports and/or alerts are to be sent to the user.

The security engine 610 evaluates the rules and conditions for ensuring the security of access to the elements of the interaction system. In some examples, these rules and conditions are determined by administrators of the interaction system. In some examples, the security engine 610 provides a plurality of computer virus protection services. These services can be called up and implemented when accessing the interaction system or accessing applications associated with the interaction system. For example, because the interaction system may include sensitive data, the security engine 610 may enforce a domain-based rule that protects certain sensitive information (e.g., identifying information).

Analytics and search engine 612 evaluates the rules and conditions under which users may search for data within the interaction system and access analytics relating to the interaction system. In some examples, these rules and conditions are user-defined or learned over time in accordance with search engine optimization techniques. For example, analytics and search engine 612 is used to search within data store 508 for particular data. Analytics and search engine 612 supports any conventional searching algorithms. For example, search engine 612 may be used to search within various fields and potential field values. In some examples, search engine 612 may provide analytics, such as statistics, graphs, distributions and/or comparative analysis pertaining to particular entities and/or characteristics. Such information may be selected by a user and presented on a user interface.

Data access engine 614 evaluates the rules and conditions under which users may operation in order to access particular data within data store 508. In some examples, these rules and conditions are user-defined or learned over time. For example, data access engine 614 may indicate the routines, subroutines, or other logic needed for an application to access certain portions of data store 508. For example, while authentication access engine 604 and login engine 606 may control which users may access parts of the interaction system, data access engine 614 may control how authenticated users access data within data store 508. To this end, data access engine 614 may enforce and/or evaluate certain rules managing how users access different components of the interaction system. In some examples, data access engine 614 may be used to actually access data within data store 508 (e.g., extract, download, or otherwise access). In some examples, data access engine 614 may define procedures, protocols, and the like for accessing data. The protocols and procedures for accessing data access engine 614 (like the other engines of access control engine 602) may be provided to developers in the form of a software development kit (SDK). SDKs may enable developers write applications that may effectively communicate with elements (e.g., data store 508) of the interaction system. In particular, applications that may access a portion of the data stored within active unified data layer 308.

Update engine 616 evaluates the rules and conditions for providing updates to other engines within access control engine 602, plug-ins for applications that access the interaction system, and for other similar elements of the interaction system. For example, updates may be generated at runtimes, at defined time intervals, upon request by a user, upon receiving a threshold quantity of new or changed data. Once an update is performed, an interface may be refreshed, a report may be sent indicating that the update was successful or unsuccessful, or the like.

Streaming data engine 618 defines the rules and conditions for enabling streaming of data between components and user devices of the interaction system. For example, streaming data engine 618 may enable component 414 to stream data. Streamed data may include live or substantially live audio or video feeds, results of tests, output from equipment or devices, and any other suitable type of data capable of being streamed. In some examples, the data may be streamed to other components or user devices within the network or outside the network. In order to establish a streaming transmission, streaming data engine 618 may identify a streaming destination and a streaming origin. Next, streaming data engine 618 may pair the two and enable streaming. This may include allocated bandwidth within one or more network devices associated with the interaction system. Streaming data engine 618 may also adjust the quality of the streaming data based on the availability of bandwidth. In some examples, streaming data engine 618 may receive incoming streams (and continuously present the stream or monitor for particular data (e.g., exceeding a threshold, exhibiting an above-threshold change, having a particular value)).

Within audit/compliance layer 312 is located an access log engine 622. Access log engine 622 evaluates the rules and conditions for logging access to the interaction system by users, applications, devices, and the like. Logging access may include, in some examples, logging data conventionally collected by access log engines running in similar environments. Access log engine 622 may use this data to generate and transmit reports, for example, to stakeholders of the interaction system such that they may make informed decisions regarding that is accessing the interaction system and for what purposes.

Within agency layer 314 is located an agency engine 624. Agency engine 624 evaluates the rules and conditions under which agencies may access the interaction system. For example, agencies that may use agency engine 624 include agencies to which the interaction system provides compliance, tracking, or other reporting information. For example, agency engine 624 may be used to track one or more performance indicators identified by an agency and/or to provide report instances of defined types of events. Thus, in some examples, an agency uses agency engine 624 to collect data pertaining to compliance of the interaction system with one or more statutes or regulations. In some examples, a university is an agency that uses agency engine 624 to collect data pertaining to one or more studies. In some examples, agency engine 624 may identify one or more entities (e.g., agencies) that are to receive reports pertaining to operations or events and what types of data are to be reported to those entities. Agency engine 624 may then collect the pertinent data, potentially format and/or analyze the data, and facilitate transmission of (e.g., raw, formatted and/or analysis of) the data to the appropriate agency.

Figure 7:
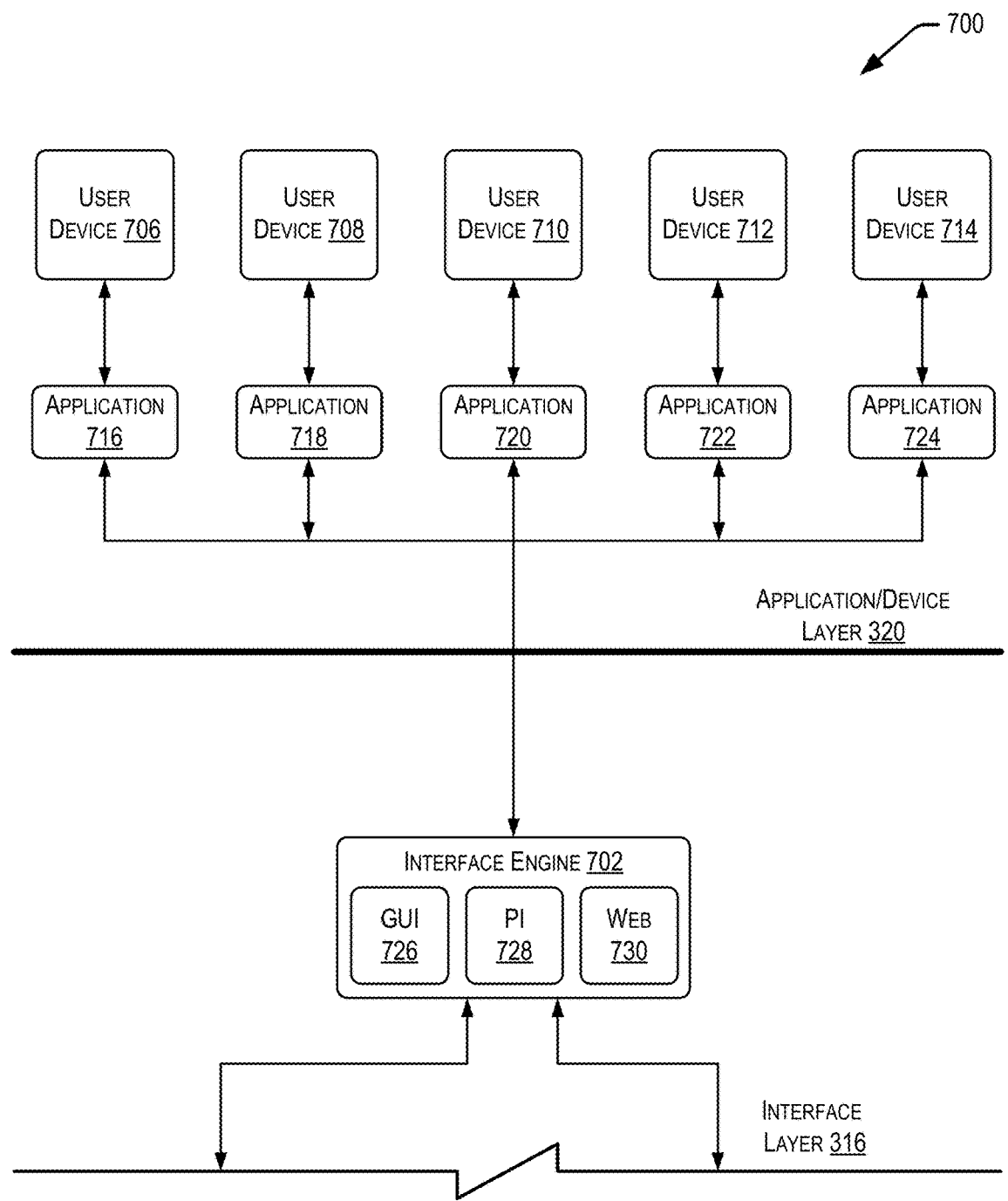
FIG. 7 illustrates a block diagram of a portion of the architecture stack, in accordance with embodiments of the present disclosure.

FIG. 7 shows a diagram 700 which depicts a portion of architecture stack 300 according to an embodiment of the present disclosure. In particular, diagram 700 may include interface layer 316, and application/device layer 320. Within interface layer 316 is located interface engine 702 (e.g., interface engine 224). Interface engine 702 is configured to generate one or more interfaces (e.g., graphical user interface 726, programmatic interface 728, and/or web interface 730) to enable data to flow to user devices 710, 712, and 714 via respective applications 720, 722, and 724. In some examples, the interfaces of interface engine 702 are embodied in hardware, software, or some combination of both. Within interface layer 316 communications and inputs directed to interacting with elements of access control layer 310 may be embodied.

Graphical user interface 726 is any suitable graphical user interface configured to interact with elements of the interaction system. Programmatic interface 728 may include an application programming interface, a programmatic user interface, and other similar interfaces for defining core functions for accessing elements of the interaction system. For example, programmatic interface 728 may specify software components in terms of their operations. Web interface 730 is any suitable web interface configured to interact with elements of the interaction system. Any of the interfaces described herein may be configured to receive input, present dynamic presentations that depend on input, and otherwise respond to input. In some examples, such input may be provided via one or more input devices (e.g., a keyboard, touchscreen, joystick, mouse, microphone, devices capable of capturing inputs, and the like) operated by one or more users of user devices 706-714. Output may be provided via one or more output devices (e.g., a display or speaker).

Interface engine 702 is utilized by applications internal to the interaction system and external to the interaction system to access data. In some examples, the applications that are internal include applications that are developed for internal use by various entities associated with the interaction system. In some examples, the applications that are external to the interaction system include applications that are developed for external use by those that are not associated with the interaction system.

Generally, within application/device layer 320, applications 716-724 which communicate with other elements of architecture stack 300 using the interfaces generated by interface engine 702 are defined. This may include detailing how applications 716-724 are to interact with the interfaces generated by interface engine 702 for accessing data. For example, interacting may include accepting inputs at user devices 706-714 to access data and, in response, providing the data, prompts, or other types of interaction with one or more users of the user devices 716-714. Thus, applications 716-724 may be related to one or more of the interfaces generated by interface engine 702. For example, application 720 may be interact with a graphical user interface (whether generated by interface engine 702 or otherwise) to interact with other elements of the interaction system. Interacting may include receiving inputs at the graphical user interface via application 720, providing output data to the graphical user interface application 720, enabling interaction with other user devices, other applications, and other elements of the interaction system, and the like. For example, some of the inputs may pertain to aggregation of data. These inputs may include, for example, types of data to aggregate, aggregation parameters, filters of interested data, keywords of interested data, selections of particular data, inputs relating to presentation of the data on the graphical user interface, and the like. Providing output data may include providing the aggregated data on the graphical user interface, outputting the information to one of the other user devices 706-714 running one of the other applications 716-724.

Turning now to the details of applications 720, 722, and 724. In some examples, applications 720, 722, and 724 include a variety of different applications that may be designed for particular users and/or uses. In one example, application 720 may include dashboards, widgets, windows, icons, and the like that are adapted for an particular entity. In some examples, application 720 may present different data depending on a specialty associated with the entity and protected information associated with the entity. In this manner, application 720 adapts and automatically adjusts depending on the context in which the entity is using the application. In some examples, the data indicates performance statistics for the entity, metrics relating to where the entity falls along a distribution of other similar entities, outlier instances, trends in events or actions, and the like. Application 720 may be configured to receive input, adjust presentations, present unprompted alerts, adjust display of content, move more relevant content to the foreground, move less relevant content to the background, populate forms for the entity.

In another example, application 722 may be specific for resources or types of resources. In this example, application 722 may include dashboards, widgets, windows, icons, and the like that are adapted to individual resources. Similar to the example discussed above, in some examples, application 724 may present different data depending on a position of the resource. In this manner, application 722 adapts and automatically adjusts depending on the context in which the application is being used. For example, the resource may receive data, such as test results. In some examples, the application 722 (or any other application) may be configured to operate on a mobile device.

In some examples, application 724 may be a multi-role application for administrators and is used to control entities constitute the population of the entities within the interaction system. Similar to the other examples discussed, in some examples, application 724 may present different data depending on a role of the user who is using application 724. In this manner, application 724 adapts and automatically adjusts depending on characteristics of the user who is using application 724. In this manner, application 724 may provide different data depending on the role of the user. For example, whether data presented may include identifiable or de-identified information may depend on a position of the user.

In some examples, application 724 may be an operational intelligence application. In this example, application 724 is used to display operational information generated by components of the interaction system. This operational information may be used for operations, programming, and forecasting. Such operational information may include data because such data may impact operations, programming, forecasting, and the like. Accordingly, application 724 may present de-identified information in the form of one or more metrics, indicators, or the like as they pertain to operational intelligence.

Applications 716 and 718 shown in connection with interface engine 702 are applications developed by third-parties. In some examples, such applications include any suitable application that benefits from accessing data. The interaction system may include data pertaining to hundreds of thousands of entities. Having data pertaining to so many entities presents security concerns. For example, much of the data may be identifying data. Accordingly, data that may be accessed by applications 716 and 718 may be limited. In some examples, an entity of the interaction system may use one of applications 716, 718 to access his or her own data. In this example, the identity of the entity may be verified in accordance with techniques described herein.

User devices 706-714 are any suitable user devices capable of running applications 716-724. User devices 706-714 are examples of the user device 228. In some examples, the user devices include: mobile phones, tablet computers, laptop computers, wearable mobile devices, desktop computers, set-top boxes, pagers, and other similar user devices. In some examples, at least some of user devices 706-714 are the same devices as at least some of the one or more components 410-418. In some examples, user devices 706-714 may include complementary layers to application/device layer 320 and/or receiving layer 302. For example, user devices 706-714 may include a transmission layer, a generation layer, and/or a receiving layer to communicate data at application/device layer 320 and at receiving layer 302.

Figure 8:
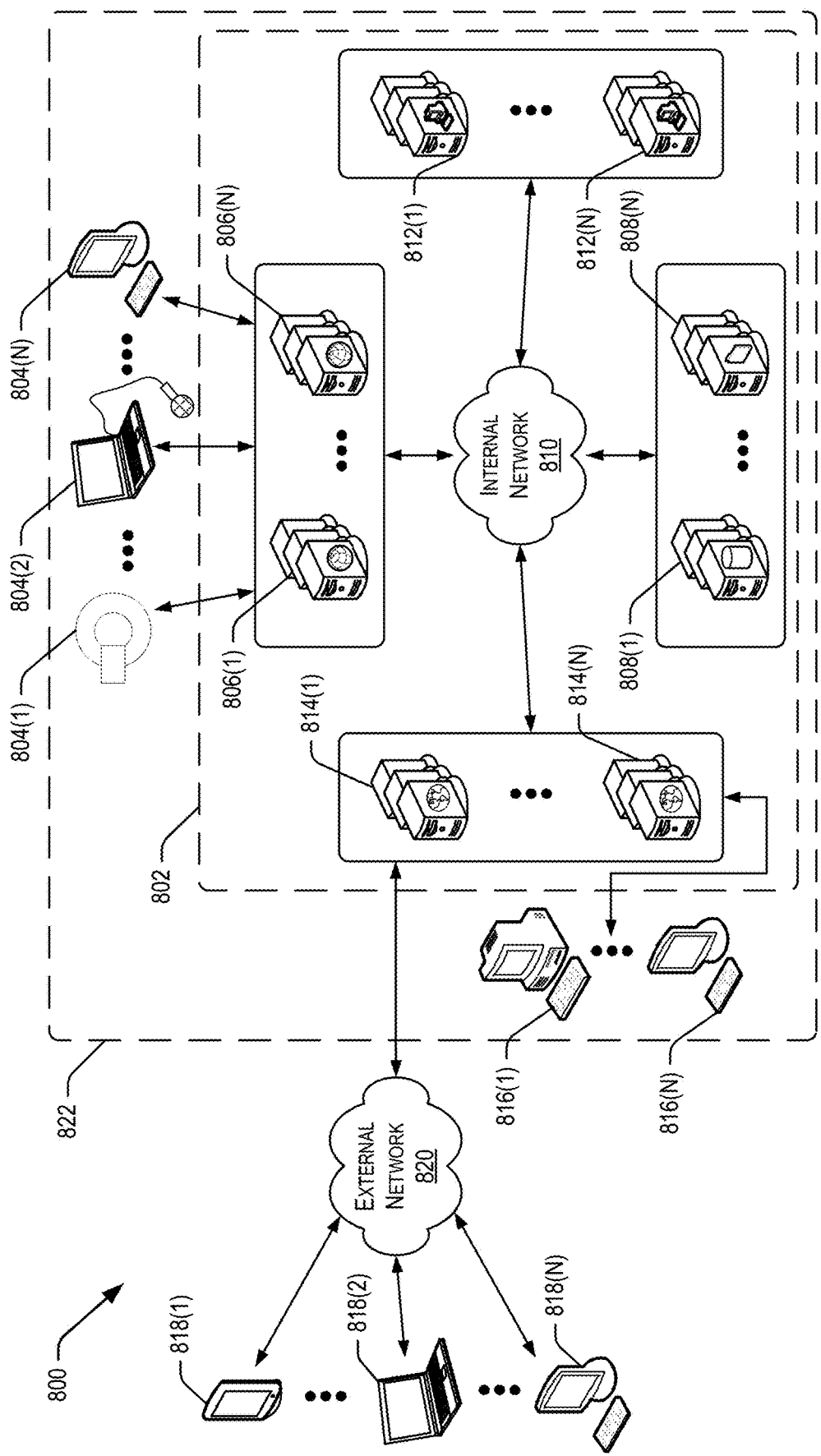
FIG. 8 illustrates an example schematic architecture of the interaction system, in accordance with embodiments of the present disclosure.

Turning now to FIG. 8, an interaction system 800 is shown in accordance with embodiments of the present disclosure. Interaction system 800 may correspond to interaction systems 100, 200 and may include an internal system 822 including a transformative engine 802. The transformative engine 802 is an example of transformative engine 202 previously discussed. Interaction system 800 is illustrated as an example configuration for implementing the techniques described herein. In particular, a configuration of elements as illustrated in FIG. 8, at least in some examples, communicates according to the layers of architecture stack 300. For example, internal system 822 may include generation components 804(1), 804(2), and 804(N) which provide data to aggregation servers 806(1)-806(N).

Generation components 804(1), 804(2), and 804(N) operate in accordance with receiving layer 302. In some examples, generation component 804(1) is a piece of equipment, generation component 804(2) is computer with a data collection device, a type of lab system, and generation component 804(N) is a terminal. Aggregation servers 806 (1)-806(N) operate in accordance with aggregation layer 304. Aggregation servers 806(1)-806(N) share data with data storage servers 808(1)-808(N) via one or more internal network(s) 810 that may correspond at least in part to the one or more network that may correspond at least in part to the one or more networks 120. In some examples, internal network 810 is any suitable network capable of handling transmission of data. For example, internal network 810 may be any suitable combination of wired or wireless networks. In some examples, internal network 810 may include one or more secure networks. Data storage servers 808(1)-808(N) are configured to store data in accordance with active unified data layer 308. Data storage servers 808(1)-808(N) include database servers, file storage servers, and other similar data storage servers.

Access control servers 812(1)-812(N) control access to the data retained in the data storage servers 808(1)-808(N). Access control servers 812(1)-812(N) communicate with the other elements of interaction system 800 via internal network 810 and in accordance with access control layer 310. Interface servers 814(1)-814(N) provide one or more interfaces applications to interact with the other elements of interaction system 800. Interface servers 814(1)-814(N) provide the one or more interfaces and communicate with the other elements of interaction system 800 via internal network 810 and in accordance with interface layer 316. The interfaces generated by the interface servers 814(1)-814(N) may be used by internal user devices 816(1)-816(N) and external user devices 818(1), 818(2), and 818(N) to interact with elements of interaction system 800.

Internal user devices 816(1)-816(N) are examples of user devices 706-714. In some examples, internal user devices 816(1)-816(N) run applications via the interfaces generated by interface servers 814(1)-814(N). As an additional example, external user devices 818(1), 818(2), and 818(N) may run applications developed by third parties that access the other elements of interaction system 800 via the interfaces generated by interface servers 814(1)-814(N).

External user devices 818(1), 818(2), and 818(N) access the interfaces via external network 820 that may correspond at least in part to the one or more networks 120. In some examples, external network 820 is an unsecured network such as the Internet. External user devices 818(1), 818(2), and 818(N) are examples of user devices 706-714. External user device 818(1) is a mobile device. In some examples, the mobile device may be configured to run an application to access interaction system 800. Similarly, the other external user devices 818(2)-818(N) run applications that enable them to access interaction system 800. While interaction system 800 is shown as implemented using discrete servers, it is understood that it may be implemented using virtual computing resources and/or in a web-based environment.

The systems, environments, devices, components, models, and the like of FIGS. 1-8 may be at least partially used as a platform to implement tracking, comparison, learning, modeling, and reasoning of real-world activities using an integrated operational application of the system 101. Disclosed embodiments of the system 101 may provide for a singular, unifying platform for tracking, comparison, learning, modeling, reasoning, and controlling of resources and subsystems of federated resources. Disclosed embodiments according to the present disclosure may provide technological improvements for tracking performance metrics of resource-allocation systems. In various instances, resource-allocation systems may be internal to a premises or external to the premises. Technological improvements may be provided by a multi-tier resource orchestration system (herein referenced as "resource orchestration system") may include a process allocation subsystem configured to coordinate with resource-allocation systems to allocate resources to perform specified processes with specified loads. Among things, the platform may include a resource subsystem assignment platform that facilitates identification of resources, creation and development of resource specifications, identification of loads, creation and development of load specifications, determining assignments of resources to particular loads, determining resource subsystems assigned to particular loads, assigning resources to particular loads, modification of existing assignments of resources to particular loads, creating and modifying resource subsystems assigned to particular loads, and/or the like. The resource orchestration system may include a process allocation subsystem configured to allocate resources to perform specified processes with specified loads. Various embodiments of the resource orchestration system may provide for various allocation features based at least in part on auto-adaptation to changes in loads, load conditions, load locations, resources, resource conditions, and/or the like disclosed herein. The following figures further illustrate additional aspects of such a platform, with the system 101 providing the multi-tier resource orchestration system.

The system 101, which may include a process performance control system, may allow role-based access with respect to various subsystems of resources and/or various sets of resources. The role-based access may provide visibility into competency metrics, including performance metrics of particular resources and subsystem-level performance metrics of particular resource subsystems (e.g., subsets and sets of federated resources). Performance metrics may include process metrics such as key process indicators (e.g., operational efficiency metrics, overtime metrics, error metrics, and/or the like), rates of changes in performance metrics, rankings of resources and resources sets, and/or the like. The system 101 may track, model, reason, and learn resource process performance as process operations are completed. As part of that, the system 101 may compare detected, aggregated, consolidated, and differentiated process performance data (which may include, for example, time-stamped, recorded data stored by the application) with load record data and may include guided decision support for defining effective processes for like resource sets.

Further, as part of the tracking and modeling, the system 101 may derive subsystem-based phenotypes (e.g., unit-based phenotypes) that may include mathematical calculations for subsystem-level variance (e.g., unit-level variance corresponding to sets/subsets of resources). With respect to a particular subsystem, such variance may describe the relative stability of the subsystem from a baseline of predetermined normality. Subsystem-based phenotypes may be derived from a multiplicity of data domains that describe the interactions between one or more resources, one or more loads, and one or more operating environments. The subsystem-based phenotypes may further take into specifications of resources, loads, and processes.

Figure 9:
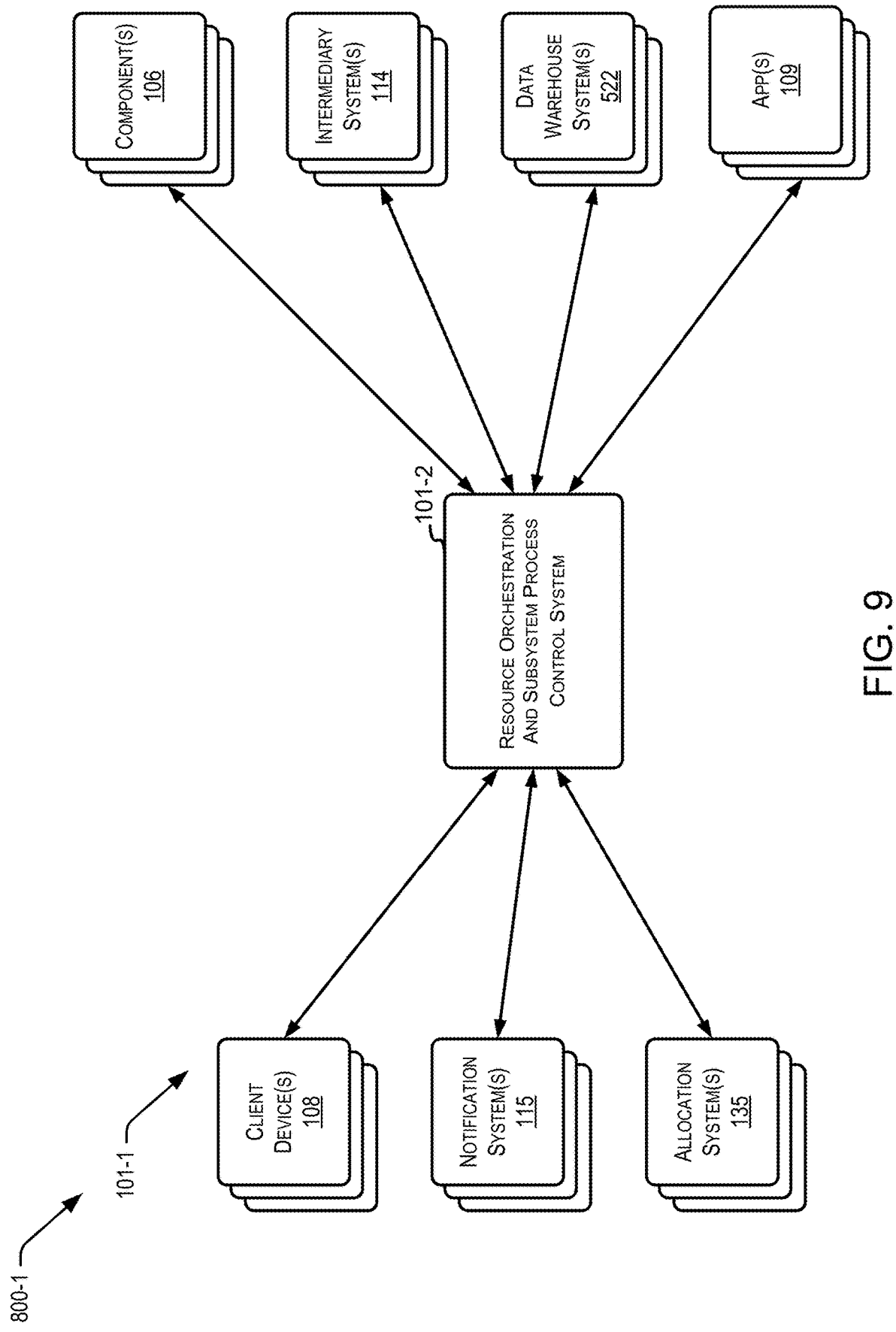
FIG. 9 illustrates a block diagram of aspects of the interaction system, in accordance with embodiments of the present disclosure.

FIG. 9 illustrates a simplified diagram of aspects of the interaction system 800-1 for implementing embodiments of the resource orchestration system, in accordance with the present disclosure. The system 101-1 may include a resource orchestration and subsystem process control system 101-2 ("resource orchestration subsystem 101-2" or "control system 101-2") communicatively coupled with one or more of the user devices 108, one or more of the components 106, one or more intermediary systems 114, one or more notification systems 115, one or more resource-allocation systems 135, one or more data warehouse systems 522, and/or one or more applications 109, one or a combination of which, in various embodiments, may be included in the system 101-1 or may be remotely located from the system 101. The resource orchestration subsystem 101-2 may be communicatively coupled with one or a combination of the aforesaid via one or more networks 810 and/or 820 and one or more APIs and other programming connections disclosed herein. In various embodiments, the user devices 108, the components 106, the intermediary systems 114, one or more notification systems 115, one or more resource-allocation systems 135, and/or the applications 109 may correspond to, for example, one or a combination of common notification platforms, notification and call systems using proprietary client messaging applications, mobile apps, smartTVs, smart speakers, short message service (SMS), a multimedia message service (MMS), an instant messaging service, text-to-voice, text-to-conference, text-to-chat, iMobile, Mobile Heartbeat, email, fax, voice, chat, and/or the like.

The resource orchestration subsystem 101-2 may correspond to a process scheduling subsystem configured to coordinate with resource-allocation systems 135 to temporally allocate resources to perform specified processes with specified loads. In addition or alternative, the resource orchestration subsystem 101-2 may include or otherwise be configured as a resource-allocation system 135, as well as be communicatively coupled to one or more resource-allocation systems 135. For example, in various instances, one or more of the resource-allocation systems 135 may be internal to a premises and/or one or more of the resource-allocation systems 135 may be external to the premises. In various embodiments, such allocations may include content composite generation and provisioning, automatic allocation, and/or provisional allocation provided via four override, acceptance, rejection, and/or modification via interface elements of the orchestration interface, disclosed further herein.

The system 101 may be configured to provide the resource control platform, for example, by way of the resource orchestration subsystem 101-2, which may function as a control system for resource allocation. Accordingly, the resource orchestration subsystem 101-2 may control and manage allocations and assignments of resources and subsystems of resources for the entire system 101. Further, the resource orchestration subsystem 101-2 may function as a hub for sharing assignment data for resources and resource subsystems with other systems, subsystems, interfaces, applications, and components—which may, for example, correspond to endpoints such as one or a combination of the user devices 108, the components 106, the intermediary systems 114, the notification systems 115, the resource-allocation systems 135, the data warehouse systems 522, and/or the applications 109.

The resource orchestration subsystem 101-2 may receive and process inputs from multiple data sources, for example, an HL7 ADT feed, among other communications from one or a combination of endpoints (e.g., the user devices 108, the components 106, the intermediary systems 114, the notification systems 115, the resource-allocation systems 135, and/or the applications 109). In some instances, for example, user-specified assignments of resources to particular loads and/or subsystems may be selected by one or more users of one or more of the user devices 108 and/or applications 109 having authenticated role-based access to the resource orchestration subsystem 101-2. The user-specified assignments may be transmitted from the one or more user devices 108 and/or applications 109 to the resource orchestration subsystem 101-2. Likewise, ADT feeds and/or augmented scheduling data indicative of assignments of resources to particular loads and/or subsystems may be transmitted from one or more of the notification systems 115 and/or the resource-allocation systems 135 to the resource orchestration subsystem 101-2. Based at least in part on one or more of such inputs, the resource orchestration subsystem 101-2 may identify resources, identify loads, determine assignments of resources to particular loads, determine resource subsystems assigned to particular loads, assign resources to particular loads, and/or build or modify resource subsystems assigned to particular loads. Such assignment data may be stored by the system 101, for example, in the data warehouse systems 522. Further, the resource orchestration subsystem 101-2 may transmit (by way of pushing and/or transmission in response to requests/queries) location assignment specifications, assignment reporting data, and other assignment data to the user devices 108, the components 106, the intermediary systems 114, the notification systems 115, the resource-allocation systems 135, and/or the applications 109.

In providing the platform, the subsystem 101-2 may use a canonical data model for the assignment data and then use translation services and/or adaptors, such as one or a combination of the adaptors disclosed herein, on the edge to translate to downstream service needs, which may include, for example, REST APIs, socket connections, WL, translating from one queue technology to another queue technology, and/or the like. The subsystem 101-2 may at least partially use the transformative integration engine 202 to adapt to and integrate with the other systems, subsystems, interfaces, applications, and components, which may use a set of APIs to query the platform for resource and subsystem assignment data. The system 101 may populate the plurality of different downstream systems, subsystems, applications, interfaces, and components with resource assignment data, subsystem assignment data, and content such as user-selectable interface elements and corresponding options for resource allocation, and/or the like features disclosed further herein.

The transformative integration engine 102 and the control engine 104 may be included in or communicatively coupled to the subsystem 101-2. In various embodiments, the endpoints may communicate with the subsystem 101-2 (e.g., transformative processing engine 102 and the control engine 104) via one or a combination of a specified information format, protocol, encryption technique, language, and/or the like. However, in various embodiments, the endpoints may communicate with the transformative processing engine 102 and the control engine 104 via different information formats, different proprietary protocols, different encryption techniques, different languages, different machine languages, and the like. As discussed with reference to FIG. 2, the transformative processing engine 102 may be configured to receive these many different communications from endpoints, in their native formats and transform them into any of one or more formats. For example, the transformative integration engine 202 may transform, translate, convert, or otherwise adjust assignment data and content provided to the systems, subsystems, interfaces, applications, and components. For example, the transformative integration engine 202 may convert or otherwise adjust the assignment data and content to conform to a plurality of different formats used by the user devices 108, the components 106, the intermediary systems 114, the notification systems 115, the resource-allocation systems 135, the data warehouse systems 522, and/or the applications 109. In some examples, the transformative processing engine 102 receives data in the HL7 format or conforming to any other suitable format and/or may be configured to transform received data to conform with the HL7 format. The conversion/adjustment from one format to another format may be performed using one or more conversion rules, which may be user-defined or learned, particularized to the respective user device 108, component 106, intermediary system 114, notification system 115, resource-allocation system 135, data warehouse system 522, and/or application 109. The system 101 may communicate with the respective user device 108, component 106, intermediary system 114, notification system 115, resource-allocation system 135, data warehouse system 522, and/or application 109 via a specified protocol, where the payload data of the communications may be in a specified format, after the payload data was transformed to the specified format. Such communications may be queue-based. Accordingly, the received and/or transformed communications may be transmitted by the resource orchestration subsystem 101-2 to one or more other devices (e.g., the control engine 104, an entity device, and/or another endpoint) and/or locally or remotely stored.

Figure 10:
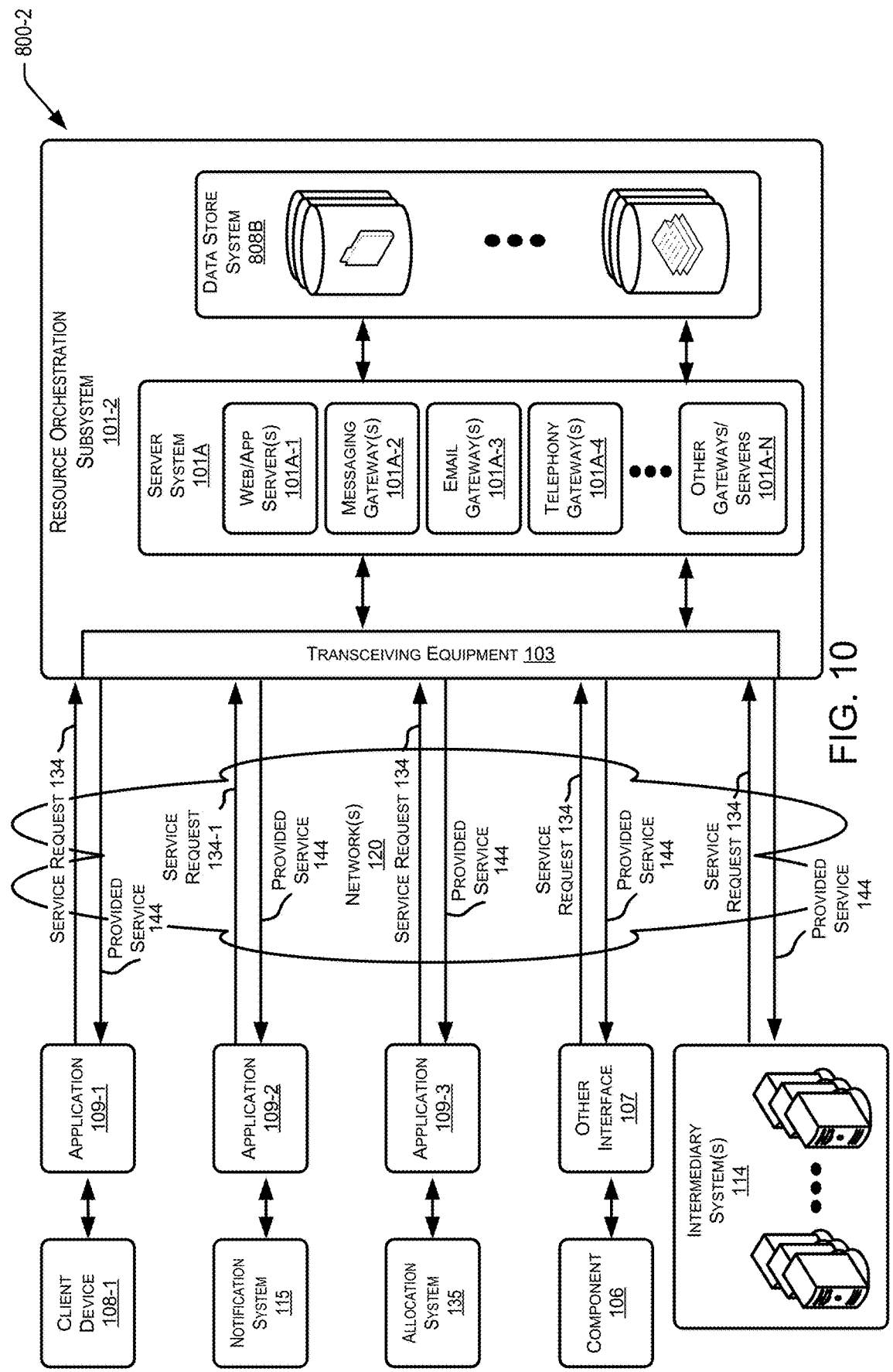
FIG. 10 illustrates a block diagram of aspects of the interaction system, in accordance with embodiments of the present disclosure.

FIG. 10 depicts another simplified diagram of the interaction system 800-1 for implementing embodiments of the resource orchestration subsystem 101-2 in accordance with the present disclosure. The resource orchestration subsystem 101-2 may be communicatively coupled with the user devices 108, the components 106, the intermediary systems 114, the notification systems 115, the resource-allocation systems 135, and/or the applications 109 via one or more networks 120, which may correspond to one or more networks 810 and/or 820. The user devices 108, the components 106, the intermediary systems 114, the notification systems 115, and/or the resource-allocation systems 135 may be configured to execute and operate via various applications 109 and/or other interfaces 107 in order to interface with the system 101 and subsystem 101-2. The connections between the user devices 108, the components 106, the intermediary systems 114, the notification systems 115, and/or the resource-allocation systems 135 and the subsystem 101-2 (which may include engine 102 and engine 104) may include any suitable network connection.

In various embodiments, the one or more networks 120 may include one or a combination of any type of network that may support data communications using any of a variety of available protocols, including without limitation, TCP/IP (transmission control protocol/Internet protocol), SNA (systems network architecture), IPX (Internet packet exchange), Secure Sockets Layer (SSL) or Transport Layer Security (TLS) protocols, Hyper Text Transfer Protocol (HTTP) and Secure Hyper Text Transfer Protocol (HTTPS), Zigbee, Bluetooth®, Bluetooth Low Energy, Near Field Communication (NFC), and the like. Merely by way of example, network(s) 120 may be local area networks (LAN), such as one based on Ethernet, Token-Ring, and/or the like. Network(s) 120 also may be wide-area networks, such as the Internet. Networks 120 may include telecommunication networks such as a public switched telephone networks (PSTNs), or virtual networks such as an intranet or an extranet. Infrared and wireless networks (e.g., using the Institute of Electrical and Electronics (IEEE) 802.11 protocol suite or other wireless protocols) also may be included in networks 120. In various embodiments, the applications 109 and other interfaces 107 may include one or a combination of applications such as web browsers, direct messaging applications, email applications, short message service (SMS) applications, multimedia message service (MMS) applications, instant messaging applications, fax applications, voice applications, video applications, proprietary client messaging applications such as iMobile, and/or other suitable messaging service applications or other interfaces.

In the illustrated simplified example, the subsystem 101-2 may include a server system 101A and a data store system 808B. In various embodiments, the server system 101A may be adapted to run one or more services or software applications. In some embodiments, these services may be provided as web-based or cloud services or under a Software as a Service (SaaS) model to the user devices 108, the components 106, the intermediary systems 114, the notification systems 115, and/or the resource-allocation systems 135. The user devices 108, the components 106, the intermediary systems 114, the notification systems 115, and/or the resource-allocation systems 135 may in turn utilize one or more client applications 109 and/or other interfaces 107 to interact with the server system 101A to utilize the services provided by these components. The server system 101A may run any suitable operating system and may also run any of a variety of additional server applications and/or mid-tier applications, such that server system 101A may include one or a combination of web servers, HTTP (hypertext transport protocol) servers, Internet Information Services servers, FTP (file transfer protocol) servers, CGI (common gateway interface) servers, JAVA® servers, database servers, and/or the like. Exemplary database servers include without limitation those commercially available from Oracle, Microsoft, Sybase, IBM (International Business Machines), and the like. In the illustrated example, the server system 101A may include one or more web and/or application servers 101A-1, one or more messaging gateways 101A-2, one or more email gateways 101A-3, one or more telephony gateways 101A-4, one or more other gateways and/or other types of servers 101A-N, such as an application gateway to interface with different servers.

The data store system 808B may include one or more databases that may reside in a variety of locations. By way of example, one or more databases may reside on a non-transitory storage medium local to (and/or resident in) the server system 101A. Alternatively, databases may be remote from the resource orchestration subsystem 101-2 and in communication with the resource orchestration subsystem 101-2 via a network-based or dedicated connection. In one set of embodiments, databases may reside in a storage-area network (SAN). Similarly, any necessary files for performing the functions attributed to the resource orchestration subsystem 101-2 may be stored locally on the resource orchestration subsystem 101-2 and/or remotely, as appropriate. In one set of embodiments, the databases of the data store system 808B may include relational databases that are adapted to store, update, and retrieve data in response to SQL-formatted commands. In various embodiments, the data store system 808B may correspond to one or a combination of data stores 226, data stores 508, and/or data storage servers 808(1)-808(N).

As disclosed further herein, the resource orchestration subsystem 101-2 may be configured to have a service-oriented architecture and may be configured to provide service-oriented web services to endpoint devices (e.g., the user devices 108, the components 106, the intermediary systems 114, the notification systems 115, and/or the resource-allocation systems 135). For example, the resource orchestration subsystem 101-2 may provide web-based services that facilitate the sending and receiving of messages and/or other communications to endpoints on behalf of client applications 109 and interfaces 107. Such web services, including cross-domain and/or cross-platform web services, may be developed for enterprise use in accordance with various web service standards, such as RESTful web services (i.e., services based on the Representation State Transfer (REST) architectural style and constraints), and/or web services designed in accordance with the Web Service Interoperability (WS-I) guidelines. Some web services may use the Secure Sockets Layer (SSL) or Transport Layer Security (TLS) protocol to provide secure connections between the server system 101A and the user devices 108 and/or the components 106. With various embodiments, the client applications 109 and interfaces 107 may be any application or interface that supports HTTP. SSL or TLS may use HTTP or HTTPS to provide authentication and confidentiality. In other examples, web services may be implemented using REST over HTTPS with the OAuth open standard for authentication, or using the WS-Security standard which provides for secure SOAP (e.g., Simple Object Access Protocol) messages using Extensible Markup Language (XML) encryption. The server system 101A may include specialized hardware for providing secure web services. For example, the hardware may include secure network appliances having built-in features such as hardware-accelerated SSL and HTTPS, WS-Security, and firewalls. Such specialized hardware may be installed and configured in front of web servers of the server system 101A so that any external devices may communicate directly with the specialized hardware.

Endpoint devices may transmit service requests 134 via the one or more networks 120. The application 109 and/or interface 107 of a given endpoint device may be configured to send the service requests 134, which, for example, may be application programming interface (API) calls to the web service to pass payloads for sending with messages. The service requests 134 may be HTTP calls that may or may not be made via web interface. For example, with some embodiments, as long as the endpoint device has a command line interface, the endpoint device make the HTTP calls corresponding to the service requests 134.

Figure 11:
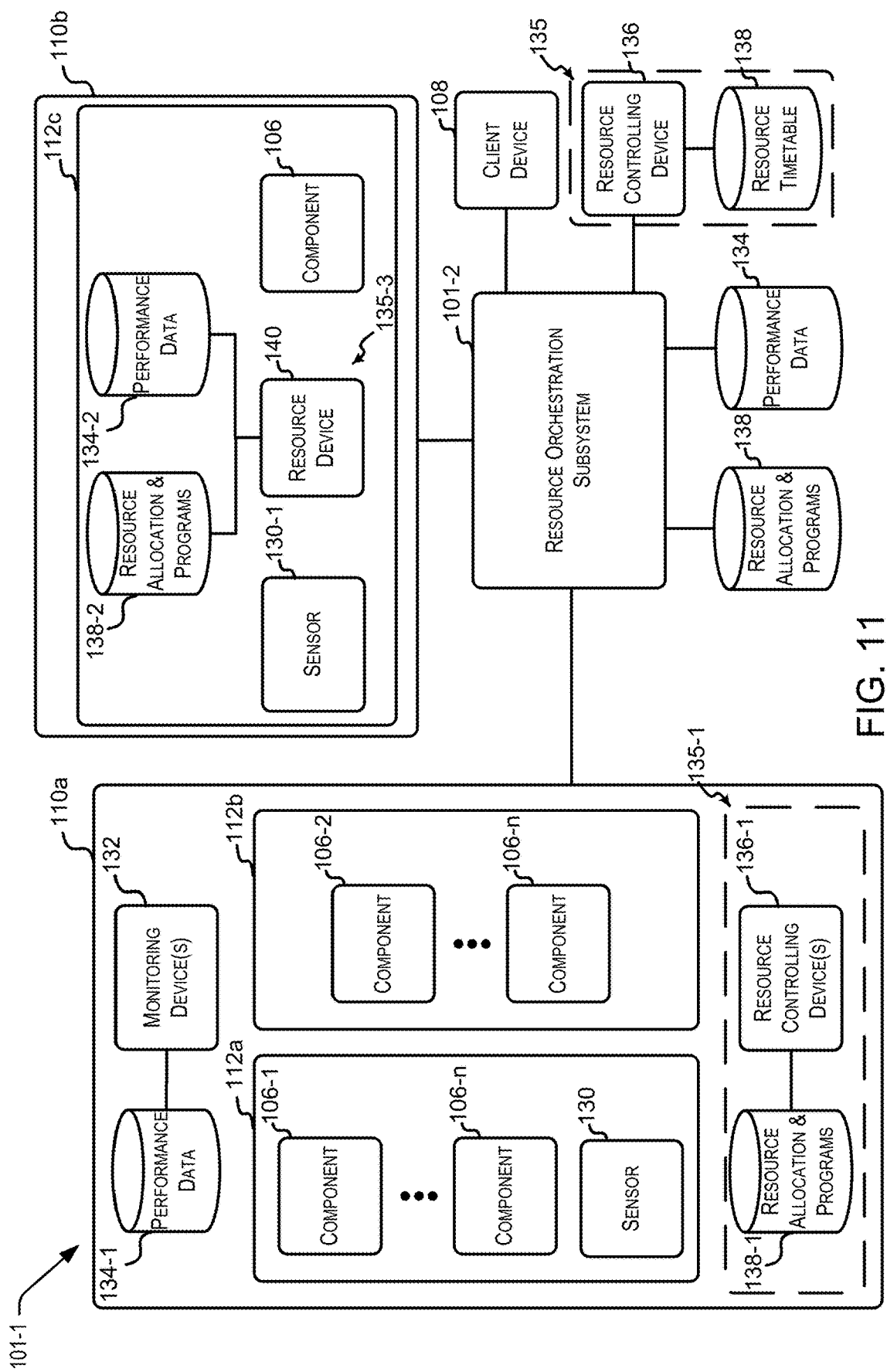
FIG. 11 illustrates a block diagram of aspects of the control system, in accordance with embodiments of the present disclosure.

FIG. 11 illustrates a block diagram further elaborating on aspects of the system 101-1 of the interaction system 100, in accordance with disclosed embodiments of the present disclosure. The system 101-1 corresponds to a number of technological improvements disclosed herein. The system 101-1 may facilitate and coordinate monitoring, tracking, learning, and modeling of data indicative of operation performance by one or more resources with respect to loads and load-specific operations and/or data indicative of locations of resources and loads, in order to facilitate allocation features disclosed herein. The data monitored by the system 101-1 may include one or a combination of usage data corresponding to usage of components 106; sensor data corresponding to sensors detecting component usage, resources, resource actions, resource locations, load states and characteristics, and/or the like; and/or input provided by resources via devices 108 and/or monitoring devices 132. The data monitored by the system 101-1 may be aggregated, consolidated, and analyzed by the system 101-1 to derive the operation performance data. To derive the performance data, the system 101-1 may further retrieve load-specific data for correlation with the monitored data in order to map the monitored data specific loads. The system 101-1 may update one or more performance data stores 134 with derived performance data.

The system 101-1 may further facilitate subsystem operational conformance with respect to protocols with respect to one or more subsystems of resources. The protocols (sometimes referenced herein as process protocols) may be, include, or otherwise correspond to process specifications and/or test specifications. Further, the process protocols may correspond to action programs that may be load-specific and/or particular to certain types of loads and/or certain load conditions.

Generally, in the system 101-1, data may be generated and/or collected at one or more of the system components 106, the devices 108, sensors 130, and/or resource allocation subsystems 135. The depicted instance shows two premises 110a, 110b. Other embodiments may include any different number of premises. Each premises 110 can include one or more units 112. In the depicted instance, a first premises 110a includes two units 112a and 112b, and a second premises 110b includes one unit 112c, but various other premises may include different numbers of units. Each unit 112 may correspond to a particular space. Units within a given premises (e.g., 112a and 112b) may be geographically separated from each other. In some instances, each of at least some units 112 within a premises may be of a same or similar type; may be configured for a same or similar type of use and/or may have one or more same or similar specifications or characteristics (e.g., dimensions, sizes, or intra-unit components). In some instances, each of at least some units 112 within a premises may be of different types, may be configured for different types of use and/or may have one or more different specifications or characteristics.

The subsystem 101-2 may be configured to communicate with multiple different sensors 130. Such communication may use various communication standards or protocols. In various embodiments, for example, the sensors 130 can be communicatively connected to and controllable by the subsystem 101-2. Sensors and control units may be coupled and the sensors 130 may be connected in a serial, parallel, star, hierarchical, and/or the like topologies and may communicate to the subsystem 101-2 via one or more serial, bus, or wireless protocols and technologies which may include, for example, WiFi, CAN bus, Bluetooth, I2C bus, ZigBee, Z-Wave and/or the like. For instance, one or more sensors 130 may use a ZigBee® communication protocol while one or more other sensors 130 communicate with the subsystem 101-2 using a Z-Wave® communication protocol. Other forms of wireless communication may be used by sensors 130 and the subsystem 101-2. For instance, one or more sensors 130 and the subsystem 101-2 may be configured to communicate using a wireless local area network, which may use a communication protocol such as 802.11.

Within each unit may be one or more components 106 and/or one or more sensors 130. In various embodiments, a given component 106 and/or sensor 130 may, or may not, be fixed in place (i.e., stationary), restrained to limit mobility or fully movable. In various instances, a component 106 may, for example, correspond to load processing equipment and may be configured to be used by an operator or user. In various embodiments, one or more components 106 and/or one or more sensors 130 may be configured to facilitate detection and tracking of operation performance and, hence, overall process performance by resources. In the examples disclosed herein, the subsystem 101-2 may map sensor data to various criteria and corresponding actions in order to detect when particular actions occur. Sensor data may be transmitted to the resource orchestration subsystem 101-2 to facilitate the collection of sensor data and the derivation of performance data. For example, a sensor 130 may detect when an individual enters a room mapped to a particular load. To be more specific, such sensor data may be used by the system 101-1 to detect and confirm whether a resource is executing operations with respect to a load, making rounds, and/or the like in conjunction with other sensor data indicating transitions of the resource to other load locations (e.g., a series of transitions that the system 101-1 may match to a pattern that corresponds to making rounds or other routines). As another example, a sensor 130 may detect a characteristic of a load and/or one or more load-specific operations such as whether a load has been moved.

One or more of a sensor 130 and/or a component 102 communicatively coupled thereto may be configured to transmit electronic communications to one or more other electronic devices, which may include transmitting sensor input to the subsystem 101-2 upon trigger events as disclosed herein. The electronic communications may be transmitted to the subsystem 101-2, for example, upon detecting a new type of signal; continuously; at regular times or intervals; upon receiving a request; and/or upon detecting that a transmission condition has been satisfied. The electronic communication may include, for example, sensor-collected data, inputs received at a component, an indication that an event has been detected, an indication that a transmission condition has been satisfied, an identifier of the component or sensor, and/or a location of the component or sensor. The electronic communication may be transmitted to a device that may be near or remote from the component and/or sensor. The electronic communication may include (for example) sensor-collected data, inputs received at a component, an indication that an event has been detected, an indication that a transmission condition has been satisfied, an identifier of the component or sensor, and/or a location of the component or sensor. The electronic communication may be transmitted, for example, over a wireless network, Wi-Fi network, short-range network, Bluetooth network, local area network, and so on.

A sensor 130 may include, for example, a sensor configured to monitor a characteristic of an ambient environment (e.g., motion, light, infrared, temperature, etc.). As another example, a sensor 130 may be included within an electronic tag reader component so as to detect electronic tag signals (e.g., a RFID signal, RuBee signal) from the electronic tag/transponder, which may be excited by a signal emitted from an antenna of the electronic tag reader component. As yet another example, a sensor 130 may be included within an equipment-tracking component so as to detect equipment tags. As still another example, a sensor 130 may include a receiver to receive signals from one or more signal sources (e.g., GPS satellites or Wi-Fi access points) to enable identifying a location of a device coupled to or including the sensor and associated with a resource.

One or more sensors 130 may include a fingerprint scanner and/or a different type of biometric scanner for biometric identification, such as a retina scanner that may be used for optical identification. Further, the one or more sensors 130 may include, for example, one or more cameras. The camera can be any device configured to generate image and/or audio data including, for example, still image data, video image data, and/or any sound data, corresponding to detected phenomena. The one or more sensors 130 of different types may include infrared sensors and/or heat sensors. In some embodiments, the camera(s) may include one or more infrared cameras. The camera(s) may, in some embodiments, include infrared sensors. The camera(s) may provide a video and, in some embodiments, an audio stream. Thus, a multiplicity of integrated and/or non-integrated sensors may be configured to capture phenomena in the locations in order to identify aspects of the proximate environment, to facilitate any one or combination of facial recognition, optical recognition, infrared impressions, voice recognition, heat impressions, gestures, and/or the like.

The various types of sensors 130 (e.g., cameras, audio sensors/microphones, biometric sensors) may provide sensor data to the subsystem 101-2 to facilitate recognition of particular resources when the resources are in particular areas, operating particular components 106, and/or the like. Again, such sensor data may be used by the subsystem 101-2 to derive performance data. The subsystem 101-2 may analyze the sensor data to develop baseline activity profiles and then detect aberrations with respect to the baselines. Any one or combination of the detected sensor data, sensed patterns/baselines, detected inconsistencies/nonconformities, and/or composites based thereon can be exposed via one or more client devices and/or an orchestration interface disclosed herein. Moreover, the subsystem 101-2 may use such sensor data to provide adapted training for a particular resource in accordance with embodiments disclosed herein.

In some instances, a sensor 130 may be a sensor coupled to a component 106. For example, a sensor 130 may be configured to detect whether an added weight has been placed on part of a component, whether an amount of weight has been removed, and/or whether there has otherwise been a weight change. By way of further example, weight sensors indicating that a load is being adjusted and/or moved may be used by the subsystem 101-2, in conjunction with other sensor data, to infer an indication of specific operation performance at a certain time with respect with specific load.

A premises 110 may also include a monitoring device 132 that may track and collect data indicative of use characteristics of one or more components 106, which data may include sensor data from sensors 130. Such data may not only indicate use characteristics but also may be attributed to operation performance in order to indicate operation performance. A use characteristic may include, for example, when, how and/or by whom a component 106 may be being used. In various instances, a monitoring device 132 may or may not be located within a unit 112 and/or premises 110. In some instances, a monitoring device 132 may be included in a resource orchestration subsystem 101-2.

A monitoring device 132 may be configured to receive input, which may indicate use characteristics (e.g., that a predetermined or unanticipated use may be beginning or has ended, a time that a use has started or completed, an entity engaged in a use, and so on). The monitoring device 132 may include or otherwise provide an interface, such as any one or a combination of the interfaces disclosed herein. Thus, for example, the interface may allow for the monitoring device 132 to receive the input indicative of use characteristics from an authorized user and/or from a component 106. In some embodiments, one or more monitoring device 132 may correspond to or be communicatively couplable to devices 108 such that interfaces provided via the devices 108 may facilitate the input.

In some instances, the monitoring device 132 may be (e.g., via a wireless or wired connection) connected to one or more components 106 and/or one or more sensors 130. Such connections may enable monitoring device 132 to estimate a usage characteristic. For example, one or more intensity values (or a processed version thereof) from a light sensor or motion sensor may be compared to a threshold, and it may be determined that a unit may be not being used if the value(s) are below a threshold. As another example, it may be estimated that a unit may be in use so long as a particular type of component may be detected as being within the unit. As yet another example, it may be estimated that a unit may be in use when signals from a badge reader indicate that a particular resource remains in the unit.

The monitoring device 132 may control and update a performance data store 134. A performance data store 134 may include data indicative of operation performance for, e.g., particular resources, particular resource-allocation systems, resource types, components, units, premises, and/or use types. Again, the data indicative of operation performance may include one or combination of usage data corresponding to usage of components 106; sensor data corresponding to sensors detecting component usage, resources, resource actions, resource locations, load states and characteristics, and/or like; and/or input provided by resources via devices 108 and/or monitoring devices 132. The data may indicate day, time, use type, duration, transitions times, operation descriptions, resource identifiers, load identifiers, location identifiers, and/or the like. Additional examples are disclosed further herein. A performance data store 134 may, but need not, be part of monitoring device 132. In some instances, a performance data store 134 may be remote from monitoring device 132, one or more units, one or more components and/or one or more premises to which it pertains. In some instances, a performance data store 134 may be in the cloud.

The system 101-1 can include and/or be communicatively coupled to one or more resource-allocation subsystems 135. In some embodiments, a resource orchestration subsystem 101-2 may include one or more of the resource-allocation subsystems 135. In some embodiments, one or more of the resource-allocation subsystems 135 may include one or more resource controlling devices 136. A resource controlling device 136 may control and update resource allocation specifications for many different resources. The resource allocation specifications may include digital identifiers for particular resources (e.g., names, identification numbers and alphanumeric strings, usernames, user IDs, contact information, and/or the like), specifications and descriptions for attributes mapped to the resources (e.g., qualifications, experience, roles of the resources, assignments of the resources, activities of resources, operation specifications for the resources, and/or the like), assignments of the resources to particular loads. timetables for the resources and corresponding load assignments, and/or the like, which may be stored in the resource allocation and action programs data store 138. The timetable or other temporal specification stored in resource allocation and action programs data store 138 may indicate that particular blocks of times have been assigned to particular resources with particular roles, load assignments, activities, operations, etc. The resource controlling device 136 may update a resource allocation and action programs data store 138 (e.g., which may be included within and/or remote from controlling device 136) so as to reflect current resource allocation specifications.

The resource orchestration subsystem 101-2 may correspond to a number of technological improvements as disclosed herein. To facilitate the technological improvements, the resource orchestration subsystem 101-2 may communicate with one or more: components 106, client devices 108, sensors 130, monitoring devices 132 and/or controlling devices 136. The resource orchestration subsystem 101-2 may itself control and/or update a performance data store 134 and/or resource allocation and action programs data store 138. In some instances, part or all of one or both of these data stores may mirror other corresponding data stores (e.g., located at and/or controlled by devices at one or more premises). For example, the resource orchestration subsystem 101-2 may receive periodic communications (e.g., that may, but need not, be responsive to requests for such) from one or more controlling devices 136 and/or monitoring devices 132 that identify an update of an allocation and/or action program (e.g., a program of operations) associated with a particular set of one or more resources, and/or an update of performance data associated with a particular set of one or more resources, use type, premises, and/or the like. The resource orchestration subsystem 101-2 may update a corresponding data structure in a mirrored resource allocation and/or action program data structure and/or performance data structure.

In various embodiments, the resource orchestration subsystem 101-2 may include or otherwise communicate with a server or device that manages resource allocations and/or action programs (e.g., by receiving communications from a plurality of controlling devices controlling individual resource allocations and/or action programs and by updating an aggregated data structure to reflect current assignments, availabilities, and/or performance attributes). Such management may enable the resource orchestration subsystem 101-2 to efficiently query multiple resource allocations and/or action programs and/or identify assignments, availabilities, and/or performance attributes.

Figure 12:
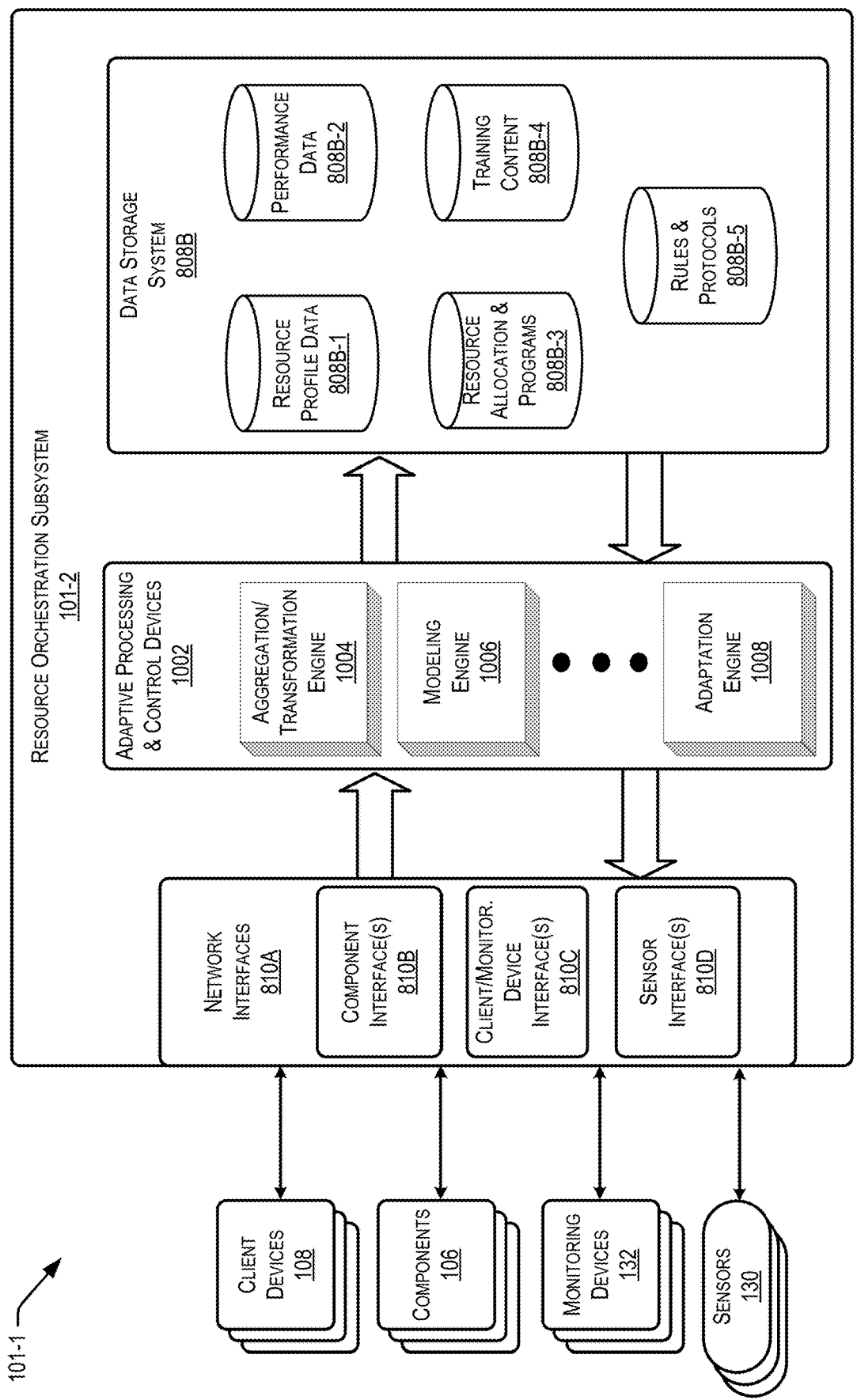
FIG. 12 illustrates a block diagram elaborating aspects of the control system, in accordance with embodiments of the present disclosure.

FIG. 12 illustrates a diagram of aspects of the resource orchestration subsystem 101-2 according to disclosed embodiments of the present disclosure. The diagram may correspond to various portions of the architecture stack 300 with the resource orchestration subsystem 101-2 including a server system comprising one or combination of the servers disclosed above, such as those described with respect to the internal organization 822. The server system may interface with the external network 820 and various components of the internal network 810. The server system may run any suitable operating system and may also run any of a variety of additional server applications and/or mid-tier applications, such that server system may include one or a combination of web servers, application servers, HTTP (hypertext transport protocol) servers, Internet Information Services servers, FTP (file transfer protocol) servers, messaging gateways, CGI (common gateway interface) servers, email gateways, JAVA® servers, database servers, telephony gateways, and/or the like. Exemplary database servers include without limitation those commercially available from Oracle, Microsoft, Sybase, IBM, and/or the like. While engines, repositories, and other components are described separately in this disclosure, it should be appreciated that the components may be combined and/or implemented differently in any combination to provide certain features in various embodiments with hardware, software and/or firmware. In various embodiments, different processes running on one or more shared resources may implement some of the components.

The server system may include and be configured to provide the resource orchestration subsystem 101-2. The transceiving equipment and/or the server system may be at least partially located in one or more of the one or more premises 110 or may be located remotely from the one or more premises 110. The transceiving equipment and/or the server system may be connected to a plurality of distribution components of the one or more premises 110. The system 830-2 may include a plurality of various network interfaces 810A to communicate with the client devices 108, components 106, monitoring devices 132, and sensors 130. The network interfaces 810A may include one or more component interfaces 810B, client and/or monitoring device interfaces 810C, and/or sensor interfaces 810D to transmit to and/or receive communications from one or a combination of the client devices 108, components 106, monitoring devices 132, and sensors 130. In various embodiments, one or more of the interfaces may include or otherwise correspond to API interfaces to transmit to and/or receive communications from one or a combination of the so client devices 108, components 106, monitoring devices 132, and sensors 130 using APIs.

The client devices 108 may correspond to one or a combination of the user devices 706-714. In various embodiments, the subsystem 101-2 may provide the applications 716-724 to the user devices 706-714, communicate with the user devices 706-714 via the applications 716-724, and/or otherwise facilitate a resource orchestration interface via the client device interfaces 810C to expose features of the orchestration interface to the user devices 706-714. In some embodiments, the client device interfaces 810C may include the orchestration interfaces. In some embodiments, the orchestration interfaces may include an API to interact with the server system. In various embodiments, the subsystem 101-2 may include, provide, and/or be configured for operation with the orchestration interfaces, for example, by making available and/or communicating with one or more of a website, a web page, a web portal, a web application, a mobile application, enterprise software, and/or any suitable application software to facilitate the orchestration interface. In some embodiments, the orchestration interface may cause a web page to be displayed on a browser of a user device. The web page(s) may display output and receive input from a user (e.g., by using Web-based forms, via hyperlinks, electronic buttons, etc.). The subsystem 101-2 may provide web applications to a user device for execution in a web browser running on the user device; and the web applications may include scripts, such as Java, JavaScript, etc., for execution within an isolated environment in a browser. A variety of techniques can be used to create the web pages and/or display/receive information, such as JavaScript, Java applications or applets, dynamic HTML and/or AJAX technologies. In some embodiments, the subsystem 101-2 may provide rich-client applications to a user device; and the rich-client applications may be programmed in traditional programming languages to have full access to functions of the operating system running on the user device. In some embodiments, the orchestration interface may include or work with a mobile application.

The subsystem 101-2 may include one or more adaptive processing and control devices 1002. The one or more adaptive processing and control devices 1002 may, in some embodiments, be included in the access management engine 602. The one or more adaptive processing and control devices 1002 may include one or more aggregation and transformation engines 1004, one or more modeling engines 1006, and/or one or more guidance engines 1008, which may be separate or integrated in various embodiments. In some embodiments, the processing and control devices 1002 may include the aggregation engine 420. In various embodiments, the adaptive processing and control devices 1002 may correspond to a single, integral engine or separate engines working in conjunction. The adaptive processing and control devices 1002 may transform, translate, or otherwise adjust data collected. In various embodiments, the adaptive processing and control devices 1002 may correspond to executable code stored in one or more memories communicatively coupled with one or more processors, such as those of the subsystem 101-2. In some embodiments, the adaptive processing and control devices 1002 may correspond to one or more servers of the server system with one or more of the servers configured to perform one or more of the orchestration features in accordance with embodiments disclosed herein.

Figure 13:
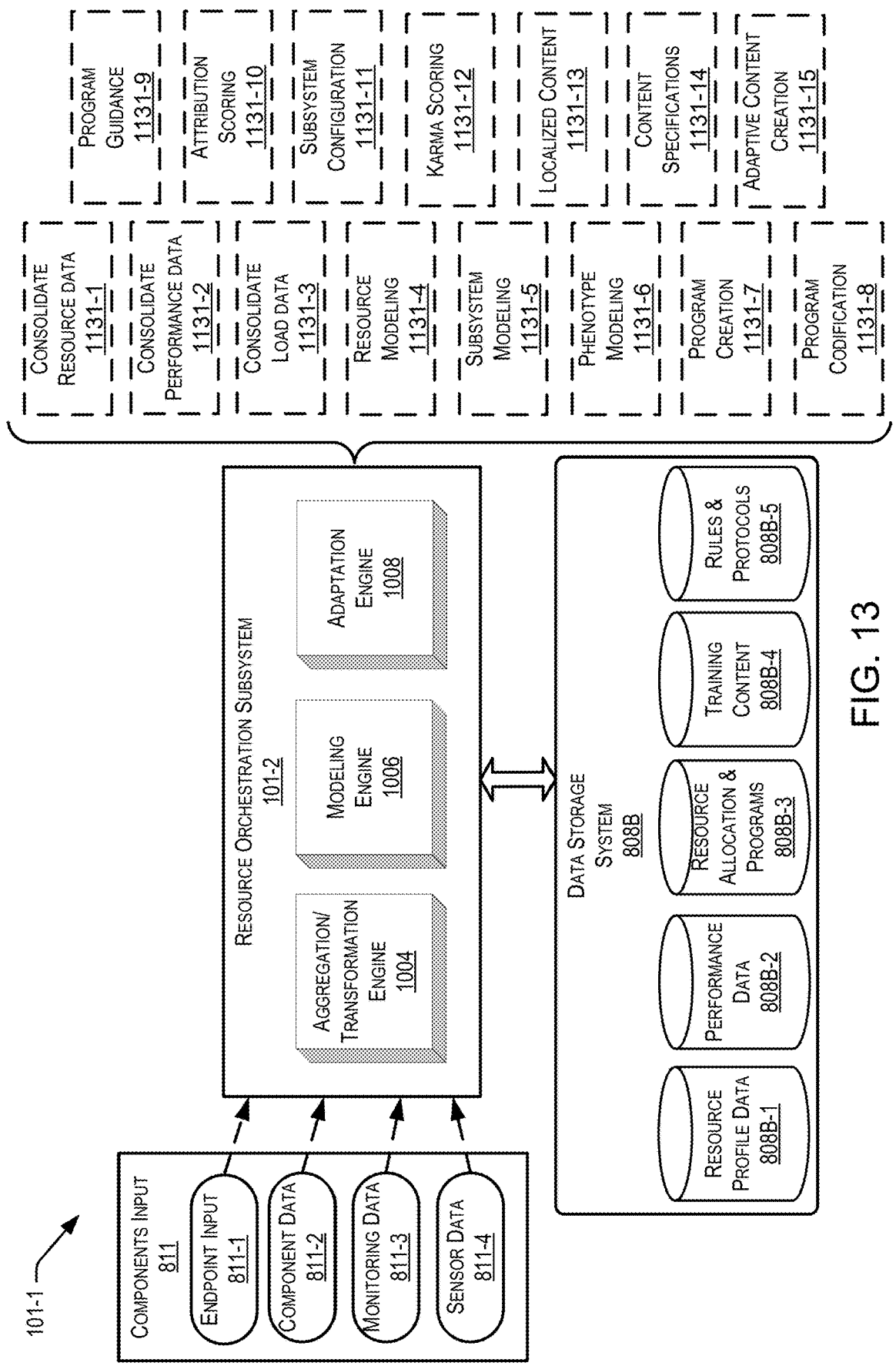
FIG. 13 illustrates a block diagram elaborating aspects of the control system, in accordance with embodiments of the present disclosure.

FIG. 13 shows a functional diagram elaborating aspects of the resource orchestration subsystem 101-2, in accordance with embodiments of the present disclosure. The subsystem 101-2 may be configured to provide a number of adaptive controls 1131 with one or a combination of the orchestration interface, the client devices 108, the components 106, the monitoring devices 132, and/or the sensors 130 as disclosed herein. As elaborated herein, the adaptive controls 1131 may include consolidating resource data 1131-1, consolidating performance data 1131-2, consolidating load data 1131-3, resource modeling 1131-4, subsystem modeling 1131-5, phenotype modeling 1131-6, program creation 1131-7, program codification 1131-8, program guidance 1131-9, resource mapping/addressing qualification 1131-10, determining and specifying subsystem configuration 1131-11, resource and subsystem karma qualification 1131-12, determining and presenting localized just-in-time training content 1131-13, creating training content specifications 1131-14, creating adaptive content 1131-15, and/or the like.

The one or more adaptive processing devices 1002 may be communicatively coupled with interface components and communication channels (which may take various forms in various embodiments as disclosed herein) configured to receive components input 811. The components input 811 may include input from a plurality of different data sources. For example, the components input 811 may include endpoint input 811-1, component data 811-2, monitoring data 811-3, and/or sensor data 811-4 from one or a combination of the client devices 108, components 106, monitoring devices 132, and sensors 130. The subsystem 101-2 may listing for data changes in one or more data streams corresponding to the components input 811 in order to facilitate various embodiments disclosed herein. The technical improvements provided by the subsystem 101-2 over prior technologies include improvements in orchestration accuracy, adaptability, and control at least in part by machine-intelligent handling of input from multiple different sources, including the orchestration interface, the client devices 108, the components 106, the monitoring devices 132, and/or the sensors 130 in order to adapt to various particular changes in the interaction system 100, as is disclosed further herein. In various embodiments, the orchestration interface may facilitate the gathering of input from one or a combination of such devices.

As disclosed herein, embodiments according to the present disclosure may provide technological improvements for tracking metrics of resource-allocation systems, including metrics pertaining to resource specifications, including resource allocations, load specifications, subsystem specifications, resource-load parings, and/or the like. The system 101, which may include a process performance control and management system, may allow role-based access to users via the orchestration interface with respect to such metrics and specifications with respect to various subsystems of resources, resources, and loads. The role-based access may provide visibility into the metrics of particular resources and into subsystem-level (e.g., unit level) metrics of particular resource subsystems (e.g., subsets and sets of federated resources that may correspond to one or more resource units). Further, the role-based access with the orchestration interface and a client device 108 may provide various user-selectable interface elements that allow for a user to identify resources and create or develop resource specifications, identify loads and create or develop load specifications, determine assignments of resources to particular loads, determine resource subsystems assigned to particular loads, assign resources to particular loads and modify existing assignments of resources to particular loads, build or modify resource subsystems assigned to particular loads, and/or the like. For example, subsystem data may be surfaced via the orchestration interface with user-selectable interface options that enable a user having role-based access to assign resources loads.

The resource orchestration subsystem 101-2 provides a number of technological improvements disclosed herein with one or more aggregation and/or transformation engines 1004. The aggregation and transformation engine 1004 may be configured to monitor the components input 811 for any suitable aspects to facilitate improvements with individualization adaptation features disclosed herein. For example, aggregation and transformation engine 1004 may be configured to consolidate resource data 1131-1, consolidate performance data 1131-2, and consolidate load data 1131-3. The aggregation and transformation engine 1004 may gather and process components input 811 to facilitate creation, development, and/or use of resource profiles 808B-1, which may include resource specifications, performance data 808B-2, which may include pattern data, and allocation data and action programs 808B-3.

Figure 14:
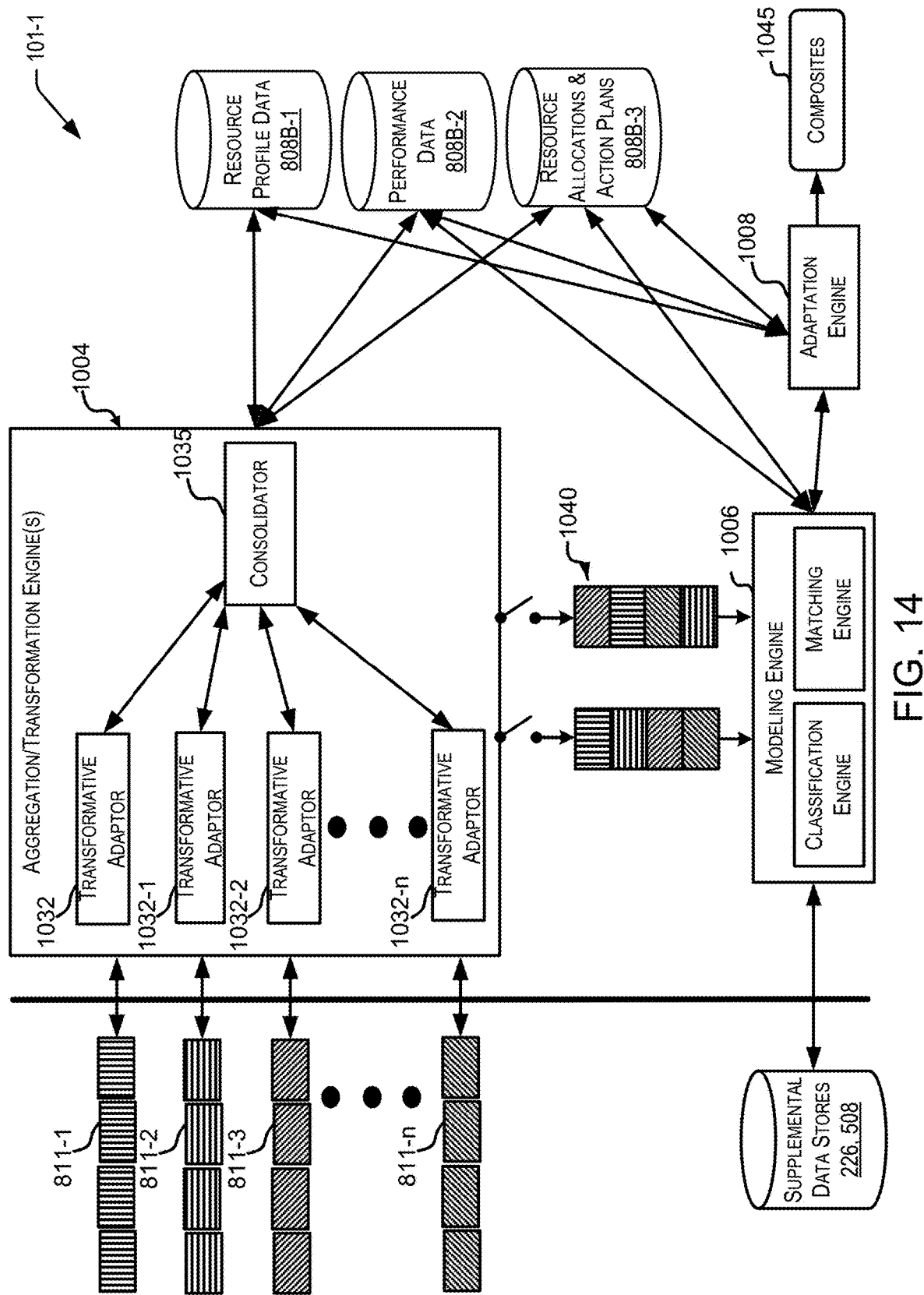
FIG. 14 illustrates a block diagram that depicts a portion of the control system including further aspects of composite generation, in accordance with embodiments of the present disclosure.

FIG. 14 illustrates a diagram depicting a portion of the resource orchestration subsystem 101-2 including further aspects of the aggregation and transformation engine 1004 and modeling engine 1006 according to disclosed embodiments of the present disclosure. In various embodiments, the aggregation and/or transformation engines 1004 may correspond to a single, integral engine or separate engines working in conjunction. The aggregation/transformation engines 1004 may transform, translate, or otherwise adjust data collected, such as data indicative of performance metrics.

The aggregation/transformation engines 1004 may utilize any one or combination of the interfaces disclosed above as one or more content acquisition interfaces configured to allow the aggregation/transformation engines 1004 to gather data 811 from data sources corresponding to any one or combination of the sources of data indicative of performance data, resource-related data, sensor data, load-related data, location data, and/or the like disclosed herein to facilitate the load orchestration features disclosed herein. The data 811, which may include multiple data packets and/or data streams, may be received via one or more networks, such as a local area network, a Wi-Fi network, or the Internet, from multiple sources (e.g., from a single premises or multiple premises), such as a component or user device that collects at least some of the data included in each data element based at least in part on inputs detected at the component or user device, measurements made by a sensor, and/or data monitored by a monitoring device, as disclosed herein. In some instances, the data may be collected immediately, or with some delay (e.g., so as to be at an end of a data-collection effort) appended to a data stream or other data packets transmitted directly or indirectly to the engines 1004. In some instances, collected data can be locally or remotely stored and subsequently retrieved (e.g., by a same or different device) to append to a stream or other data packets. A managing server may then, at a defined time or upon detecting a defined type of event (e.g., receiving a data request or detecting a threshold size of a data stream), retrieve the stored data and append the data (e.g., in raw or processed form) to a stream or other data packets. Thus, a source of a stream or other data packets may be a single component or user device or an intermediate monitoring device or system that collects data from multiple components, sensors, and/or user devices.

The received data 811 may include individual data elements, which may correspond to data collected with respect to one or a combination of: usage data corresponding to usage of components 106; sensor data corresponding to sensors detecting component usage, resources, resource actions, resource locations, load states and characteristics, and/or like; and/or input provided by resources via devices 108 and/or monitoring devices 132; data indicating day, time, use type, duration, transitions times, operation descriptions, resource identifiers, load identifiers, location identifiers, and/or the like; requests to perform one or more processes and operations; requests for resources to perform one or more processes and operations; corresponding resources mapped to one or more processes and operations; corresponding loads mapped to one or more processes and operations; operation start times and dates; operation completion times and dates; process and operation performance statuses; resource statuses, availabilities, and assignments; load statuses, conditions, locations, and resource assignments; time data corresponding to resource availabilities; location data and time data corresponding to locations of resources at particular times; location data and time data corresponding to locations of loads at particular times; time data corresponding to load availabilities and needs, load specifications, process and operation specifications, and/or the like to facilitate various features of load orchestration disclosed herein. In various embodiments, the data 1004 may correspond to any one or combination of raw data, unstructured data, structured data, information, and/or content which may include media content, text, documents, files, instructions, code, executable files, images, video, audio, and/or any other suitable content suitable for embodiments of the present disclosure. In various instances, data from 10, 100, 1,000 or any number of different sources may be merged together with data generated internally, data previously received, data from third parties, etc. The aggregation/transformation engines 1004 and/or the modeling engines 1006 may identify which data and records are about the same resource, load, and/or the like, and may merge attributes from different sources into preliminary composites 1040 and particularized composites corresponding to resource profiles 808B-1 and/or performance data 808B-2 that can be used by the resource orchestration subsystem 101-2 as one or more bases for other controls 1131 features disclosed herein.

The aggregation/transformation engines 1004, the modeling engines 1006, and/or the adaptation engines 1008 may recognize identifiers of the above aspects from the data 811 by code mapping, keyword recognition, and/or another suitable method of recognition, which may be user-defined, heuristic, and/or machine-learned. For example, the aggregation/transformation engines 1004 and/or the modeling engines 1006 may identify keywords and/or codes as distinctive markings, compile them, and correlate them with recognition criteria (e.g., keyword criteria and/or code system) for the purposes of characterizing each set of data 811 and generating correlation results. For example, this may include recognizing trigger events disclosed herein. Such recognition processing may be performed in real time. The recognition criteria may include keywords identified by any one or combination of words, word stems, phrase, word groupings, and/or like keyword information. The recognition criteria may include weighting assigned to words, word stems, phrase, word groupings, and/or the like. For example, a keyword may be assigned a weight according to its significance. Increased word weights may be tied to increasing probability of criticality. The recognition criteria may correspond to one or more keyword schemas that are correlated to various criticalities. The recognition criteria may correspond to any other suitable means of linking, for example, via a code system, that may be used to associate recognized codes to specific criticalities. Thus, for example, each trigger event may be scored (e.g., with numerical expressions) according to any one or combination of the various factors disclosed herein and a weight for each trigger event may be determined as a function of a criticality score assigned to the trigger event and comparison to one or more thresholds corresponding to one or more categories of criticality (e.g., low criticality, medium criticality, high criticality, and/or the like).

The resource orchestration subsystem 101-2 may, in some embodiments, include a multi-server system that may include specialized data-pulling engines and stream processing engines (e.g., each engine being a server or processing core). According to disclosed embodiments, with data-pulling engines, at least some of the data may be actively gathered and/or pulled from one the or more data sources, for example, by accessing a third party repository and/or by "crawling" various repositories. A stream processing engine may be specialized so as to include, for example, stream processors and fast memory buses. In some embodiments, data elements of the received data 811 may be separated, for example, within a stream via a particular (or one of multiple particular) characters or strings, or data elements may begin or end with a particular (or one of multiple particular) characters or strings. In some embodiments, the one or more content acquisition interfaces may include one or more APIs that define protocols and routines for interfacing with the data sources via an API interface. The APIs may specify API calls to/from data source systems. In some embodiments, the APIs may include a plug-in to integrate with an application of a data source system. The one or more data acquisition interfaces, in some embodiments, could use a number of API translation profiles configured to allow interface with the one or more additional applications of the data sources to access data (e.g., a database or other data store) of the data sources. The API translation profiles may translate the protocols and routines of the data source system to integrate at least temporarily with the system and allow communication with the system by way of API calls.

In some embodiments, the data 811 acquired may be in different formats, according to different data standards, in different document structures, including different types of data, etc. The data 1004 can then be transformed, translated, or otherwise adjusted by the engines 1004. For example, acquired data may be converted from a first format to a second format using one or more conversion rules, which may be user-defined, heuristic, and/or machine-learned. In some embodiments, the engines 1004 may perform similar operations with respect to other data generated by elements of the architecture. In some embodiments, the aggregation and/or transformation engines 1004 may correspond at least in part to one or more of transformative engine 108, control engine 106, aggregation engine 218, 420, third party aggregation engine 422, and/or interoperability engine 502.

In some embodiments, the aggregation and/or transformation engines 1004 may include one or more transformative adaptors 1032. In some embodiments, one or more transformative adaptors 1032 may be associated with the content acquisition interfaces to effect the transformations. The transformative adaptors 1032 may be implemented, in various embodiments, in hardware and/or software. In some embodiments, a transformative adaptor 1032 may include a hardware device and/or software component that transforms, translates, converts, or otherwise adjusts the acquired data 811. In some embodiments, the one or more transformative adaptors 1032 may correspond at least in part to one or more of adaptors 424, 426, 428.

In some embodiments, various processors and/or layers within the resource orchestration subsystem 101-2 may can be specialized to perform various types of processes. For example, a first set of processors may be configured to transform the data 811 within a stream in real-time (e.g., to produce data in a standard format and/or one that corresponds to an alert, notification, and/or report protocol) and detect (e.g., based at least in part on data included in a header of a data element) whether the transformed data includes one or more particular types of data. In various embodiments, the first set of processors may utilize the transformative adaptors 1032 to effect the transformation and/or may further transform the data beyond first-stage transformations by the transformative adaptors 1032.

The aggregation/transformation engines 1004 may process manifold data sets that may, for instance, come from different sources or the same source, for example, by way of one or more updates to data previously provided by a particular source, and the consolidator 1035 may consolidate the data sets to form a preliminary composite 1040. The consolidation may include applying one or more filtering techniques (or one or more filters) to the data sets, organizing, categorizing, qualifying, and/or comparing the sets of information; detecting, identifying, and/or handling errors/discrepancies; identifying redundancies; removing redundancies; discarding data irrelevant to composite package building for particular resources, loads, and operations corresponding to resource profiles 808B-1, performance data 808B-2, and/or allocation data and action programs 808B-3; and/or otherwise processing the data sets. The consolidator 1035 may determine whether each element includes a data pattern that may be consistent with one or more defined protocols. Such a protocol may define a data pattern as one that includes, for example, one or more particular data elements and/or types of data elements. The consolidator 1035 may identify one or more applicable protocols (e.g., based at least in part on source identifier, metadata, a current time, a stream identifier, etc.).

The aggregation and transformation engine 1004 and/or the modeling engine 1006 may include a reasoning module to make logical inferences from a set of the detected and differentiated data to infer one or more patterns corresponding to the resource profiles 808B-1, performance data 808B-2, and/or allocation data and action programs 808B-3. For instance, the pattern data may include information about any one or combination of identification histories, action and performance histories, location histories, allocation histories, and/or the like, any set of which may be used to derive one or more patterns of competency data, which may include performance data for particular resources and sets of resources. Performance metrics may include process metrics, operational efficiency metrics, overtime metrics, infection metrics, and/or the like, rates of changes in performance metrics, rankings of resources and resources sets, and/or the like. The system 101 may track and model resource process performance as process operations are completed to facilitate feedback loop features and employ an ongoing learning mode to confirm, correct, and/or refine determinations made regarding resource profiles 808B-1, performance data 808B-2, and/or allocation data and action programs 808B-3. As disclosed herein, the system 101 may use the performance metrics in allocating resources. With ongoing monitoring and learning, the system 101 may gather additional performance data 808B-2 particular to the resources allocated and continue to update and adjust the resource profiles 808B-1, performance data 808B-2, and/or allocation data and action programs 808B-3 on a continual basis, heuristically adapting the determinations with the feedback to learn over time to make the determinations more effectively.

A pattern-based reasoner may be employed to use various statistical techniques in analyzing the data, both current and chronicled, in order to infer particularized pattern data from the data 811 and preliminary composites 1040. A transitive reasoner may be employed to infer relationships from a set of relationships to form the performance data. In various embodiments, the system automatically establishes and develops the particularized pattern data. In some embodiments, the modeling engine 1006 may be configured to employ deep learning to process the data 827A and derive the particularized pattern data corresponding to the resource profiles 808B-1, performance data 808B-2, and/or allocation data and action programs 808B-3. Accordingly, the modeling engine 1006 may facilitate machine learning or, more specifically, deep learning, to facilitate creation, development, and/or use of particularized pattern data that may include competency metrics, which may include performance metrics.

The consolidation and/or modeling may be performed upon detection of one or more events, which may correspond to detection of one or more particular data elements 811, one or more device interaction, and/or data changes that correspond to a defined event. For example, the data 811 may indicate that one or more process operations are completed by one or more resources. The aggregation/transformation engine 1004 may process the data 811 for consolidation as process operations are completed by one or more resources, and the modeling engine 1006 may model resource process performance as process operations are completed by one or more resources. Consequent to the aggregation and transformation engine 1004 aggregating, consolidating, and transforming the data 1004 as disclosed herein, the modeling engine 1006 may model the corresponding performance data with respect to the particular resource and/or set of resources to which the one or more process operations pertain.

One or more first-stage processors of the engines 1004, which may correspond to the consolidator 1035, may form one or more preliminary composites 1040 from consolidated data. The one or more first-stage processors may transmit the one or more preliminary composites 1040 (or replicated versions thereof) to one or more second-stage processors, which may correspond to the modeling engine(s) 1006. The modeling engine 1006 may include or otherwise correspond to a learning engine that may employ an ongoing learning mode to create, confirm, correct, and/or refine resource profiles 808B-1 and/or performance data 808B-2. The modeling engine 1006 may be an analysis and matching engine that employs machine learning to process the components input 811 (e.g., endpoint input 811-1, component data 811-2, monitoring data 811-3, and/or sensor data 811-4) and derive the particularized resource profiles 808B-1 and/or performance data 808B-2. The modeling engine 1006 may be configured to perform any one or combination of features directed to matching or otherwise correlating endpoint input 811-1, component data 811-2, monitoring data 811-3, and/or sensor data 811-4.

For example, the modeling engine(s) 1006 may be configured as a composite builder that may build particularized composite packages corresponding to resource profiles 808B-1, performance data 808B-2, and/or allocation data and action programs 808B-3. Further, in some embodiments, the modeling engine 1006 may include a classification engine and a matching engine configured to facilitate classifying and matching features disclosed herein. The modeling engine 1006 may be configured to perform extraction, apply a rule to process the extracted data element, request, and/or retrieve supplemental data from a remote data source, and/or develop composite packages corresponding to resource profiles 808B-1, performance data 808B-2, and/or allocation data and action programs 808B-3 with the supplemental data. For example, the modeling engine 1006 may compare detected, aggregated, consolidated, and differentiated process performance data (which may include, for example, time-stamped recorded data stored by the subsystem 101-2) with load record data.

The modeling engine 1006 may pull from the data stores stored resource profiles 808B-1, performance data 808B-2, and/or allocation data and action programs 808B-3, previously created, to update the stored profiles based at least in part on data 1004 newly received and processed. The modeling engine 1006 may pull from the data stores (e.g., 226, 508) data pertinent to the resource profiles 808B-1, performance data 808B-2, and/or allocation data and action programs 808B-3 to supplement with data 1004 newly received and processed in order to create and/or update the resource profiles 808B-1, performance data 808B-2, and/or allocation data and action programs 808B-3. The modeling engine 1006 may update one or more of the manifold composites, and, hence, the composite packages corresponding to resource profiles 808B-1, performance data 808B-2, and/or allocation data and action programs 808B-3, in real time, periodically, or when triggered by certain events with respect to the particular resources.

The modeling engine 1006 may transform the preliminary composites 1040 into understandable data, information, and/or content so that the resource profiles 808B-1, performance data 808B-2, and/or allocation data and action programs 808B-3 contain the transformed data for surfacing to one or more end users via one or more client devices 108 (e.g., administrative users via administrative devices) via the orchestration interface. The modeling engine 1006 and/or the adaptation engine 1008 may identify rules for alerts, notifications, and/or reports. The various rules may include one or more general conditions, such as ones that specify for which resource, type of resource, type of load, time periods, premises, locations, data sources, and/or client devices for which the rules are to apply. The various rules may include a flag definition that may specify what types of data indicate that information corresponding to a data element is to be reported. For example, a flag definition may include an identification of each of one or more composites and/or one or more values associated with each of the one or more composites. The one or more values may include, for example, a numeric, textual or categorical value. The one or more values may include a threshold and/or define a bound for a closed or open range. Thus, for example, a corresponding value included in a data element may be determined to be consistent with the one or more values if it may be within a range (or outside the range—depending on how the protocol may be defined) or exceeds the threshold in a particular direction (e.g., may be above or may be below the threshold). As another example, a corresponding value included in a data element may be determined to be consistent with the one or more values if it may be the same as one (or all) of the one or more values.

In accordance with various embodiments disclosed herein, the system 101-2 may be configured to aggregate a plurality of data items from a set of electronic communications received via one or more interfaces and the one or more networks from a plurality of electronic devices 106, 108, 130, and/or 132. The set of electronic communications may include one or more of: indicia of device interactions or data changes that correspond to process and/or operation performances by operation-performing resources; indicia of conditions of loads; and/or indicia of processes and/or operations associated with the operation-performing resources and the loads. The aggregating may be performed at least in part by, for each electronic communication of the set of electronic communications, processing the electronic communication to identify one or more digital identifiers uniquely mapped to one or more of the operation-performing resources and/or loads; and extracting and caching a data portion from the electronic communication. Further, the aggregating may be performed at least in part by consolidating the data portions and mapping the consolidated data portions to one or more resource profiles 808B-1 and/or one or more load profiles, which may be likewise stored with the resource profiles 808B-1 and/or distinct load storages, and updating the one or more resource profile records and/or one or more load profile records with the consolidated data portions. In various embodiments, the load storage may or may not be included in the resource profiles storage 808B-1, and may storage load profiles, specifications, and/or other load-specific data disclosed herein.

For each operation-performing resource, the system 101-2 may identify one or more protocols that include one or more parameter constraints according to specifications of process performance and/or operation performance. The system 101-2 may use at least one of the one or more resource profile records and/or the one or more load profile records to model the operation-performing resource. The modeling may include determining one or more individual performance metrics mapped to the operation-performing resource, each individual performance metric being a function of the one or more identified protocols and at least some of the consolidated data portions. The system 101-2 may map the operation-performing resource to one or more subsystems, each subsystem configured with set of operation-performing resources. For each subsystem, the system 101-2 may use at least one of the one or more individual performance metrics of at least one of the operation-performing resources mapped to the subsystem to model the subsystem. The modeling may include determining one or more subsystem performance metrics mapped to the subsystem. For each operation-performing resource and for each subsystem, the system 101-2 may create a graphical representation formatted to represent the modeling of the operation-performing resource and the modeling of the subsystem. The system 101-2 may cause transmission of visualization data corresponding to the graphical representation to an endpoint device (e.g., a client device 108) to facilitate an orchestration interface, where the orchestration interface allows access to the graphical representation of the modeling of the operation-performing resource and the modeling of the subsystem.

The system 101-2 may cause transmission of a set of interface content to the endpoint device to facilitate a plurality of user-selectable options provisioned with the orchestration interface that correspond to a plurality of parameters to specify a composite 1045 that corresponds to an action program. The system 101-2 may determine specifications for the composite 1045 that specify a configuration of one of the subsystems with a selected set of the operation-performing resources allocated to perform a defined process in accordance with one or more selected protocols. The system 101-2 may create a data structure to implement the composite 1045 with a selected set of parameters corresponding to the specifications, where the data structure comprises a diagnosis component, an intervention component, and an outcome component. The system 101-2 may generate a natural language representation of the composite 1045 and may expose the natural language representation via the orchestration interface. Consequent to receiving one or more user selections via the orchestration interface, causing an implementation of the composite 1045 with the data structure so that the selected set of the operation-performing resources are allocated to perform the defined process in accordance with the one or more selected protocols. The system 101-2 may identify a set of one or more metrics to control at least one variance of the one or more variances attributed to the one or more subsystems of the set of subsystems with respect to the baseline of normality. The determining the specifications for the composite 1045 and the selected set of parameters corresponding to the specifications may be based at least in part on the identified set of one or more metrics to control the at least one variance. The orchestration interface may include any text, image, and/or device that can be displayed on a display screen for providing information to a user and/or for receiving user input, and may include one or more widgets, windows, dashboards, text, text boxes, text fields, tables, grids, charts, hyperlinks, buttons, lists, combo boxes, checkboxes, radio buttons, and/or the like.

The determining the one or more individual performance metrics mapped to the operation-performing resource may include determining a resource attribution that is at least partially a function of factors of complexities of one or more operations and/or processes performed by the operation-performing resource with respect to one or more of the loads, resource specifications from one resource profile record of the one or more resource profile records mapped to the operation-performing resource, and one of the subsystem-based phenotypes mapped to the subsystem that includes the operation-performing resource. The determining specifications for the composite 1045 that specify the configuration of one of the subsystems with the selected set of the operation-performing resources may be based at least in part on the resource attribution and the resource specifications from the one resource profile record mapped to the operation-performing resource. The system 101-2 may determine a karma score for each operation-performing resource of the selected set of the operation-performing resources allocated to perform the defined process in accordance with the one or more selected protocols to measure engagement of the operation-performing resource with the action program. As disclosed herein, the determining may be based at least in part on one or a combination of: performance of operations specified by the defined process, a difficulty modifier that is a function of a difference in performance at a start of the action and performance at a close of the action program, a duration, a number of operation-performing resources in the selected set of operation-performing resources, a measure of completed operations versus operation opportunities for the operation-performing resource, and/or a measure of completed operations versus operation opportunities for the selected set of the operation-performing resources.

In some examples, resource profile data and performance data may be provided via the orchestration interface by way of alerts, notifications, reports, and/or the like as disclosed further herein. As part of the orchestration interface, an interface may be used in presenting resource visualizations and performance visualizations. With the orchestration interface, user-selectable options may be presented to select particular sets of one or more resources (e.g., units) for visualizations with respect to those selected sets of one or more resources. A resource set may be selected such that the interface displays performance visualizations with respect to the selected resource set. Unit performance metrics with respect to different initiatives for the selected resource set may be presented with user-selectable options to drill down to more specific metrics. Further, the interface may provide visualizations of action program performance metrics with respect to each initiative and each resource set. An interface option may be activated such that more specific performance metrics may be visualized and activated in conjunction with action program management. For example, visualizations of performance metrics for the unit with respect to multiple operation types and/or components inputs may be presented, as well as interface options for various key process indicators. Further, interface options may be activated to access options to adapt action programs with respect to each initiative, particular operation types, and particular resource sets. The action programs may be modified via interface options.

The aggregation and transformation engine 1004 and/or the modeling engine 1006 may include a reasoning module to make logical inferences from a set of the detected and differentiated data to infer one or more patterns corresponding to the resource profiles 808B-1 and/or performance data 808B-2. For instance, the pattern data may include information about any one or combination of identification histories, action and performance histories, location histories, allocation histories, and/or the like, any set of which may be used to derive one or more patterns of competency data, which may include performance data for particular resources and sets of resources. A pattern-based reasoner may be employed to use various statistical techniques in analyzing the data, both current and chronicled, in order to infer particularized pattern data from the data 811 and preliminary composites 1040. A transitive reasoner may be employed to infer relationships from a set of relationships to form the performance data. In various embodiments, the system automatically establishes and develops the particularized pattern data. In some embodiments, the modeling engine 1006 may be configured to employ deep learning to process the data 827A and derive the particularized pattern data corresponding to the resource profiles 808B-1 and/or performance data 808B-2. Accordingly, the modeling engine 1006 may facilitate machine learning or, more specifically, deep learning, to facilitate creation, development, and/or use of particularized pattern data that may include competency metrics, which may include performance metrics.

The resource specifications which may be included in a particular profile for a particular resource may include one or a combination of demographic specifications (e.g., experience metrics, length of time in a particular role and/or position, how long a resource has been in service, how long the resources been a particular unit, highest educational level, and/or like), skills specifications, key best practices, diagnoses/interventions/outcomes, community/pedigree attributes, and/or the like. Each of the resource specifications may be weighted, and the particular resource may be scored with respect to each resource specification such that each score may contribute to an overall competency level/score. Thus, competency metrics for a resource may include a multiplicity of factors, including performance metrics. As such, a competency score for particular resource may correspond at least in part to performance score values for the particular resource.

Performance metrics may include process metrics such as key process indicators, such as operational performance metrics, load metrics (e.g., hospital infection metrics and/or the like), rates of changes in performance metrics, rankings of resources and resources sets, and/or the like. Operational performance metrics may include measurements with respect to one or more particular operations and/or processes performed by a particular resource and/or set of resources. The modeling engine 1006 may analyze performance data to identify subsets of the data corresponding to one or more particular operations performed by one or more particular resources, where the engine 1006 classifies the one or more particular operations as corresponding to one or more operation types. The engine 1006 may match the one or more operation types to one or more process protocols 808B-5 specified for the particular resource respect to a particular load. The one or more protocols may specify one or more processes for the particular resource to perform with respect to the particular load. Each of the one or more processes may include one or more operations, such as the identified one or more particular operations corresponding to the identified one or more operation types. The analysis of the subsets of the performance data may include identifying completion of a set of operations prescribed by the one or more protocols for the particular resource and the particular load.

For example, the one or more protocols may specify target durations for performance of a particular operation of particular operation type. Accordingly, the analysis of the subsets the performance data may include analyzing time components of the subsets to determine one or more durations of one or more operation performances and compare the one or more durations to one or more specified target durations. The modeling engine 1006 may calculate deltas between the performance times and durations of the one or more operations with respect to the specified target times, and may assign speed score values as a function of the deltas. Likewise, the modeling engine 1006 may utilize the performance times and durations, numbers of operation completions, and/or other time metrics (e.g., working hours, overtime, etc.) for a set of operations in determining efficiency score values that are attributed to process(es) and/or operation(s) per unit of time. Efficiency score values, like the other metrics, may qualify performance according to individual operation types and/or process types, as well as cumulatively with respect to a plurality of different operation types and/or process types.

Similarly, the one or more protocols may specify target times of day and the like that the operations of the particular operation type should be completed. Accordingly, the analysis of the subsets the performance data may include analyzing time components of the subsets to determine completion of one or more operations of one or more operation types in conformance with the specified target times. The modeling engine 1006 may calculate deltas between the performance times and durations of the one or more operations with respect to the specified target times, and may assign timeliness score values as a function of the deltas.

As another example, the one or more protocols may specify a target frequency at which the operations of the particular operation type should be completed (e.g., X number of times per day, etc.). Accordingly, the analysis of the subsets the performance data may include analyzing time components of the subsets to determine completion of one or more operations of one or more operation types in conformance with the specified target frequency. The modeling engine 1006 may calculate deltas between the performance frequencies of the one or more operations with respect to the specified target frequency, and may assign reliability score values as a function of the deltas.

Further, the one or more protocols may specify a prescribed order in which different operations of one or more test types should be completed. Likewise, the one or more protocols may specify contingencies such that certain operations of one or more operation types should be conditionally completed dependent on prior completion of other operations and/or detection of certain conditions with respect to the load. Accordingly, the analysis of the subsets the performance data may include analyzing of the subsets to determine completion of one or more operations of one or more operation types in conformance with the prescribed order and/or contingencies. The modeling engine 1006 may compare performance indicators with respect to the prescribed order and/or contingencies, and may assign orderliness score values as a function of the variance or alignment with the prescribed order.

Additionally, performance metrics with respect to a particular resource and/or set of resources may further be based at least partially on load metrics for loads to which the resource and/or set of resources have been previously assigned. Chronicled patterns of such metrics may be recognized by the modeling engine 1006 along with the other pattern recognition and analysis disclosed herein. Such load metrics may include load conditions, such as infection rates of the loads and types of infections incurred, types and rates of adverse outcomes, and/or the like. The load metrics may be scored and factored into the performance score values of particular resources and resources.

Overall performance score values with respect to one or more operations and/or processes performed by a particular resource may include one or a combination of various other score values such as speed score values, timeliness score values, reliability score values, orderliness score values, load score values, and/or the like which may be used to derive a comprehensive performance and/or competency score. A score component may be accorded an individual weight according to an action program, and may correspond to one or more modifiers such as the difficulty modifiers disclosed further herein.

The performance metrics may take into account the entire resource population, the entire load population, and/or subsets thereof in order to characterize qualify performance of entire system, and discrete subsystems thereof. As part of that, the system-generated modeling and competency/performance metrics may include and use unit-based phenotypes. The modeling engine 1006 may, for example, derive subsystem-based phenotypes (e.g., unit-based phenotypes) that may include mathematical calculations for subsystem-level variance (e.g., unit-level variance corresponding to sets/subsets of resources) with respect to one or a combination of the competency and performance metrics. For example, with respect to a particular subsystem, such variance may describe the relative stability of the subsystem from a baseline of predetermined normality regarding one or more competency/performance metrics. Accordingly, subsystem-based phenotypes may be derived from a multiplicity of data domains that describe the interactions between one or more resources, one or more loads, and one or more operating environments. The subsystem-based phenotypes may further take into specifications of resources, loads, and processes. Retrospectively, known normality may be determined. From this baseline, each metric may be used to determine the current variance from normal. For example, there may be more variance caused by the "subsystem normal" being deviated from by having fewer loads today. Phenotype may then describe the largest portion of variance mapping/addressing to a particular metric or domain.

In accordance with various embodiments disclosed herein, subsystem-based phenotypes may be derived at least in part by one or more of the following. A set of subsystems may be identified as having one or more common specifications, based at least in part on recognition of instances where at least one the operation-performing resources of each subsystem of the set of the subsystems has been allocated to one or more of the loads having common attributes, common load conditions, and/or common load incidents. A baseline of normality may be determined based at least in part on pattern recognition of one or more competency metrics attributed to each subsystem of the set of subsystems, where the one or more competency metrics are based at least in part on the one or more subsystem performance metrics mapped to the subsystem. One or more variances attributed to one or more subsystems of the set of subsystems with respect to the baseline of normality may be determined. The graphical representations formatted to represent the modeling of the subsystem provided via the orchestration interface may represent the one or more variances.

The phenotype modeling may describe the largest variances from system-determined normalities with respect to any one or combination of the competency and performance metrics, the processes and/or operations, the resource specifications, and/or the load specifications. Within the domains of the phenotype modeling, each metric may have a calculated value of variance. Variances, inconsistencies, nonconformities, and deviations from the normalities may be determined based at least in part on comparing determined competency and performance metrics of sets of one or more resources with the pattern recognition of competency and performance metrics attributed to resources having common specifications and attributes, with recognition of instances where the resources have been assigned to loads having common specifications and attributes. Additionally or alternatively, the variances, inconsistencies, nonconformities, and deviations from the normalities may be determined based at least in part on comparing determined load conditions and incidents of sets of one or more loads with the pattern recognition of load conditions and incidents attributed to loads having common specifications and attributes. The orchestration subsystem 101-2 may learn to identify criticalities and problem areas when such variances, inconsistencies, nonconformities, and deviations satisfy one or more thresholds, which may include absolute thresholds and/or relative thresholds, as bases for auto-generation of action programs with-suggested values for parameters of the action programs, which auto-specifications may be confirmed, rejected, and/or modified via the orchestration interface (e.g., for example by an administrator via administered device 108).

One or more performance metrics of resource mapping/addressing for a particular resource may be determined within the context of the resource specifications and metrics for a subsystem of resources such as a unit phenotype. The resource mapping/addressing may indicate how well a particular resource performs in advancing a particular action program, where a set of multiple resources are allocated to the particular action program and where subsets of the multiple resources are allocated to the particular action program according to a timetable or other temporal specification that indicates particular blocks of times for which each subset has been assigned to the particular action program. Thus, the resource mapping/addressing may individually assess each resource of the multiple resources where the resource mapping/addressing may be at least partially a function of factors of complexities of one or more operations and/or processes performed by the particular resource with respect to one or more particular loads. Further, the resource mapping/addressing may be at least partially a function of resources specifications, which may include particular resource types/roles designations, experience metrics, training attributes, certification attributes, current allocation designations, chronicled allocation designations, and/or the like.

As disclosed further herein, the orchestration subsystem 101-2 may build action programs, including resource sets, for auto-specifications for acceptance, rejection, and/or modification via the orchestration interface. By way of example, having determined resource specifications and performance metrics profiles for each resource, the orchestration subsystem 101-2 may build resource sets based at least in part on the resource specifications and performance metrics profiles. From the phenotype model, a required level of competency for the specified processes and/or operations according to the action program may be a threshold. This may include building resource sets based at least in part on individual mapping/addressing metrics. The modeling engine 1006 may, for example, build resource subsets so that the subsets are balanced based at least in part on the resource specifications and performance metrics. Such balancing may be a function of the individual mapping/addressing score values. The modeling engine 1006 may determine each subset to have an aggregate score that is relatively balanced with respect to other subsets when allocating the subsets to perform the processes and/or operations in recurrent episodic manner according to the action program in sequential, recurring time periods of allocation according to the timetable or other temporal specification. In this manner, the modeling engine 1006 may allocate the subsets of resources for time periods of allocation so that a balanced competency is ensured for all time periods of allocation.

Additionally or alternatively, the modeling engine 1006 may, for example, allocate one or more resources to a particular load based at least in part on matching mapping/addressing score values of the one or more resources to the specifications for the particular load. This may replace conventional methods of allocation simply based on ratios of resources and loads.

Additionally or alternatively, the modeling engine 1006 may, for example, use the aggregate performance metrics of a particular subset of resources, as well as the individual performance metrics of particular resource to examine efficiency. For example, one subset of resources may include three resources a first type and to resources of a second type (e.g., three primary resources with two secondary resources) and a different subset of resources uses may include different numbers of resources and different resource types (e.g., three loads only). The modeling engine 1006 may identify each subset of resources is allocated to sets of loads that have common specifications and attributes. Thus, to some extent, both of subsets may be determined to be of the same unit type. Using the efficiency metrics (e.g., better than expected outcomes with less hours and less capable resources), the modeling engine 1006 may determine which of the two subsets is more efficient at performing the same processes and/or operations. This may be used by the orchestration subsystem 101-2 to allocate resources and particular resource sets.

The phenotype modeling by the modeling engine 1006 may specifically measure the performance of particular resources and sets of resources in completing role-based processes and/or operations specified by particular action programs in order to score engagement by the particular resources and sets of resources as a representation of contribution. Such qualification with respect to individual resources may be used to aggregate score values of resource sets, which may be used as calculated representations of subsystem effectiveness executing the action program. From this, the most effective resource sets may be compiled and resource that specifications may be replicated to like units at scale.

By way of example, this may include determining an average score that is the sum of score values per action program per the number of unique processes and/or operations. The score for a particular action may, for example, be a function of the number of unique processes and/or operations provided for by the action program. The action program may, for example, provide for a particular resource to perform a particular type of process and/or operation with respect to two particular loads with a frequency of two times per a first time frame for a specified duration. This may not only factor in an efficiency modifier that is a function of the number of resources, but also may factor in a difficulty modifier. The difficulty modifier may be a scaled value that is a function of the difference in the performance values. By way of example, the difference in the performance value may be represented in the above equation by the difference between the KPI performance at action program close and the KPI performance at action program start. The difficulty modifier may be applied to each integer in a performance improvement range. Performance with respect to an action program may receive points for multiple difficulties. However, other embodiments and variations are possible.

The resource orchestration subsystem 101-2 may utilize the performance data in creating, confirming, correcting, and/or refining resource allocation and action programs 808B-3, in some embodiments, employing an ongoing learning mode to do so. To that end, the adaptation engine 1008 may identify, create, and/or develop composites 1045 corresponding to the action programs. The adaptation engine 1008 may communicate with the modeling engine 1006 and/or the data storage system 808B to retrieve and/or otherwise receive resource data 808B-1, performance data 808B-2, resource allocation action program data 808B-3, training content 808B-4, and/or rules and protocols 808B-5 to use in creating and developing composites 1045. Thus, in some instances, the modeling engine 1006 may directly feed the adaptation engine 1008, and, in some instances, the adaptation engine 1008 may actively pull data from the data store system 808B. Accordingly, the modeling engine 1006 may use previously stored data and newly collected data 1004 to form and update the composites 1045.

The composites 1045 may conform to particular rules and protocols 808B-5 that may be load-specific and/or particular to certain types of loads and/or certain load conditions. The composite 1045 may be adapted to be resource-specific and may specify a set of role-based operations needed to be completed in order to fulfill the specifications of the protocol as implemented with a specific action program corresponding to the composite 1045. Each composite 1045 may correspond to an instance of a particular action program associated with a particular set of one or more resources.

FIG. 13 illustrates a diagram depicting a portion of the resource orchestration subsystem 101-2 including further aspects of the composite 1045 generation according to disclosed embodiments of the present disclosure. The composites 1045 may include process specifications 1045(*a*), resource specifications 1045(*b*), load specifications 1045(*c*), time specifications 1045(*d*), and/or performance specifications 1045(*e*). The process specifications 1045(*a*) may include process definitions, program definitions, and/or the like. The process specifications 1045(*a*) may specify one or more role-based operations for performance in accordance with the protocol. The resource specifications 1045(*b*) may specify one or more particular resources, particular resource types/roles designations, experience metrics, training attributes, certification attributes, current allocation designations, prior allocation designations, and/or the like (e.g., using digital identifiers, descriptors, etc.) mapped to at least one of the one or more role-based operations. The load specifications 1045(*c*) may specify one or more particular loads, particular load types, load conditions and metrics, and/or the like (e.g., using digital identifiers, descriptors, etc.) to which the one or more particular resources and one or more particular resource types may be allocated in accordance with the protocol. The time specifications 1045 (*d*) may include temporal specifications for the action program(s) and/or allocation(s) of the particular resource, and may include one or more of indications of times (e.g., start times, end times, durations, recurrence, etc.) governing allocation of the one or more resources and/or resource types to the one or more particular loads and/or particular load types, times of availability, times mapped to particular aspects of resource specifications 1045(*b*), times mapped to particular aspects of load specifications 1045(*c*), and/or the like. The performance specifications 1045(*e*) may specify performance metrics governing the action program such as current, past, and target times, frequencies, orders, efficiencies, and/or the like.

As the adaptation engine 1008 creates and/or otherwise develops one or more composites 1045, the adaptation engine 1008 may update the resource profiles 808B-1, performance data 808B-2, and/or allocation data and action programs data store 808B-3 so as to reflect current resource allocation specifications, action programs, assignments, availabilities, competency and performance attributes and metrics, and/or the like. Accordingly, the adaptation engine 1008 may correspond to a server or other processing device that manages resource profile and performance data, allocations, action programs, and/or the like. The adaptation engine 1008 may do so at least in part by receiving communications from a plurality of controlling devices 136 controlling individual resource allocations and/or action programs. Such management may enable the resource orchestration subsystem 101-2 to efficiently query, identify, instruct, and guide multiple resources regarding allocations, action programs, assignments, availabilities, competency and performance attributes, and/or the like. Accordingly, the resource orchestration subsystem 101-2 may generate action programs in real-time or near real-time, significant faster than may be conventionally done.

Each the composites 1045 may correspond to a containerized data structure that may be stored in the data storage system 808B and that containerizes the content object aggregations and node specifications with a data structure that can be passed to and ingested by other systems and components. Composites 1045 may be linked to other composites by way of one or a combination of specifications of addressing, links (which may include hyperlinks), and/or pointers or other references. For example, a particular composite 1045 for a particular load may contain specifications, links, and/or pointers or other references, which may be in an array or index, to one or more particular resources, one or more composites 1045 corresponding to the one or more particular resources, and/or one or more resource nodes corresponding to the one or more particular resources. Accordingly, transmitting the particular composite 1045 to one or more other systems, apps, etc. may effectively pass load specifications and a directory for a subsystem associated with that load.

Similarly, a particular composite 1045 for a particular resource may contain specifications, links, and/or pointers or other references to one or more particular loads, one or more composites 1045 corresponding to the one or more particular loads, and/or one or more load nodes corresponding to the one or more particular loads. Additionally, the particular composite 1045 for the particular resource may contain specifications, links, and/or pointers or other references, which may be in an array or index, to one or more other particular resources, one or more composites 1045 corresponding to the one or more other particular resources, and/or one or more load nodes corresponding to the one or more other particular resources. Such other particular resources may correspond to others on one or more subsystems of which the particular resource is a part.

The adaptation engine 1008 may include or otherwise be configured to provide a notification engine that modifies and transmits composites 1045 at least partially as a function of detected trigger events. Various sets of rules 808B-5 may provide for various types of specifications and/or restrictions on modifying and/or provisioning content composites 1045 that may be at least partially a function of trigger event criteria, resource specifications, and load specifications. Transmitting the particular composite 1045 to one or more other systems, apps, etc. may effectively pass resource specifications and a directory for all load allocations (e.g., load identifiers, facility identifiers, floor identifiers, room identifiers, bed identifiers, etc.), all roles, all subsystems, and/or the like associated with that particular resource. However, role-based access to such information may be restricted in accordance with embodiments disclosed herein such that a user of the orchestration interface may not have full access. In such cases, the system 101 may filter the particular composite 1045 to create a filtered composite 1045 that only contains information for which the user has a read access. Then, the filtered composite 1045 may transmitted to provide only the read-accessible information accorded to the user and the user role.

The adaptation engine 1008 may include or otherwise be configured to provide a notification engine that modifies and transmits composites 1045 at least partially as a function of detected trigger events. Various sets of rules 808B-5 may provide for various types of specifications and/or restrictions on modifying and/or provisioning content composites 1045 that may be at least partially a function of trigger event criteria, resource specifications, and load specifications. Transmitting the particular composite 1045 to one or more other systems, apps, etc. may effectively pass resource specifications and a directory for all load allocations, all roles, all subsystems, and/or the like associated with that particular resource. However, role-based access to such information may be restricted in accordance with embodiments disclosed herein such that a user of the orchestration interface may not have full access. In such cases, the system 101 may filter the particular composite 1045 to create a filtered composite 1045 that only contains information for which the user has a read access. Then, the filtered composite 1045 may transmitted to provide only the read-accessible information accorded to the user and the user role.

Figure 15:
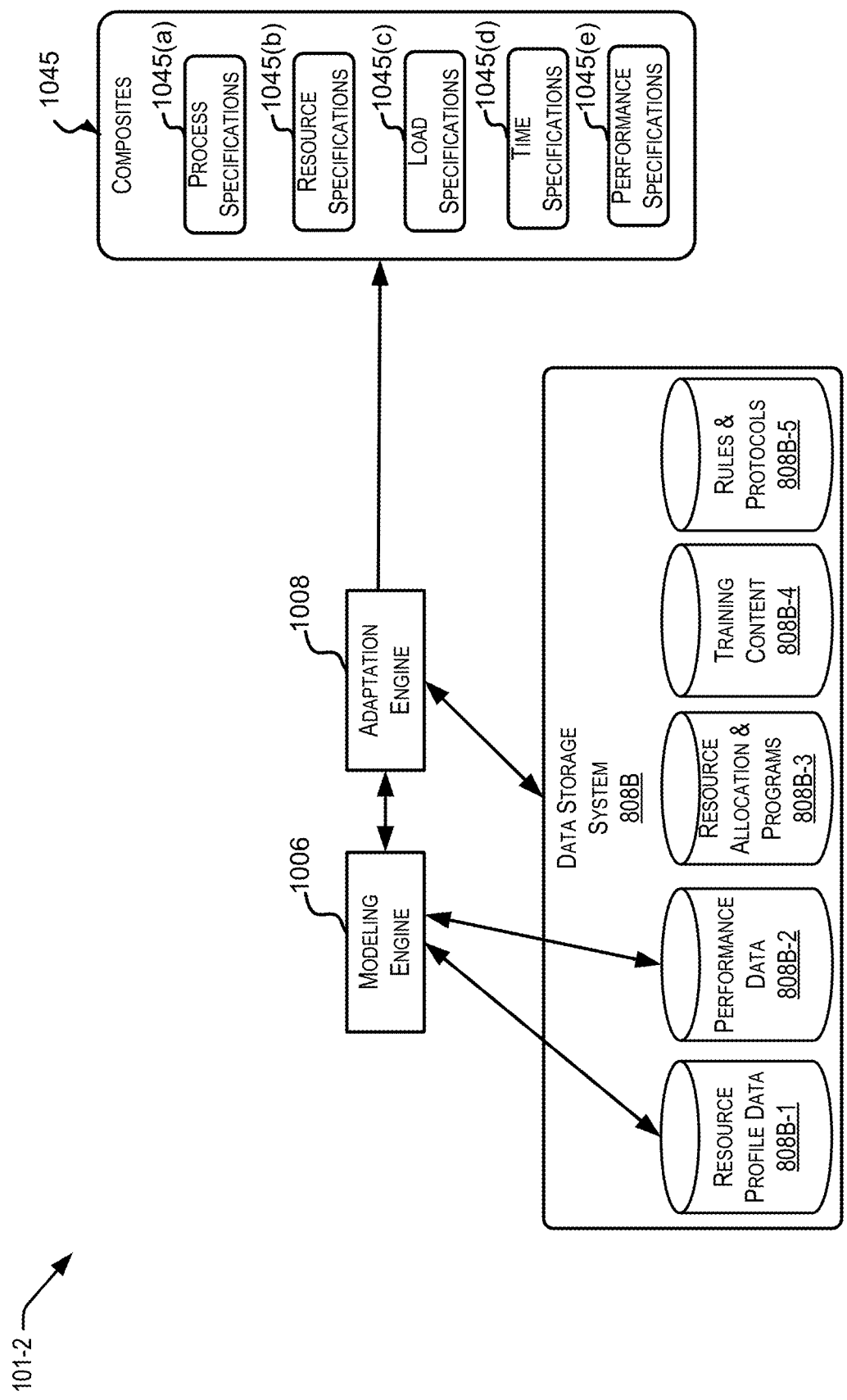
FIG. 15 illustrates a block diagram that depicts further aspects of composite generation, in accordance with embodiments of the present disclosure.
Figure 16:
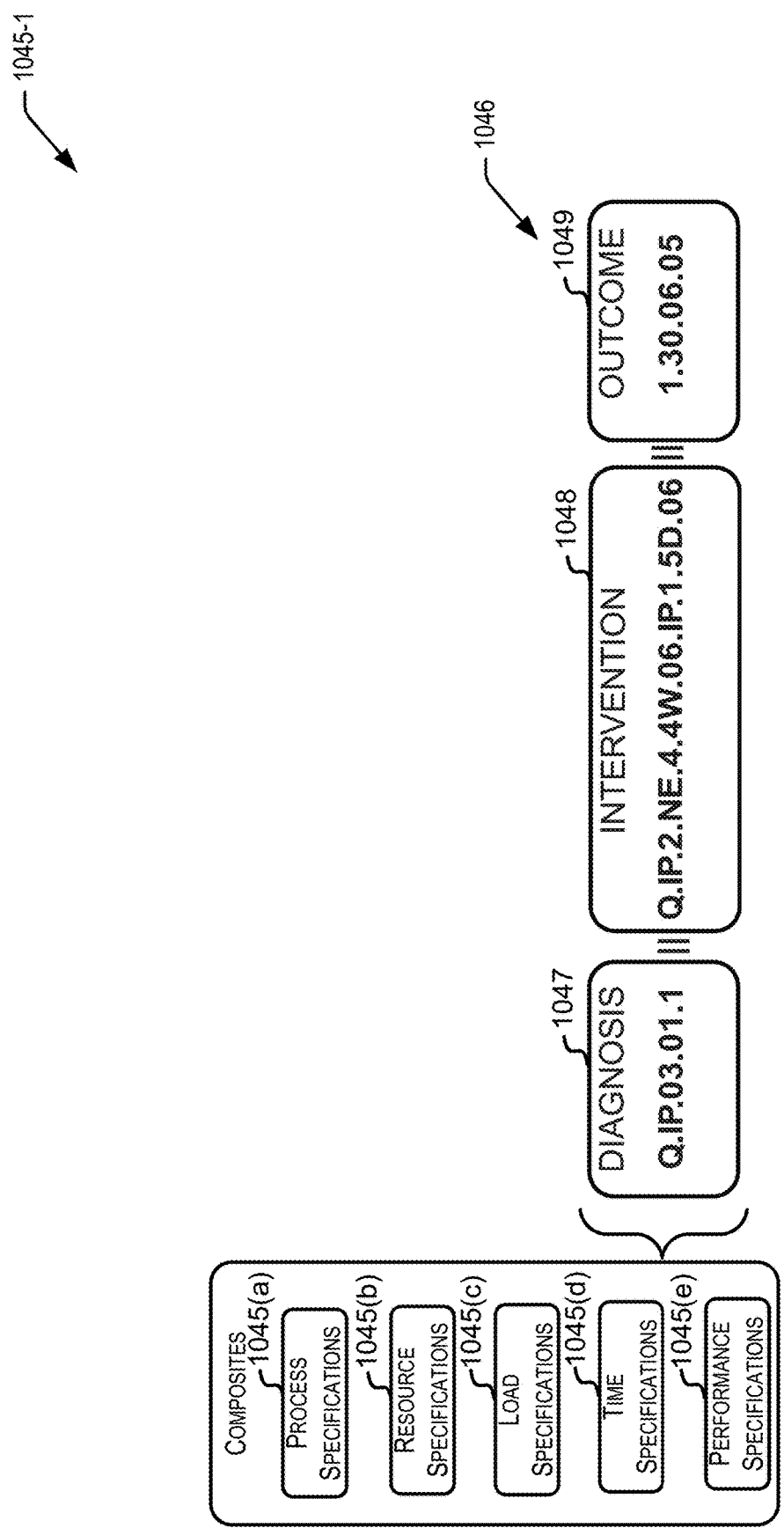
FIG. 16 illustrates a block diagram that depicts further aspects of the composites, in accordance with embodiments of the present disclosure.

FIG. 15 illustrates a diagram depicting further aspects of the composites 1045 according to disclosed embodiments of the present disclosure. Disclosed embodiments may provide a framework for adaptive action program and process generation, modeling, updating, sharing, and implementing. The framework may include adaptive codification of process definitions (e.g., action programming) and particular data structures to facilitate the action programs and composites 1045 for particular operating environments. Such codification may utilize a particularized codification system for automatic and/or semi-automatic creating, updating, sharing, and implementing action programs.

According to various embodiments, a composite 1045 may include data structure 1046 with objects and/or components to encapsulate a diagnosis 1047, an intervention 1048, and an outcome 1048 to specify an action program. Specifications may be written using code that may include a set of predefined terms. In some embodiments, the code may include text strings contained in objects/arrays and corresponding to the set of predefined terms. The predefined terms may be parsed from the code and automatically translated into a standard code format including a diagnosis portion, an intervention portion, and an outcome portion. Each unique combination of action program components may be associated with performance outcomes, as well as unit phenotype variables, enabling targeted scalability based on variables unique to the subsystem and/or load attributes.

The diagnosis object 1047 may specify parameters including strategic area, measure group, initiative, key process indicators, expected outcome, and/or the like. The intervention object 1048 may specify parameters including resource count, resource role, resource action types, resource frequency, resource duration, and/or the like. The outcome object 1049 may specify parameters including expected outcome, percentage improvement, duration of program, rate of change, and/or the like. The depicted example calls out some possible parameter values for the diagnosis object 1047, the intervention object 1048, and the outcome object 1049. Many other parameter values are possible.

The orchestration subsystem 101-2 may translate parameter value selections of the action program into natural language prose for human consumption and acceleration of document creation and development. For example, FIG. 14 illustrates simplified parameters specified for a particular data structure 1046. The adaptation engine 1008 may translate and map action program specifications and parameters into prose, such as, with respect to the illustrated parameters. With the orchestration subsystem 101-2 generating such translations and auto-populating documents with such translations, the subsystem may not only allocate resources and accelerate document creation and development of the resource orchestration, but also facilitate human characterization and executive summarization of some aspects of the underlying action program.

The parameter values may be based at least in part on endpoint input 811-1 received via the orchestration interface. Action program objects, options, specifications, selections, and features may, in some instances, be at least partially a result of accumulated interactions with the interface, including accumulated selections of user interface options. For example, with interface, parameter values for adapting action programs may be selected. An action program may be adapted via user-selectable options, with parameter values being selected for the action program via selections of the user-selectable options.

Additionally or alternatively, the orchestration subsystem 101-2 may determine action program objects, options, specifications, selections, and features. The orchestration subsystem 101-2 may generate the parameter values based at least in part on identifying deficiencies in competency and/or performance metrics. The orchestration subsystem 101-2 may determine such action program constructs provisionally in order to present a provisional action program via the orchestration interface for acceptance, rejection, and/or modification (e.g., for example by an administrator via administered device 108). The modeling engine 1006 may provide for guided decision support that is based at least in part on its predictive modeling that suggests the influencing metrics based at least in part on identifying by the system which metrics can be modified in order to control variance. Auto-specifications for action programs and parameters may be made by the orchestration subsystem 101-2, the specifications being presented with parameter values for the various specifications with respect to a particular action program.

Additionally, various embodiments may provide feedback options via the interface(s) for one or more client devices 108 (e.g., an administratory device) regarding correlation results determined by the modeling engine 1006 via the recognition processing. Questions and/or user-selectable options may be provided to allow user feedback information about the determinations provided by the system 101-2. For example, user-selectable options (e.g., via the orchestration interface or another device interface) provided with notifications (e.g., push notifications to the endpoint device, pop-up/modal windows with the orchestration interface, and/or the like) could be provided to allow administrative confirmation or correction of conditions detected. With the feedback loop features provided by way of the adaptation engine 1008, the modeling engine 1006 may employ an ongoing learning mode to confirm, correct, and/or refine determinations made for the auto-specifications, resource profile data, competency and/or performance metrics, load profile data, variances, criticality characterizations, and/or the like, heuristically adapting the determinations with the feedback to, over time, learn to make the determinations more effectively.

Accordingly, in conjunction with composite 1045 creation (i.e., action program creation), the modeling engine 1006 may allow for the visualization via the orchestration interface of effects of one metric upon other metrics, thereby indicating a best actionable metric to normalize variance. Along with the visualization and indication of various metrics, including the best actionable metric to normalize variance, user-selectable options may be provided with the orchestration interface to allow for user selection of one or more of the metrics for input into the composite 1045 creation process. By way of example, if a qualification mix of a subsystem is adjusted in the model via the orchestration interface, an end user may be able to see a visualization of predictive effects on load conditions and incidents, overtime, etc. as a result from the adjustment. Thus, the predictive modeling features of the modeling engine 1006 and the corresponding visualization features of the orchestration interface may allow for the best choices to be made when endpoint input 811-1 is collected for composite 1045 creation, in order to define effective processes for action programs for like resource sets.

The subsystem 101-2 may automatically generate allocations of individual resources to individual loads and/or otherwise provide guidance for allocation of individual resources to individual loads based at least in part on the resource and load models and profiles. In some embodiments, the automatically generated allocations may be provisional allocations that may be accepted, rejected, or modified, e.g., via input received via the orchestration interface, a controlling device 136, and/or client device 108. In some instances, such an allocation may be generated responsive to an electronic request from a client device 108 to generate one or more allocations. For example, the electronic request may indicate a particular load with one or more load specifications that may include a unique digital identifier for the particular load. In various embodiments, the electronic request may include load specifications of load identifiers, load metrics, load characteristics, a pertinent history feature, resource needs, a load condition, a diagnosis, a date, a time, a test, test result, and/or the like. In some embodiments, the electronic request may be generated with a user selection of an interface element of the orchestration interface.

However, in some instances, such an allocation may be generated without such an electronic request. The subsystem 101-2 may listen for data (e.g., HL7, X12N, ASTM, HL2, HCPDP), other data, and data changes relating to the load in one or more data streams. The system 101 may monitor load metrics detected regarding the load that can be collected via devices associated with load. The subsystem 101-2 may determine when load metrics and/or other load data satisfy certain criteria. In various embodiments, the aggregation engine 1004 may be configured to initiate agents configured to detect messages that may be transferred between elements of the network 100 (e.g., via network 236, 810, 820, via messaging bus 430, and/or the like) to detect one or more data changes that may be mapped to one or more particular load identifiers of one or more loads. The agents may be specific to message type, destination entity, and/or any other suitable characteristic. An agent may, in various embodiments, correspond to a bot, a listener, and/or the like, and may conform to ITI-41, HL7 v.2, HL7 v.3, C-CDA, NEMSIS, FHIR, XDs.b, XDR, or other suitable protocols. The agents can be used to detect and evaluate messages based on data included with the messages or otherwise related to the messages. The messages may include any suitable transfer of data corresponding to the network 100, including messages transmitting data, document transactions (e.g., saving, modifying, creating, sending, sharing, versioning, etc.), and the like which may be monitored for specifications and changes in types of data such as, for example, names of loads, assigned resources, assigned locations, services ordered, when tests are processed, commencement of procedures, conclusion of procedures, orders for tests, and/or the like. In various embodiments, the messages may include sensor data from the sensors 130 and/or load-coupled device output from load-coupled devices 106.

Accordingly, the listeners may be employed to detect data changes (e.g., trigger events) corresponding to the sensors 130 detecting phenomena, the load-coupled devices 106 outputting load-specific data, and/or the transfer of sensor data and load-coupled device output data directly to the subsystem 101-2 and/or indirectly to the adaptive system 101 (e.g., via a monitoring device). The system 101 may generate one or more allocations upon system 101 detection of components input 811 that the subsystem 101-2 recognizes as a trigger event to initiate resource allocation and/or reallocation. To that end, the subsystem 101-2 may apply rules 808B-5 that may include trigger event criteria. The trigger event criteria may specify various types of trigger events. The trigger events may include, for example, a load data set adjustment event; load admission, transitioning and/or assigning of the load to particular section (e.g., ER), different units and/or facilities for particular procedures and/or tests; an order event; transitioning and/or assigning of the load to a location and/or equipment; certain load metrics and/or load conditions; and/or the like. In some examples, the trigger events may be defined by criteria for when one or more detected data changes constitute one or more state changes that correspond to one or more trigger events. In some embodiments, detecting a trigger event may trigger initiating one or more listeners to detect messages based on a set of message criteria included in the trigger event criteria. The message criteria may indicate the message as a type of message to be intercepted. In some examples, the aggregation engine 1004 may parse the message to determine details about the message that fulfill the message criteria. Thus, the subsystem 101-2 may determine when load metrics and/or other load data satisfy certain criteria by detecting one or more signals satisfy one or more thresholds for one or more corresponding conditions, and the subsystem 101-2 may consequently generate one or more allocations. For example, this may include detecting when sensor readings of vital signs of the load indicate a particular load condition, and analyzing current allocations of resources to the load to determine whether the resource include a particularly qualified resource for the condition. If not, the subsystem 101-2 may initiate allocation processes to allocate a particularly qualified resource to the load.

As part of the allocation processes, the subsystem 101-2 may assess current allocation states of the subsystem assigned to a load. Consequent to identifying the particular load per the electronic request or per the trigger event, the subsystem 101-2 may identify further load specifications for the load. This may include load specifications attendant with the request. Additionally or alternatively, this may include gathering load specifications from the components input 811 as disclosed herein. Additionally or alternatively, this may include the subsystem 101-2 may query the load specifications 1045(*c*) (e.g., corresponding to the load node of the particular load). When new load data is gathered with the request and/or the components input 811, the subsystem 101-2 may augment, consolidate, and/or otherwise update the load specifications 1045(*c*) with the new load data. Having identified the load specifications for the particular load, the subsystem 101-2 may query the resource allocation data store 808B-3 to identify a model of effective resource-load allocations linked to certain load specifications and attributes of the particular load, such as a certain condition, a certain criticality of condition, a certain process, a use or discontinued use of a particular medical device, and/or the like. With a matching model identified, the subsystem 101-2 may assess the current resource allocation for the load in view of the model specifications for a resource subsystem. Such specifications may indicate numbers and types of resources for a load having the load's specifications and attributes. The assessment may include identifying conformities, variances, inconsistencies, deviations, and/or nonconformities of the current resource allocation with respect to the model specifications that satisfy one or more thresholds, and, consequently, may map one or more deficiencies of the current allocation to available or potentially available resources from the allocation specifications in the resource allocation data store 808B-3 that may be newly allocated to the load in order to remedy the deficiencies.

Figure 17:
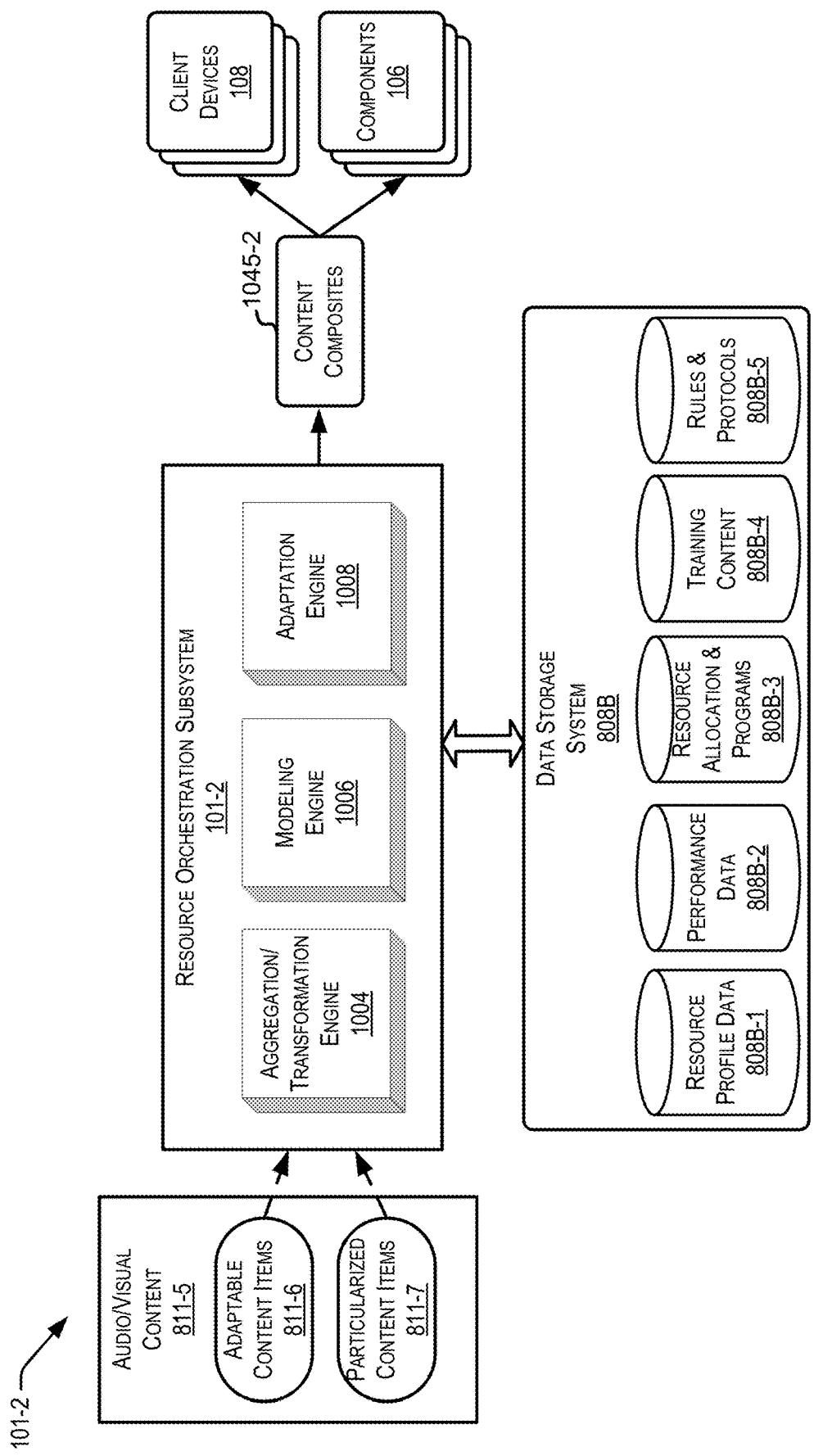
FIG. 17 illustrates a block diagram that depicts a portion of the control system including further aspects of composite generation, in accordance with embodiments of the present disclosure.

FIG. 17 illustrates a diagram depicting a portion of the resource orchestration subsystem 101-2 including further aspects of composite 1045-2 generation according to disclosed embodiments of the present disclosure. As part of the determining of resource specifications and competency and/or performance metrics, the resource orchestration system 101-2 may not only identify levels of competency of each individual resource in performing processes and/or operations, but also identify and create individualized training content targeted to particular resources as a function of the particular levels of competency mapped to the particular resources. As disclosed above, variances, inconsistencies, nonconformities, and deviations from the normalities may be determined based at least in part on comparing determined competency and/or performance metrics of sets of one or more resources with the pattern recognition of competency and/or performance metrics attributed to resources having common specifications and attributes and/or resources allocated to loads having common specifications and attributes. For example, a resource on a unit may not be performing as well as like resources in certain areas. As another example, it may be determined that the resource needs training with a particular procedure or working with particular equipment. This may be determined based on an action of the user (e.g., waving their hand in front of a piece of equipment) or based on a resource experience profile that indicates a lack of knowledge regarding performing the particular procedure or operating the load processing equipment. Similarly, new resources during orientation may be identified with a baseline competency score. The data collected during the orientation may be used to identify particular training programs for each resource to make up deficiencies of experience during orientation. The orchestration subsystem 101-2 may identify when such variances, inconsistencies, nonconformities, and deviations with respect to a particular resource satisfy one or more thresholds, and, consequently, may map one or more deficiencies of the particular resource to a set of training specifications in order to develop training content and a training program targeted to the particular resource. By way of example, the orchestration subsystem 101-2 may classify training specifications for a particular resource by one or combination of event, role, certification, procedure, process, operation, device/component, load specifications/condition, location, time, and/or the like. Values, descriptors, flags, identifiers, and/or the like for such training specification classifications may be mapped to the particular resource based at least in part on the identified deficiencies and/or requests associated with the resource.

The resource orchestration subsystem 101-2 (e.g., the modeling engine 1006 and/or the adaptation engine 1008) may include an audiovisual control engine that, as with disclosed embodiments of the other engines, may include instructions retained in processor-readable media and to be executed by one or more processors. The resource orchestration subsystem 101-2 may be configured to retrieve and receive audio and/or visual content 811-5, which may be received and/or retrieved via the network interfaces 810A from one or a combination of different sources such as client devices 108 and/or any other suitable component of the interaction system 100. In various embodiments, sets of one or more adaptable content items 811-6 and/or sets of one or more content item objects 811-7 may be transmitted to the subsystem 101-2 in batches. For example, sets of one or more adaptable content items 811-6 and/or sets of one or more content item objects 811-7 may be transmitted to the subsystem 101-2 on a periodic or otherwise pre-determined basis.

The audio and/or visual content 811-5 may include various components, including without limitation, one or more video tracks, audio tracks, audio video tracks, metadata tracks, close captioning information, and/or the like. The resource orchestration subsystem 101-2 may store the audio and/or visual content 811-5 in the training content storage 808B-4. The content may include adaptable content items 811-6 and particularized content objects 811-7. The adaptable content items 811-6 may correspond to audio/visual training content that is directed to certain resource roles, resource certifications, components 106, processes and/or operations, load conditions, competency categories, and/or the like. The adaptable content items 811-6 may be adaptable with the particularized content objects 811-7 to a greater level of particularity and specificity in the training content so that the content may be adapted for a particular resource as a function of the identified one or more deficiencies of the resource with regard to certain resource roles, resource certifications, components 106, processes and/or operations, load conditions, competency categories, and/or the like. In various embodiments, the adaptable content items 811-6 and/or the content item objects 811-7 may correspond to any one or combination of raw data, unstructured data, structured data, information, and/or content which may include media content, text, documents, files, instructions, code, executable files, images, video, audio, audio video, and/or any other suitable content suitable for embodiments of the present disclosure.

One or a combination of the engines 1004, 1006, and/or 1008 may be configured to analyze, classify, categorize, characterize, tag, and/or annotate the content 811-5, the adaptable content items 811-6, and/or the particularized content objects 811-7. The generated metadata (e.g., one or more tags) may correspond to identifiers, attributes, characteristics, and/or categories of the content 811-5, the adaptable content items 811-6, and/or the particularized content objects 811-7. The content 811-5, the adaptable content items 811-6, and/or the particularized content objects 811-7 may be augmented with the metadata and then stored in augmented forms in the training content storage 808B-4. In some embodiments, the content 811-5, the adaptable content items 811-6, and/or the particularized content objects 811-7 may be packetized and assigned packet identifiers. A particular packet identifier may be associated with data packets related to tags for particular segments of metadata-augmented content 811-5, adaptable content items 811-6, and/or particularized content objects 811-7. Tag data may include an indication of a period of time (or other measure of time, e.g., a number of frames), a start frame, an end frame, and/or the like. Tag data may include or otherwise be associated with one or more tag identifiers and may include attribute and category identifiers such as one or a combination of event, role, certification, procedure, process, operation, device/component, load specification/condition, location, time, and/or the like identifiers.

The metadata for adaptable content items 811-6 may, for example, identify the adaptable content items 811-6 as being adaptable with any suitable identifier, such as a flag, field value, etc. Additionally or alternatively, the metadata for the adaptable content items 811-6 may identify that the adaptable content items 811-6 are designated for a certain event, role, certification, procedure, process, operation, device/component, load specification/condition, location, time, and/or the like with any suitable identifier. Additionally or alternatively, the metadata for the adaptable content items 811-6 may identify transition points, hooks, frames, windows, other portions designated for overlays, and/or the like for merging with content objects 811-7 such that content from the content objects 811-7 is merged at the transition points, hooks, frames, windows, other portions designated for overlays, and/or the like.

In some embodiments, the guidance engine 1006 may include a multiplexer and may be configured to create a digital stream of data packets containing the video and/or audio corresponding to content composites 1045-2. The content composites 1045-2 may be created with the adaptable content items 811-6 and/or the particularized content objects 811-7. Sets of one or more adaptable content items 811-6 and/or particularized content objects 811-7 may be selected (e.g., by the modeling engine 1004 and/or the adaptation engine 1008) for designated time periods by way of tag data or other metadata matched to the identified one or more deficiencies and/or requests associated with the resource based at least in part on rules 808B-5 which may specify training specifications such as event, role, certification, procedure, process, operation, device/component, load specifications/condition, location, time, and/or the like in order to automatically adapt training content presentation for particular resources, resource needs, and trigger events. Various sets of rules 808B-5 may provide for various types of restrictions and/or specifications on creating and/or provisioning content composites 1045-2 that may be at least partially a function of the training specifications and trigger event criteria.

The trigger event criteria may specify various types of trigger events. The manner in which content composites 1045-2 may be presented may be dependent on the different types of events. A trigger event may correspond to one or a combination of different types of endpoint input 811-1, sensor data 811-4, and/or other components input 811. For example, the trigger event may include user selection and/or request via an interface of a client device 108 and/or a component 106 (e.g., selection of a user-selectable interface options, voice activation/request, other user action which may include gestures such as waving hand in front of a piece of load processing equipment, scanning the tag or badge, etc.), user entry of information (e.g., login information, code, identifier, etc.), one or more sensors 130 and/or components 106 detecting a change in a condition of a load, based on the user's resource profile being determined by the subsystem to indicate a lack of knowledge or experience regarding performing the particular procedure or operating the load processing equipment, and/or the like.

Additionally or alternatively, a trigger event may correspond to one or a combination of one or more sensors 130 detecting phenomena with respect to the resource such as a location of the resource. For example, the sensor data may be used by the subsystem 101-2 to determine a location of the resource (e.g., to determine that a resource may be in a particular facility, floor, section, and room). The location detection may be based at least in part on one or a combination of GPS, Wi-Fi access points, cellular triangulation, equipment sensors, RFID device signals, and/or the like of one or more devices mapped to the resource, and/or other techniques for determining a current location of a resource.

Additionally or alternatively, the detecting phenomena with respect to the resource may include user-provided and/or automatically collected biometric data (e.g., voice recognition, facial recognition, fingerprint scanning, retina scanning, etc.) and/or the like. By way of example, in some embodiments, the orchestration subsystem 101-2 may perform audio analysis of audio data captured with the audio sensors/microphones 130 to facilitate targeted training content presentation responsive to audio input of the identified resource. One or more of the engines of the orchestration subsystem 101-2 may include an audio analyzer and handling module to facilitate that detection. By way of analyzing audio, acoustic spectrum analysis, and/or the like, the modeling engine 1006 may, for example, learn patterns of sensor-based data metrics corresponding to audio characteristics, such as tonal, pitch, and volume characteristics; keywords and corresponding language used; cadence, pauses, and accents; ambient noise; and/or the like as distinctive markings of particular resources. For example, an acoustic analysis may include analyzing and identifying the sample for acoustic characteristics such as frequencies, intensities, tones, pitches, and/or the like audio metrics over time and mapping distinctive characteristics to particular individuals. The different audio metric types may be bases for various audio metric categories. Ranges of audio metric values for the different audio metric types may be mapped to audio metric categories. The modeling engine 1006, for example, may select values of one or a combination of the acoustic metrics as distinctive markings and may compile the values as an acoustic impression for the purposes of characterizing an individual. In various embodiments, the correlation may be based at least in part on matching selected values of the acoustic metrics (e.g., distinctive values such as peaks, baselines, averages, etc.) to acoustic metric ranges of values specified for certain audio metric categories.

In a similar manner, with some embodiments, the orchestration subsystem 101-2 may perform image analysis of image data captured with cameras to determine one or more image baselines for individuals and particular locations. Captured facial image data may be attributed to reference images using any suitable facial trait qualifications for correlation. The modeling engine 1006, for example, may link particular image data to resource specifications with image data associated with resources for unique identification of each resource. The reference image data, which may be stored in the resource profiles, may be refined over time as an image baseline(s) for a particular resource is developed with additional data captures. Likewise, the orchestration subsystem 101-2 may unique identifier resources with the other forms of biometric identification.

The orchestration subsystem 101-2 may further analyze locations of the resources with respect to particular loads to facilitate mapping of one or more of the above-described types of input regarding the resources to particular locations. For example, when sensor input is received via one or more sensors 130, the adaptation engine 1008, for example, may map the input to a location based at least in part on location assignment information for the one or more sensors 130 and/or location detection and location assignment information from the load profile data for a particular load.

Thus, provisioning of content composites 1045-2 may be differentiated according to event type, with time, place, and/or manner restrictions/specifications contingent on event type. Restrictions on and/or specifications of the manner in which content composites 1045-2 may be presented may include differentiating types of client devices 108 and/or components 106 (e.g., smart phone versus laptop computer, laptop computer versus smart TV, smart speaker with virtual assistant versus particular equipment, etc.) which will present the content composites 1045-2. The content composites 1045-2 may, for example, be presented within a room (e.g., on a smart TV), as an on-demand request for information. Accordingly, the content composites 1045-2 may be particularized to remediate the identified deficiencies and/or requests with regard to certain resource roles, resource certifications, components 106, processes and/or operations, load conditions, competency categories, and/or the like. This may not only allow the orchestration subsystem 101-2 to present adapted training for particular resources, but also present just-in-time, adapted, micro-training when it is needed by the resource (e.g., when a resource is about to perform a particular process and/or operation, operate particular equipment 106, processing a particular load having a certain condition, when a deficiency is identified as a resource interacts with the orchestration interface, etc.) and where it is needed by the resource (e.g., in a particular room, in conjunction with a particular device/component 106, on demand on a client device 108, etc.).

It will also be appreciated that presentations disclosed and/or illustrated herein can be configured to provide various types of interaction capabilities and/or presentation types. For example, presentations can identify whether and/or an extent to which a variable exceeds or misses a target threshold and/or how the variable may be changing over time. Presentations can be presented in a manner such that entities associated with particular data are identified, anonymized and/or conditionally identified (e.g., depending on a reviewer). Presentations can be dynamic such that new data may be routinely reflected in the presentation and/or interactive such that a variable selection, constraint identification, degree of summarization and entity representation can be modified in response to particular user input.

Specific details are given in the above description to provide a thorough understanding of the embodiments. However, it may be understood that the embodiments can be practiced without these specific details. For example, circuits can be shown in block diagrams in order not to obscure the embodiments in unnecessary detail. In other instances, well-known circuits, processes, algorithms, structures, and techniques can be shown without unnecessary detail in order to avoid obscuring the embodiments.

Implementation of the techniques, blocks, steps and means described above can be done in various ways. For example, these techniques, blocks, steps and means can be implemented in hardware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it may be noted that the embodiments can be described as a process which may be depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. A process may be terminated when its operations are completed, but could have additional steps not included in the figure. A process can correspond to a method, a function, a procedure, a subroutine, a subprogram, etc. When a process corresponds to a function, its termination corresponds to a return of the function to the calling function or the main function.

Furthermore, embodiments can be implemented by hardware, software, scripting languages, firmware, middleware, microcode, hardware description languages, and/or any combination thereof. When implemented in software, firmware, middleware, scripting language, and/or microcode, the program code or code segments to perform the necessary processes can be stored in a machine readable medium such as a storage medium.

For a firmware and/or software implementation, the methodologies can be implemented with modules (e.g., procedures, functions, and so on) that perform the functions described herein. Any machine-readable medium tangibly embodying instructions can be used in implementing the methodologies described herein. For example, software codes can be stored in a memory. Memory can be implemented within the processor or external to the processor. As used herein the term "memory" refers to any type of long term, short term, volatile, nonvolatile, or other storage medium and may be not to be limited to any particular type of memory or number of memories, or type of media upon which memory may be stored.

Moreover, as disclosed herein, the term "storage medium" can represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but may be not limited to portable or fixed storage devices, optical storage devices, wireless channels, and/or various other storage mediums capable of storing that contain or carry instruction(s) and/or data.

While the principles of the disclosure have been described above in connection with specific apparatuses and methods, it may be to be clearly understood that this description may be made only by way of example and not as limitation on the scope of the disclosure.

What is claimed:

1. A method to orchestrate process-performing resources and process protocols particularized to individual resources and loads, the method comprising:

monitoring at least one interface of a monitoring device of a control system, for data changes in one or more data streams, the data changes originating from one or more client devices, one or more control devices, and one or more sensors of a plurality of interconnected electronic devices connected via a network;

consequent to the monitoring the at least one interface, detecting, by the control system, data changes in the one or more data streams and identifying the data changes as corresponding to one or more of:

indicia of device interactions or data changes that correspond to process and operation performances by operation-performing resources;

indicia of conditions of loads corresponding to exceeding a threshold, exhibiting an above-threshold change, or having a particular value;

indicia of processes and operations associated with the operation-performing resources and the loads;

aggregating, by utilizing an aggregation and transformation engine of the control system, a plurality of data items from the one or more data streams at least in part by:

for each electronic communication:

processing the electronic communication to identify one or more digital identifiers uniquely mapped to one or more of the operation-performing resources and one or more of the loads; and extracting and caching a data portion from the electronic communication;

consolidating the data portions and mapping the consolidated data portions to one or more resource profile records and/or one or more load profile records that are stored in one or more resource data storages and/or one or more load data storages;

updating the one or more resource profile records and/or one or more load profile records with the consolidated data portions, where the one or more resource profile records comprise allocation specifications that comprise one or more digital identifiers for particular resources that correspond to one or more of a name, an identification number, an alphanumeric string, a user identifier, or contact information;

for each operation-performing resource:

identifying, by the control system, one or more protocols that include one or more parameter constraints according to specifications of process performance and operation performance;

using, by the control system, at least one of the one or more resource profile records and the one or more load profile records to model the operation-performing resource, wherein the modeling comprises determining one or more individual performance metrics mapped to the operation-performing resource, each individual performance metric being a function of the one or more identified protocols and at least some of the consolidated data portions; and mapping, by the control system, the operation-performing resource to one or more subsystems, each subsystem configured with set of operation-performing resources;

for each subsystem, using, by the control system, at least one of the one or more individual performance metrics of at least one of the operation-performing resources mapped to the subsystem to model the subsystem, wherein the modeling is based at least in part on the control system recognizing identifiers of at least some of the plurality of data items by one or more of machine learning, code mapping, keyword recognition, user-defined, heuristic, or other method of recognition;

creating, by the control system, a composite based at least in part on the modeling, the composite specifying a configuration of one of the subsystems with a selected set of the operation-performing resources to perform a defined process in accordance with one or more selected protocols; and causing, by the control system, transmission of the composite to one or more endpoint devices mapped to one or more one resource identifiers, and controlling allocation of the selected set of the operation-performing resources to perform the defined process in accordance with the one or more selected protocols.

2. The method to orchestrate process-performing resources and process protocols particularized to individual resources and loads as recited in claim 1, the method further comprising:

consequent to the monitoring the at least one interface, detecting, by the control system, one or more subsequent data changes in the one or more data streams and identifying the one or more subsequent data changes as corresponding to one or more of:

indicia of device interactions or data changes that correspond to process and operation performances by at least one the selected set of the operation-performing resources;

indicia of conditions of loads mapped to the at least one the selected set of the operation-performing resources;

indicia of processes and operations associated with the at least one the selected set of the operation-performing resources and the loads mapped to the at least one the selected set of the operation-performing resources; and based at least in part on the one or more subsequent data changes, learning, by the control system, a pattern of performance metrics mapped to the selected set of the operation-performing resources.

3. The method to orchestrate process-performing resources and process protocols particularized to individual resources and loads as recited in claim 2, the method further comprising:

creating, by the control system, a second composite based at least in part on the learning, the second composite specifying a different configuration of the one of the subsystems with a second selected set of the operation-performing resources; and causing, by the control system, transmission of the second composite and controlling allocation of the second selected set of the operation-performing resources to perform the defined process or a second defined process.

4. The method to orchestrate process-performing resources and process protocols particularized to individual resources and loads as recited in claim 3, the method further comprising:

based at least in part on the pattern of performance metrics, determining, by the control system, one or more variances attributed to selected set of the operation-performing resources with respect to a baseline determined based at least in part on pattern recognition of performance metrics attributed to each subsystem of a set of subsystems; and configuring a second subsystem based at least in part on the one or more variances.

5. The method to orchestrate process-performing resources and process protocols particularized to individual resources and loads as recited in claim 4, the method further comprising:

creating a data structure to implement the composite with a selected set of parameters corresponding to the specifications.

6. The method to orchestrate process-performing resources and process protocols particularized to individual resources and loads as recited in claim 5, the method further comprising:

configuring a program corresponding to operations of the defined process in accordance with the one or more selected protocols, the composite corresponding to the program.

7. The method to orchestrate process-performing resources and process protocols particularized to individual resources and loads as recited in claim 6, the method further comprising:

for each operation-performing resource and for each subsystem:

creating a graphical representation formatted to represent the modeling of the operation-performing resource and the modeling of the subsystem; and causing transmission of visualization data corresponding to the graphical representation to allow access to the graphical representation of the modeling of the operation-performing resource and the modeling of the subsystem.

8. A system to orchestrate process-performing resources and process protocols particularized to individual resources and loads, the system comprising:

one or more interfaces that receive a set of electronic communications via a network from a plurality of electronic devices, where the electronic devices correspond to one or more client devices, one or more control devices, and/or one or more sensors;

one or more processors; and one or more non-transitory, computer-readable storage media containing instructions which, when executed on the one or more processors, cause the one or more processors to perform operations comprising:

monitoring at least one interface of a monitoring device for data changes in one or more data streams, the data changes originating from one or more client devices, one or more control devices, and one or more sensors of a plurality of interconnected electronic devices connected via a network;

consequent to the monitoring the at least one interface, detecting data changes in the one or more data streams and identifying the data changes as corresponding to one or more of:

indicia of device interactions or data changes that correspond to process and operation performances by operation-performing resources;

indicia of conditions of loads corresponding to exceeding a threshold, exhibiting an above-threshold change, or having a particular value;

indicia of processes and operations associated with the operation-performing resources and the loads;

aggregating a plurality of data items from the one or more data streams at least in part by:

for each electronic communication:

processing the electronic communication to identify one or more digital identifiers uniquely mapped to one or more of the operation-performing resources and one or more of the loads; and extracting and caching a data portion from the electronic communication;

consolidating the data portions and mapping the consolidated data portions to one or more resource profile records and/or one or more load profile records that are stored in one or more resource data storages and/or one or more load data storages;

updating the one or more resource profile records and/or one or more load profile records with the consolidated data portions, where the one or more resource profile records comprise allocation specifications that comprise one or more digital identifiers for particular resources that correspond to one or more of a name, an identification number, an alphanumeric string, a user identifier, or contact information;

for each operation-performing resource:

identifying one or more protocols that include one or more parameter constraints according to specifications of process performance and operation performance;

using at least one of the one or more resource profile records and the one or more load profile records to model the operation-performing resource, wherein the modeling comprises determining one or more individual performance metrics mapped to the operation-performing resource, each individual performance metric being a function of the one or more identified protocols and at least some of the consolidated data portions; and mapping the operation-performing resource to one or more subsystems, each subsystem configured with set of operation-performing resources;

for each subsystem, using at least one of the one or more individual performance metrics of at least one of the operation-performing resources mapped to the subsystem to model the subsystem, wherein the modeling is based at least in part on recognizing identifiers of at least some of the plurality of data items by one or more of machine learning, code mapping, keyword recognition, user-defined, heuristic, or other method of recognition;

creating a composite based at least in part on the modeling, the composite specifying a configuration of one of the subsystems with a selected set of the operation-performing resources to perform a defined process in accordance with one or more selected protocols; and causing transmission of the composite to one or more endpoint devices mapped to one or more one resource identifiers, and controlling allocation of the selected set of the operation-performing resources to perform the defined process in accordance with the one or more selected protocols.

9. The system to orchestrate process-performing resources and process protocols particularized to individual resources and loads as recited in claim 8, the operations further comprising:

consequent to the monitoring the at least one interface, detecting one or more subsequent data changes in the one or more data streams and identifying the one or more subsequent data changes as corresponding to one or more of:

indicia of device interactions or data changes that correspond to process and operation performances by at least one the selected set of the operation-performing resources;

indicia of conditions of loads mapped to the at least one the selected set of the operation-performing resources;

indicia of processes and operations associated with the at least one the selected set of the operation-performing resources and the loads mapped to the at least one the selected set of the operation-performing resources; and based at least in part on the one or more subsequent data changes, learning a pattern of performance metrics mapped to the selected set of the operation-performing resources.

10. The system to orchestrate process-performing resources and process protocols particularized to individual resources and loads as recited in claim 9, the operations further comprising:

creating a second composite based at least in part on the learning, the second composite specifying a different configuration of the one of the subsystems with a second selected set of the operation-performing resources; and causing transmission of the second composite and controlling allocation of the second selected set of the operation-performing resources to perform the defined process or a second defined process.

11. The system to orchestrate process-performing resources and process protocols particularized to individual resources and loads as recited in claim 10, the operations further comprising:
based at least in part on the pattern of performance metrics, determining one or more variances attributed to selected set of the operation-performing resources with respect to a baseline determined based at least in part on pattern recognition of performance metrics attributed to each subsystem of a set of subsystems; and
configuring a second subsystem based at least in part on the one or more variances.

12. The system to orchestrate process-performing resources and process protocols particularized to individual resources and loads as recited in claim 11, the operations further comprising:
creating a data structure to implement the composite with a selected set of parameters corresponding to the specifications.

13. The system to orchestrate process-performing resources and process protocols particularized to individual resources and loads as recited in claim 12, the operations further comprising:
configuring a program corresponding to operations of the defined process in accordance with the one or more selected protocols, the composite corresponding to the program.

14. The system to orchestrate process-performing resources and process protocols particularized to individual resources and loads as recited in claim 13, the operations further comprising:
for each operation-performing resource and for each subsystem:
creating a graphical representation formatted to represent the modeling of the operation-performing resource and the modeling of the subsystem; and
causing transmission of visualization data corresponding to the graphical representation to allow access to the graphical representation of the modeling of the operation-performing resource and the modeling of the subsystem.

15. One or more non-transitory, machine-readable storage devices storing machine-executable instructions that, when executed by one or more processing devices, configure the one or more processing devices to perform operations comprising:
monitoring at least one interface of a monitoring device for data changes in one or more data streams, the data changes originating from one or more client devices, one or more control devices, and one or more sensors of a plurality of interconnected electronic devices connected via a network;
consequent to the monitoring the at least one interface, detecting data changes in the one or more data streams and identifying the data changes as corresponding to one or more of:
indicia of device interactions or data changes that correspond to process and operation performances by operation-performing resources;
indicia of conditions of loads corresponding to exceeding a threshold, exhibiting an above-threshold change, or having a particular value;
indicia of processes and operations associated with the operation-performing resources and the loads;
aggregating a plurality of data items from the one or more data streams at least in part by:
for each electronic communication:
processing the electronic communication to identify one or more digital identifiers uniquely mapped to one or more of the operation-performing resources and one or more of the loads; and
extracting and caching a data portion from the electronic communication;
consolidating the data portions and mapping the consolidated data portions to one or more resource profile records and/or one or more load profile records that are stored in one or more resource data storages and/or one or more load data storages;
updating the one or more resource profile records and/or one or more load profile records with the consolidated data portions, where the one or more resource profile records comprise allocation specifications that comprise one or more digital identifiers for particular resources that correspond to one or more of a name, an identification number, an alphanumeric string, a user identifier, or contact information;
for each operation-performing resource:
identifying one or more protocols that include one or more parameter constraints according to specifications of process performance and operation performance;
using at least one of the one or more resource profile records and the one or more load profile records to model the operation-performing resource, wherein the modeling comprises determining one or more individual performance metrics mapped to the operation-performing resource, each individual performance metric being a function of the one or more identified protocols and at least some of the consolidated data portions; and
mapping the operation-performing resource to one or more subsystems, each subsystem configured with set of operation-performing resources;
for each subsystem, using at least one of the one or more individual performance metrics of at least one of the operation-performing resources mapped to the subsystem to model the subsystem, wherein the modeling is based at least in part on recognizing identifiers of at least some of the plurality of data items by one or more of machine learning, code mapping, keyword recognition, user-defined, heuristic, or other method of recognition;
creating a composite based at least in part on the modeling, the composite specifying a configuration of one of the subsystems with a selected set of the operation-performing resources to perform a defined process in accordance with one or more selected protocols; and
causing transmission of the composite to one or more endpoint devices mapped to one or more one resource identifiers, and controlling allocation of the selected set of the operation-performing resources to perform the defined process in accordance with the one or more selected protocols.

16. The one or more non-transitory, machine-readable storage devices as recited in claim 15, the operations further comprising:
consequent to the monitoring the at least one interface, detecting one or more subsequent data changes in the one or more data streams and identifying the one or more subsequent data changes as corresponding to one or more of:
  indicia of device interactions or data changes that correspond to process and operation performances by at least one the selected set of the operation-performing resources;
  indicia of conditions of loads mapped to the at least one the selected set of the operation-performing resources;
  indicia of processes and operations associated with the at least one the selected set of the operation-performing resources and the loads mapped to the at least one the selected set of the operation-performing resources; and
based at least in part on the one or more subsequent data changes, learning a pattern of performance metrics mapped to the selected set of the operation-performing resources.

17. The one or more non-transitory, machine-readable storage devices as recited in claim 16, the operations further comprising:
  creating a second composite based at least in part on the learning, the second composite specifying a different configuration of the one of the subsystems with a second selected set of the operation-performing resources; and
  causing transmission of the second composite and controlling allocation of the second selected set of the operation-performing resources to perform the defined process or a second defined process.

18. The one or more non-transitory, machine-readable storage devices as recited in claim 17, the operations further comprising:
  based at least in part on the pattern of performance metrics, determining one or more variances attributed to selected set of the operation-performing resources with respect to a baseline determined based at least in part on pattern recognition of performance metrics attributed to each subsystem of a set of subsystems; and
  configuring a second subsystem based at least in part on the one or more variances.

19. The one or more non-transitory, machine-readable storage devices as recited in claim 18, the operations further comprising:
  creating a data structure to implement the composite with a selected set of parameters corresponding to the specifications.

20. The one or more non-transitory, machine-readable storage devices as recited in claim 19, the operations further comprising:
  configuring a program corresponding to operations of the defined process in accordance with the one or more selected protocols, the composite corresponding to the program.

\* \* \* \* \*